United States Patent
Lu et al.

(10) Patent No.: US 7,912,019 B1
(45) Date of Patent: Mar. 22, 2011

(54) APPLICATIONS OF UPGRADEABLE SCALABLE SWITCHING NETWORKS

(76) Inventors: Haw-minn Lu, San Diego, CA (US); Alan Huang, Menlo Park, CA (US)

( * ) Notice: Subject to any disclaimer, the term of this patent is extended or adjusted under 35 U.S.C. 154(b) by 356 days.

(21) Appl. No.: 11/764,223

(22) Filed: Jun. 17, 2007

Related U.S. Application Data

(63) Continuation-in-part of application No. 10/786,874, filed on Feb. 24, 2004, now Pat. No. 7,440,448, which is a continuation-in-part of application No. 10/075,086, filed on Feb. 10, 2002, now Pat. No. 7,075,942, which is a continuation-in-part of application No. 10/074,174, filed on Feb. 10, 2002, now Pat. No. 7,123,612, which is a continuation-in-part of application No. 09/897,263, filed on Jul. 2, 2001, now Pat. No. 6,901,071.

(60) Provisional application No. 60/450,133, filed on Feb. 25, 2003.

(51) Int. Cl.
*H04W 4/00* (2009.01)

(52) U.S. Cl. ........................................ 370/338; 370/386

(58) Field of Classification Search .................. 370/386, 370/388, 380, 411
See application file for complete search history.

(56) References Cited

U.S. PATENT DOCUMENTS

| | | | |
|---|---|---|---|
| 4,967,340 A | 10/1990 | Dawes | |
| 5,552,962 A | 9/1996 | Feustel et al. | |
| 5,648,963 A | 7/1997 | Miyake et al. | |
| 5,825,517 A | 10/1998 | Antoniades et al. | |
| 5,841,775 A | 11/1998 | Huang | |
| 6,049,542 A | 4/2000 | Prasad | |
| 6,052,373 A | 4/2000 | Lau | |
| 6,456,838 B1 | 9/2002 | Wang et al. | |
| 6,563,819 B1 * | 5/2003 | Park | 370/388 |
| 6,784,802 B1 | 8/2004 | Stanescu | |
| 6,901,071 B2 | 5/2005 | Lu | |
| 6,937,032 B2 | 8/2005 | Adamian | |
| 7,075,942 B2 | 7/2006 | Lu | |
| 7,123,612 B2 | 10/2006 | Lu | |
| 7,388,875 B1 | 6/2008 | Lu | |
| 7,440,448 B1 | 10/2008 | Lu et al. | |
| 7,519,003 B2 | 4/2009 | Koziy et al. | |
| 7,613,177 B1 | 11/2009 | Lu | |
| 2002/0004390 A1 | 1/2002 | Cutaia et al. | |
| 2003/0002437 A1 | 1/2003 | Lu | |
| 2003/0152071 A1 | 8/2003 | Lu | |
| 2003/0163754 A1 | 8/2003 | Lu | |

OTHER PUBLICATIONS

Jae-Hyun Park, Hyunsoo Yoon, Heung-Kyu Lee, "The Cyclic Banyan Network: A Fault Tolerant Multistage Interconnection Network with the Fully-Adaptive Self-routing", 1995, 7th IEEE Symposium on Parallel and Distributeed Processing, p. 702-710.*

(Continued)

*Primary Examiner* — Dang T Ton
*Assistant Examiner* — Kevin Lee

(57) ABSTRACT

The creation of a variety of upgradeable scalable switching networks are set forth including multistage switching networks as well as novel multidirectional architectures. Systems and methods exploiting the properties such as fault tolerance, upgradeability without service disruption and path redundancy are incorporated into a variety of systems. A wide range of methods for upgrading and reconfiguring the scalable switching networks are presented including manifestations of implementations of these networks and methods. Methods for designing new upgradeable scalable switching and the novel architectures derived thereof including architectures built from the redundant blocking compensated cyclic group networks are set forth.

9 Claims, 53 Drawing Sheets

OTHER PUBLICATIONS

Patel, et al., "Performance of processor-memory interconnections for multiprocessors", IEEE Transactions on Computers, Oct. 1981, pp. 771-780, vol. 30, No. 10, IEEE, US.

Goke, et al., "Banyan Network for partitioning multiprocessor systems," First Annual International Symposium on Computer Architecture, Dec. 1973, pp. 21-28, ACM Press, US.

Kumar, et al., "Augmented shuffle-exchange multistage interconnection networks". Computer, Jun. 1987, pp. 30-40, vol. 20, No. 6, IEEE, US.

Adams, et al., "The Extra Stage Cube: A Fault-Tolerant Interconnection Network for Supersystems," IEEE Transactions on Computers, May 1982, pp. 443-454, vol. 31, No. 5, IEEE, US.

Benes, Permutation Groups, Complexes, and Rearrangeble Connecting Networks, Bell System Telephone Journal, Jul. 1964, pp. 1619-1640, vol. 44, AT&T, US.

Hamid, et al., "A New fast control mechanism for Benes rearrangeable interconnection network useful for supersystems,". Transactions of the Institute of Electronics, Information and Communication Engineers, Oct. 1987, p. 997-1008, vol. E70, No. 10, IEICE, Japan.

Dudgeon, et al., "Multidimensional Signal Processing," 1984, pp. 60-111, Prentice Hall, Englewood Cliffs, New Jersey.

Oppenhiem, et al., "Digital Signal Processing," 1975, pp. 284-328, Prentice Hall, Englewood Cliffs, New Jersey.

Cizek, et al. "Tradeoff Between Cost and Reliability in Packet Switching MultiStage Interconnection Networks," AFRICON '92 Proceedings., 3rd AFRICON Conference, Sep. 22-24, 1992, pp. 365-368, IEEE, South Africa (Reprinted US).

Agrawal, "Testing and Fault-Tolerance of Multistage Interconnection Networks," Computer, Apr. 1982, pp. 41-53, vol. 15, No. 4, IEEE, US.

Bhuyan, et al., "Design and Performance of Generalized Interconnection Networks." IEEE Transactions on Computers, Dec. 1983, pp. 1081-1090, vol. 32, No. 12, IEEE, US.

Blake, et al., "Multistage Interconnection Network Reliability," IEEE Transactions on Computers, Nov. 1989, pp. 1600-1603, vol. 38, No. 11, IEEE, US.

Chin, et al.,"Packet Switching Networks for Multiprocessors and Data Flow Computers," IEEE Transactions on Computers, Nov. 1984, pp. 991-1003, vol. 33, No. 11, IEEE, US.

Kumar, et al., "Failure Dependent Performance Analysis of a Fault-Tolerant Multistage Interconnection Network," IEEE Transactions on Computers, Dec. 1989, pp. 1703-1713, vol. 38, No. 12, IEEE, US.

Tzeng, et al.,"Realizing Fault-Tolerant Interconnection Network via Chaining," IEEE Transactions on Computers, Apr. 1988, pp. 458-462, vol. 37. No. 4, IEEE, US.

Varma, et al., "Fault-Tolerant Routing in Multistage Interconnection Networks," IEEE Transactions on Computers, Mar. 1989, pp. 385-393, vol. 38, No. 3, IEEE, US.

Office Action in related U.S. Appl. No. 11/764,224 mailed on Oct. 1, 2009.

Office Action in related U.S. Appl. No. 11/764,224 mailed on Apr. 7, 2010.

Office Action in related U.S. Appl. No. 12/247,198 mailed on Mar. 1, 2010.

Office Action in related U.S. Appl. No. 12/247,198 mailed on Jul. 28, 2010.

* cited by examiner

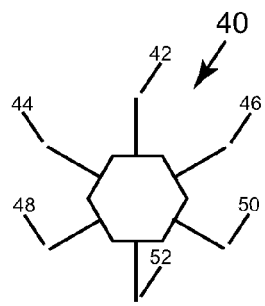
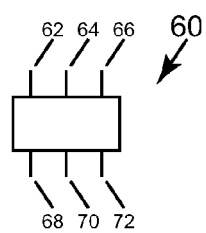
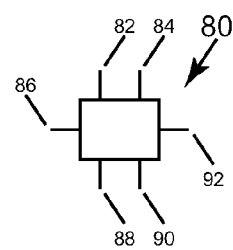
FIG. 5A   FIG. 5B   FIG. 5C
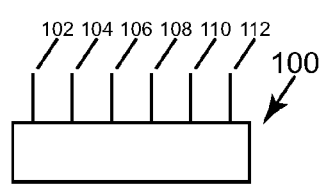
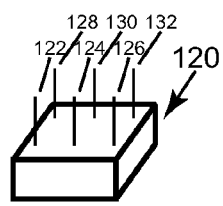
FIG. 5D   FIG. 5E
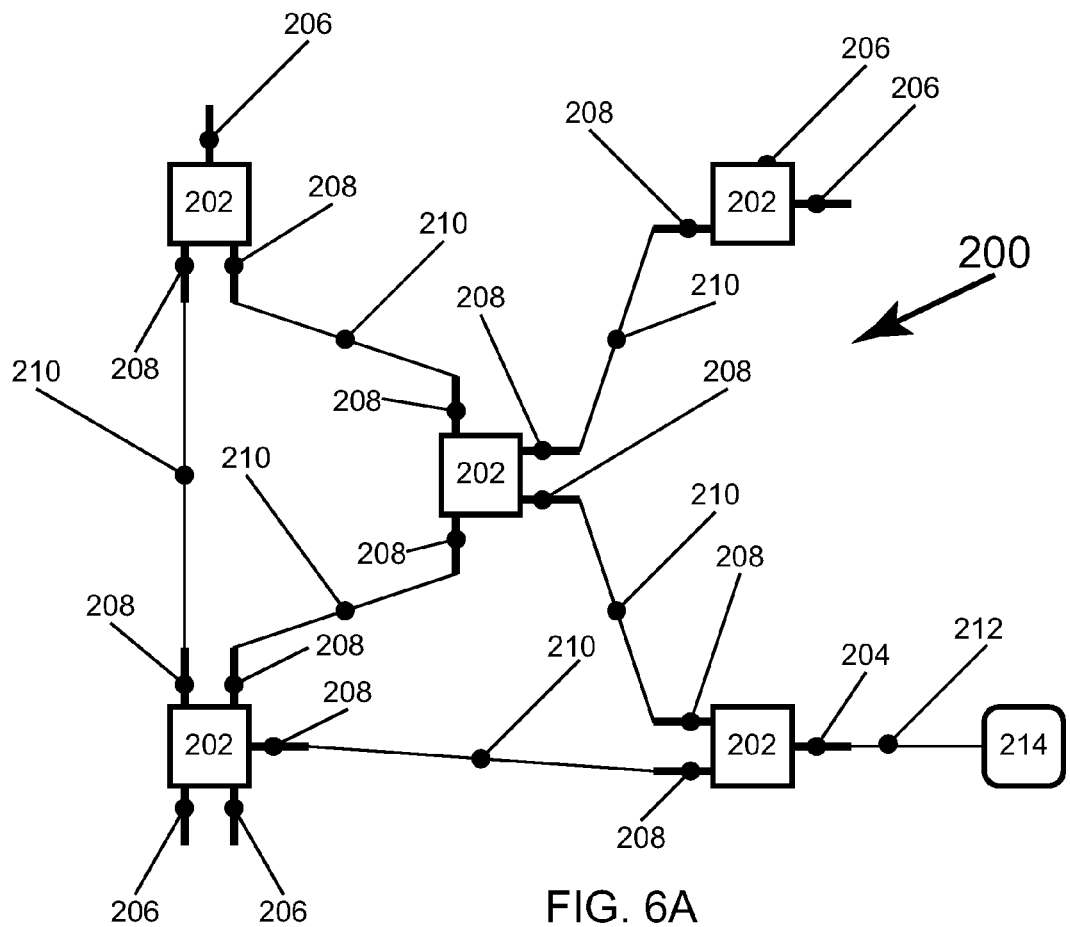
FIG. 6A

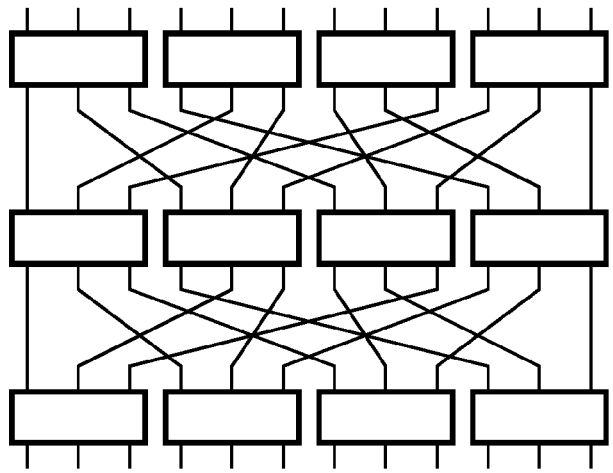
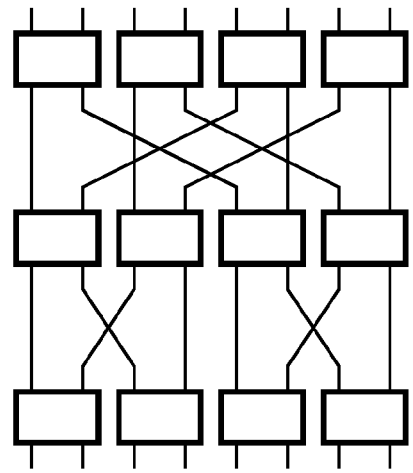
FIG. 21A  FIG. 21B
```
0  1  2  3  4  5  6  7  8  9  10 11
↓  ↓  ↓  ↓  ↓  ↓  ↓  ↓  ↓  ↓  ↓  ↓
0  3  6  9  1  4  7  10 2  5  8  11
```
FIG. 22A
```
0  1  2  3  4  5  6  7         0  1  2  3  4  5  6  7
↓  ↓  ↓  ↓  ↓  ↓  ↓  ↓         ↓  ↓  ↓  ↓  ↓  ↓  ↓  ↓
0  4  2  6  1  5  3  7         0  2  1  3  4  6  5  7
```
FIG. 22B  FIG. 22C (0,0) (1,0) (2,0) (3,0) (4,0) (5,0) (6,0) (7,0) (8,0) (9,0) (10,0) (11,0)
↓ ↓ ↓ ↓ ↓ ↓ ↓ ↓ ↓ ↓ ↓ ↓
(0,0) (3,0) (6,0) (9,0) (1,0) (4,0) (7,0) (10,0) (2,0) (5,0) (8,0) (11,0)

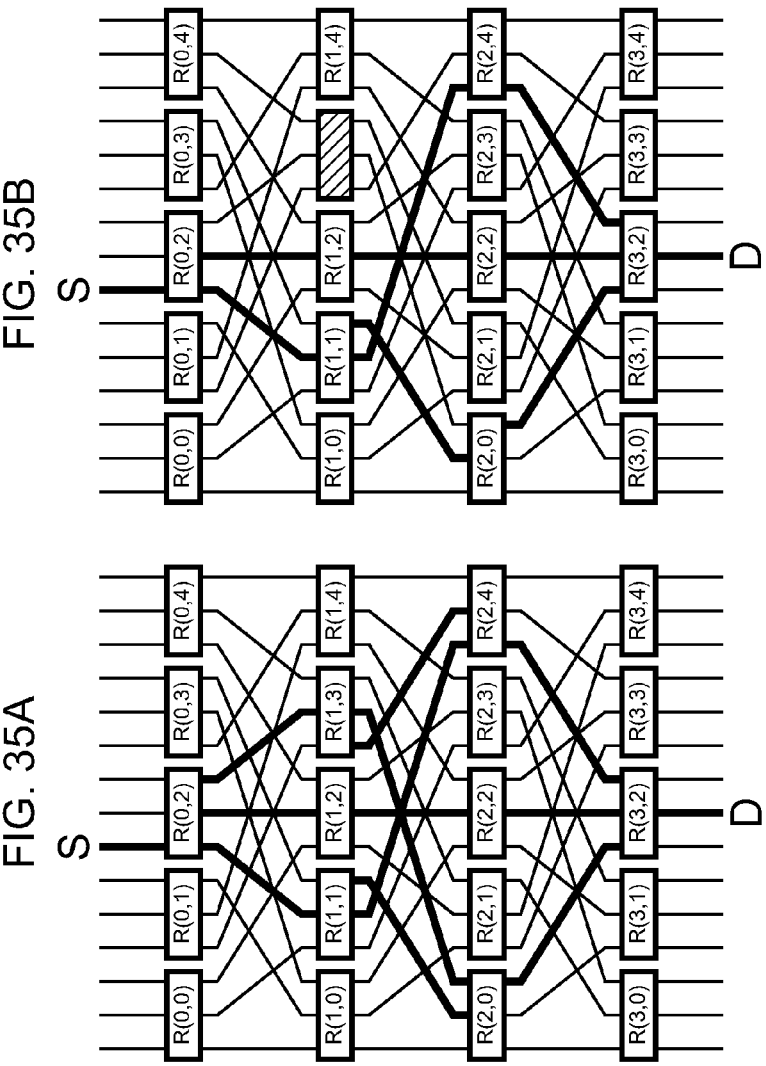
FIG. 35B
FIG. 35A
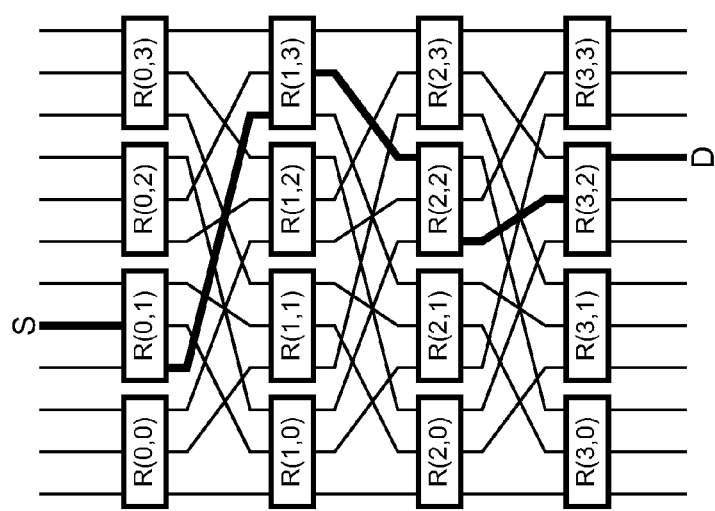
FIG. 34

APPLICATIONS OF UPGRADEABLE SCALABLE SWITCHING NETWORKS

RELATED APPLICATIONS

This application is a continuation-in-part of U.S. patent application Ser. No. 10/786,874, entitled "Systems and Methods for Upgradeable Scalable Switching", filed on Feb. 24, 2004, now U.S. Pat. No. 7,440,448 issued on Oct. 21, 2008, which is incorporated herein by reference in its entirety as if set forth in full. The parent application claims priority under 35 U.S.C. §119 to U.S. Provisional Patent Application Ser. No. 60/450,133 entitled, "Systems and Methods for Upgradeable Scalable Switching and its Applications," filed on Feb. 25, 2003, which is incorporated herein by reference in its entirety as if set forth in full. This parent application is also a continuation-in-part of U.S. Pat. No. 6,901,071 issued on May 31, 2005, which is incorporated herein by reference in its entirety as if set forth in full. This parent application is also a continuation-in-part of U.S. Pat. No. 7,123,612 issued on Oct. 17, 2006, which is incorporated herein by reference in its entirety as if set forth in full. This parent application is also a continuation-in-part of U.S. Pat. No. 7,075,942, issued Jul. 11, 2006, which is incorporated herein by reference in its entirety as if set forth in full.

This application is also related to concurrently filed application, entitled "Systems and Methods For Upgrading Scalable Switching Networks."

BACKGROUND OF THE INVENTION

1. Field of Invention

The field of invention relate generally to communications switching networks and more particularly to systems and methods for designing and utilizing upgradeable scalable switching networks.

2. Description of Related Art

Switching networks with regular structure have been explored for many years. Conspicuous among them are the so-called fixed radix networks, which typically comprise n stages of $r^n$ switching elements with each switching element having a fanin and fanout of r, where r is the radix. The majority of past research has been focused on radix two networks that is where r=2. Goke and Lipovski in "Banyan Network for Partitioning Multiprocessor Systems," proposed the Banyan network. Examples are illustrated in FIGS. 1A, 1B and 1C. FIG. 1A shows a 3-stage Banyan network with stages 101, 103, and 105 of switching elements. FIG. 1B shows a 4-stage Banyan network with stages 111, 113, 115 and 117. The Banyan network can be extended to other radixes such as a radix three network illustrated in FIG. 1C having three stages, stages 121, 123 and 125. This network actually finds its origin in the design of fast Fourier Transforms where it is also often termed a butterfly network. Patel in "Performance of Processor-Memory Interconnections for Multiprocessors" proposed the delta network shown in FIG. 1D with four stages, namely stages 131, 133, 135 and 137. The network shown in FIG. 1E is often called a crossover network shown here with four stages, stages 141, 143, 145 and 147. Lawrie in "Parallel Processing with a Perfect Shuffle," uses the network shown in FIG. 1F, known as a perfect shuffle, which is often termed in the art as an Omega network, shown here with three stages, stages 151, 153, and 155. A nameless radix two network can be found in the bit order preserving fast Fourier transform architecture described in Oppenheim and Schaefer's text, *Digital Signal Processing*. This network is shown here with four stages (stages 161, 163, 165 and 167) in FIG. 1G and is referred to as a bit-order persevering (BOP) network for the purpose of this disclosure.

These traditional radix networks offer functional connectivity, but lack redundancy and fault tolerance. Many methods and architectures have been developed to extend fixed radix networks to add redundancy and fault tolerance. Hamid, Shiratori and Noguchi in "A new fast control mechanism for Benes rearrangeable interconnection network useful for supersystems," extend the delta network (e.g., network 201) with a second delta network (e.g., network 203) into an architecture first suggested by Benes in "Permutation Groups, Complexes, and Rearrangeable Connecting Networks," as shown in FIG. 2A. This can be reconfigured to show two Banyan networks (e.g., networks 211 and 213) coupled together as shown in FIG. 2B.

Further, Adams and Siegel in "The Extra Stage Cube: A Fault-Tolerant Interconnection Network for Supersystems," teach the extra stage cube which resembles a Banyan network in FIG. 2C with an extra stage. Through the use of multiplexers 16 and demultiplexers 14, stage 10 and stage 12 can individually be enabled or bypassed giving fault tolerance to the entire network.

Kumar and Reddy in "Augmented shuffle-exchange multistage interconnection networks", add fault tolerance and path redundancy to a Banyan network offering additional lateral paths (for example, paths 221, 223, 225 and 227) for signals to travel which is depicted in FIG. 2D, This augmented shuffle-exchange network (ASEN) increases fault tolerance and path redundancy at the expense of increased path blocking Another technique for augmenting fixed radix network designs is by overlaying a second network onto a preexisting design. By this method, the fault tolerance of a network can be increased. The simplest technique is dilation, which is simply the overlaying of the same network on itself. FIG. 3A shows a Banyan network like that depicted in FIG. 1B overlaid on top of a second identical Banyan network. In the traditional design, the external ports (e.g., ports 301 and 303) are not augmented in the process. However, some designs do incorporate it as shown in FIG. 3B (compare with ports 311 and 313). In either case, the resultant network does increase the ability to tolerate a failure in an internal connection, but fails to compensate for any potential failure in a switching element.

This dilation technique is further refined by overlaying an upside-down version of the same network on top of itself. FIG. 4A depicts a Banyan network like that of FIG. 1B except upside-down, (shown with same reference number for the stages as FIG. 1B). Often in this technique, the connections depicted by the dotted lines are often considered overly redundant and are omitted. The result is the network shown in FIG. 4B. Once again the external ports are usually not augmented, but can be. This new network does compensate for failures in switching elements.

A final extension of multistage interconnection design is the seldom used multidimensional version of the multistage interconnection network. Though not well known in switching applications, multidimensional interconnections are frequently used in signal processing. Specifically, in the design of fast Fourier transforms (FFT) multistage interconnection networks are used. Since fixed radix networks, in particular the butterfly/Banyan, are the essential building blocks of the FFT. Multidimensional extensions of the butterfly are the essential building blocks of multidimensional FFT. This is discussed in great detail in any standard multidimensional signal processing text such as Dudgeon and Mersereau's *Multidimensional Signal Processing*.

SUMMARY OF INVENTION

In this disclosure, a switching network and systems comprising such a network are set forth. Basic building blocks can be constructed through modification of known networks such as the Banyan, Crossover, Delta and other networks. Additionally, these modified networks can inherit beneficial network properties in their topology by utilizing additional switching stages and for utilizing the interstage interconnection (ISIC) networks described as a single stage interconnection network in Huang in U.S. Pat. No. 5,841,775. In particular, many of these networks have the desirable scalability, fault-tolerance and upgradeability properties.

The redundant blocking compensated cyclic group (RBCCG) networks and hybrids form the basic building blocks of more elaborate switching networks. One such class of networks are those formed from the Cartesian product of two switching networks. The Cartesian product of two switching networks can reduce the distance of the average connection between stages as compared to a similarly equipped "flat" switching network.

Another class of networks that can be formed from the basic building block networks is the overlaid network where two or more network topologies are overlaid to form an elaborate multidirectional network. In such an overlaid network the average latency between two external ports can be reduced.

When properly designed, these networks offer an extra measure of fault tolerance. With the addition of multiplexer/demultiplexer combinations, the fault tolerance of the network can be extended completely to all switching elements within the switching networks.

Furthermore, routing of the RBCCG network in particular can be implemented using routing protocols and table look ups, but for some applications such as in very high performance small footprint applications, a formulaic routing method is required. Each element in an RBCCG network can route a packet based on the packet destination and the location of the switching element.

Uses of the scalable switching network are given. One use is to replace the infrastructure of a metropolitan point of presence. A smaller application is as the communications backbone of computational servers, network storage, or other services. Another use is to replace the peripheral bus of a computer. Another use is to replace the system bus on a computer.

Although the present invention has been described below in terms of specific embodiments, it is anticipated that alteration and modifications thereof will no doubt become apparent to those skilled in the art. It is therefore intended that the following be interpreted as covering all such alterations and modifications as falling within the true spirit and scope of the invention.

BRIEF DESCRIPTION OF THE DRAWINGS

For a more complete understanding of the present invention, the objects and advantages thereof, reference is now made to the following descriptions taken in connection with the accompanying drawings in which:

FIG. 5A and FIG. 5B show how arbitrary ports on a switching element can be logically labeled as top and bottom ports;

FIG. 5C shows further how arbitrary ports on a switching element can be logically labeled as top, bottom, left and right ports;

FIG. 5D and FIG. 5E show how one-dimensional ports on a switching element can be logically labeled as two-dimensional ports;

FIG. 6A defines basic terminology used relating to switching networks

FIG. 17A and FIG. 17B show the interconnection mappings between each stage of the two RBCCG networks, respectively;

FIG. 17C shows the composite interconnection mappings between any two stages of the Cartesian product RBBCG network;

FIG. 21A shows a 24 port RBCCG network;

FIG. 21B shows a 16-port Banyan network;

FIG. 22A shows the interconnection mapping between each stage of the RBCCG network FIG. 22B shows the interconnection mapping between the top and middle stages of the Banyan network;

FIG. 22C shows the interconnection mapping between the middle and bottom stages of the Banyan network;

FIG. 22D shows the interconnection mapping between the top and middle stages of the RBCCG/Banyan Cartesian product network;

FIG. 22E shows the interconnection mapping between the middle and bottom stages of the RBCCG/Banyan Cartesian product network;

FIG. 34 shows an example path of a route from port S to port D

FIG. 35A and FIG. 35B show how path redundancy in a scalable switching network leads to fault tolerance;

DETAILED DESCRIPTION

Figure 1A:
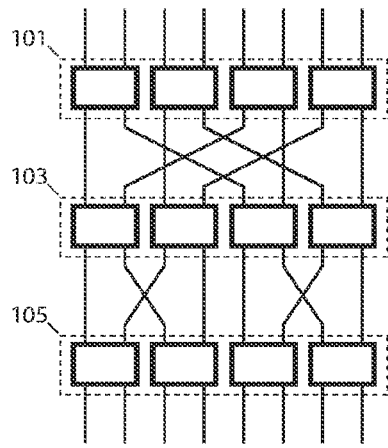
FIG. 1A shows a 16-port binary Banyan multistage switching network with three rows.
Figure 1B:
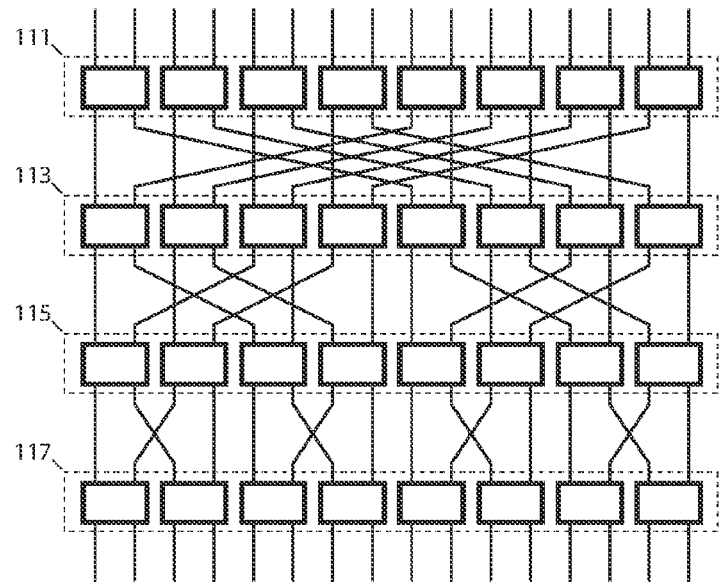
FIG. 1B shows a 32-port Banyan multistage switching network with four rows.

Switching elements are any type of device configured to relay traffic through different paths depending on the destination address of the traffic. Depending on the context, the switching elements as well as the systems and methods recited within this disclosure, operate with both circuit switched networks, packet switched networks, and networks comprising circuit switched elements and packet switched elements. The switching elements include but aren't limited to routers and switches, such as an Asynchronous Transfer Mode (ATM) switch or Ethernet switch. A switching element comprises ports which are an interface by which traffic is allowed to flow.

Some switching elements can further have the capability of expanding in the number of ports. In some embodiments, the switching elements can have the number of ports expanded without requiring the switching element to be powered off and in fact, the switching elements can even relay traffic during the expansion process, known as a hot upgrade.

For example, a router often comprises a central networking processor and a plurality of line cards. The router is designed to allow line cards to be added and removed while the router is in operation. Line cards comprise at least one port. Therefore, the number of ports on this type of router can be changed while the router is in operation.

In discussing switching elements a distinction is drawn between a physical layout and a logical layout. In FIG. 5A, a switching element is depicted as having six ports 42, 44, 46, 48, 50 and 52. These ports can physically be accessed anywhere on the switching element; for example, it is common for switches to have all their ports located in the rear. Regardless of the physical layout, ports on a switching element can be logically located. For example, ports can be logically defined as a top port or a bottom port. In another logical embodiment, the same switching element can have ports logically defined as a top port, bottom port, left port or right port. For example, switching element 40 can logically be defined to look like switching element 60 in FIG. 5B, by logically mapping ports 42, 44, and 46 to top ports 62, 64, and 66, respectively and ports 48, 50 and 52 to bottom ports 68, 70 and 72. In another logical embodiment, switching element 40 can logically be defined to look like switching element 80 in FIG. 5C, by logically mapping port 42 to top port 82, port 44 to top port 84, port 46 to left port 86, port 48 to bottom port 88, port 50 to bottom port 90, and port 52 to bottom port 92.

The mapping of physical to logical ports can be used to give multidimensional characteristics to a switching element. FIG. 5D shows a switching element 100 having ports 102, 104, 106, 108, 110, and 112, representing top ports 0, 1, 2, 3, 4, and 5. By mapping top ports 0, 1, 2, 3, 4, and 5 to top ports (0,0), (0,1), (0,2), (1,0), (1,1) and (1,2) as indicated in FIG. 5E by ports 122, 124, 126, 128, 130 and 132, respectively, the resultant logical switching element 120 exhibits two-dimensional characteristics. By extension, two dimensional local mapping can apply to defining bottom ports, left ports, right ports, front ports, and back ports. Clearly, logical mapping can result in higher dimensional characteristics of a switching element.

In describing a switching network, several terms are used in this disclosure. In addressing any switching network, an external port to a switching network is a port of a switching element which is intended to be connected to a device not part of the switching network. Likewise, an internal port to a switching network is a port of a switching element which is intended to be connected to another switching element within. Similarly, an external connection is a connection between a switching element of the switching network and a potential external device and an internal connection is a connection between two or more switching elements within the switching network. For example, in FIG. 6A, switching network 200 comprises a plurality of switching elements 202, where some of the switching elements 202 have external ports 206 and 204 and internal ports 208. Conversely, some of the switching elements 202 only have internal ports. In this example, there are a plurality of internal connections 210 and an external connection 212. An external port 204 need not be connected to an external device 214 as long as the port is intended to be connected to an external device. Furthermore, if the switching network is reconfigured, expanded or modified, an external port can be made converted to an internal port by simply connecting it to another switching element within the switching network. Likewise, an internal port can be made available to an external device thereby redefining the role to an external port. The distinction between internal and external is not intended to be a constraining property of the port, but merely as a logical allocation.

A switching network is termed functionally connected if for every pair of external ports, there is a path connecting them. For example, in FIG. 6B, switching network 220 is functionally connected. Every pair of external ports can be connected through switching network 220. For example, external ports 222 and 224 can be connected through path 226.

Figure 6C:
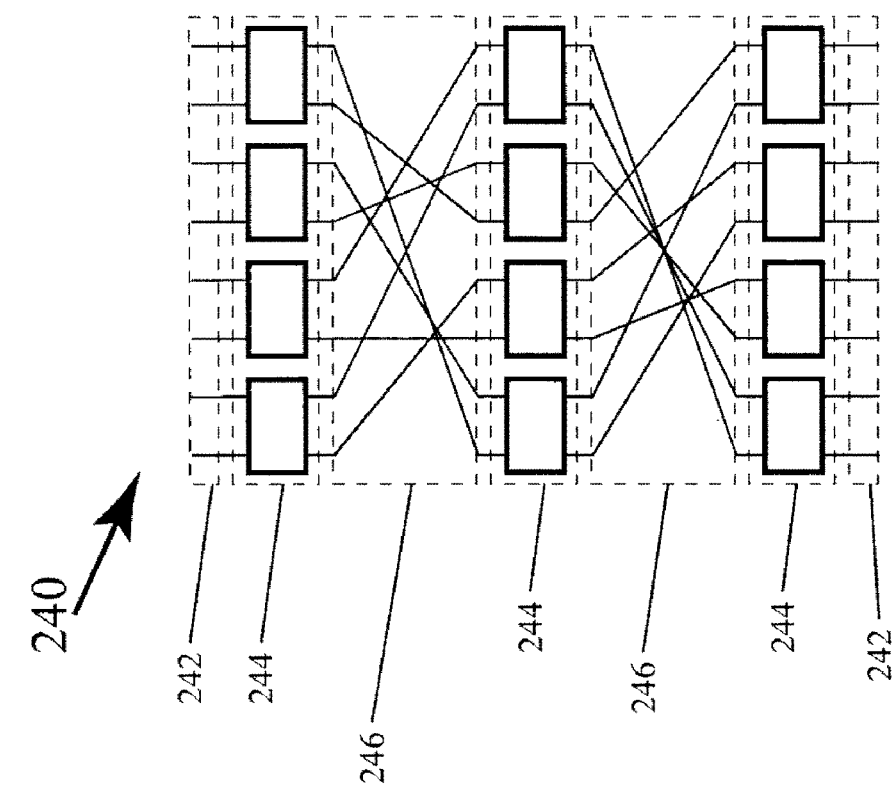
FIG. 6C defines various parts of a multistage switching network.
Figure 6B:
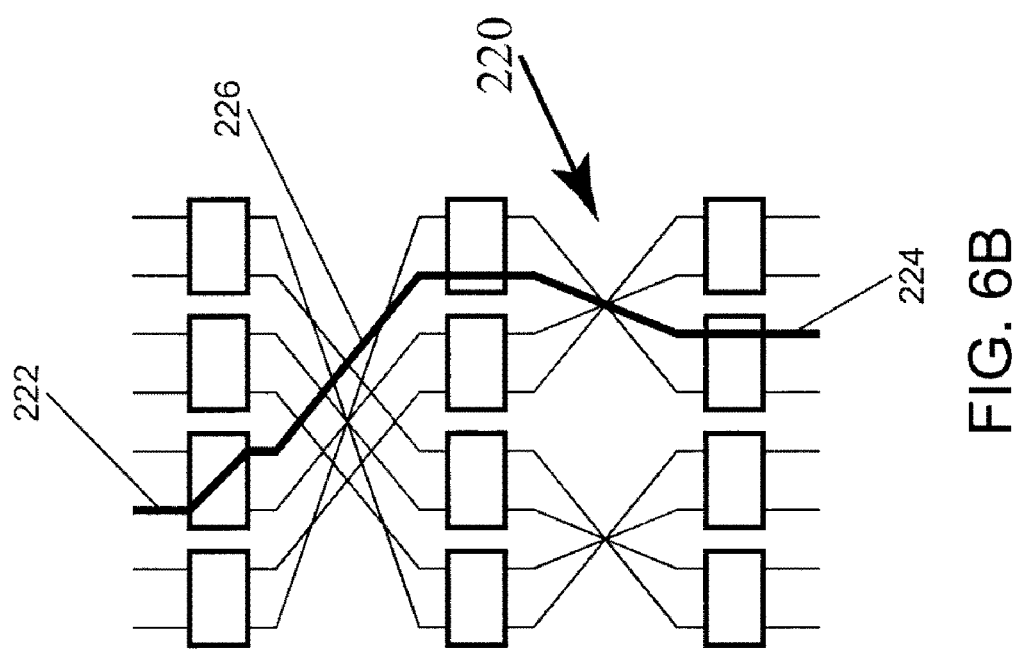
FIG. 6B defines the concept of functionally connected.

In FIG. 6C, the specific case of a multistage switching network 240, the network typically comprises a layer of external ports 242, two or more stages of switching elements 244, and an inter-stage interconnection (ISIC) network 246 connecting two adjacent stages comprising all connections between the two adjacent stages. In such referring to such a network, the number of stages is referred to as the height, H. In a one-dimensional stage, the width is referred to as the width, W.

Figure 7A:
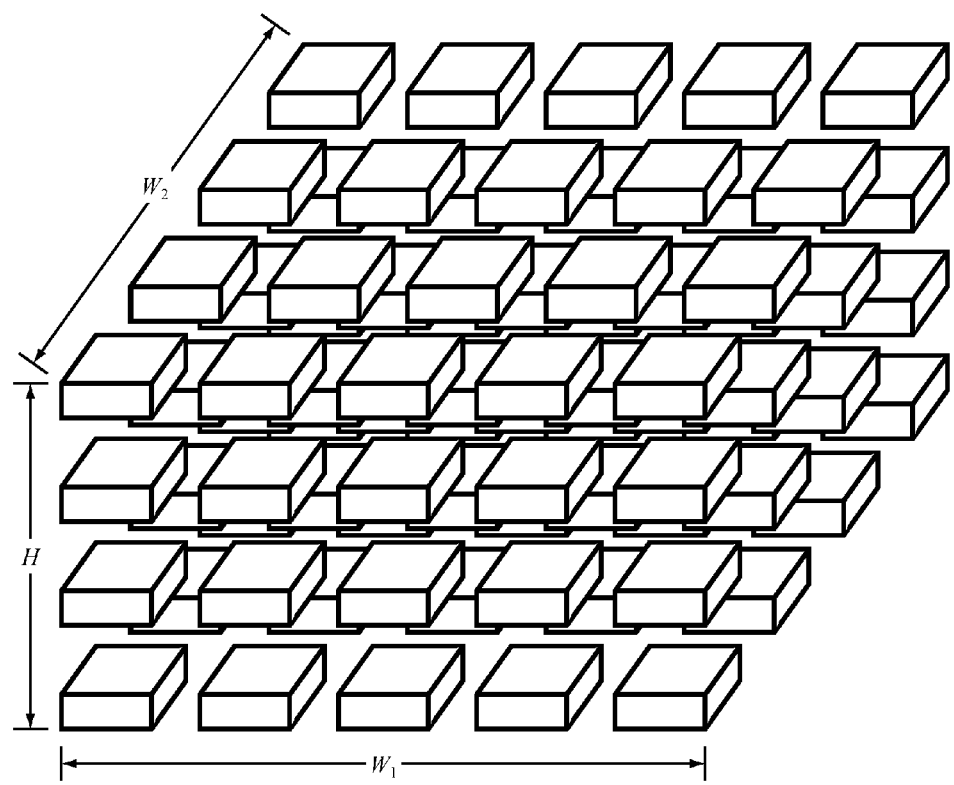
FIG. 7A shows a three dimensional layout of switching elements with height of H and widths of $W_1$ and $W_2$.
Figure 7B:
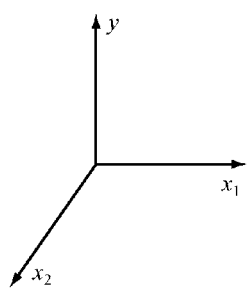
FIG. 7B shows the coordinate axis labeling for the given two-dimensional multistage interconnection network.

In higher dimensional stages, a width is ascribed to each coordinate axis. For example, FIG. 7A shows a multistage switching network with two-dimensional stages. It has H stages and is referred to as having a height of H. For ease of notation, the direction perpendicular to the stages (i.e. the direction traversed in order to count the number of stages) is referred to as the y axis, and each direction the stages occupy are referred to as the $x_i$ direction. In the example of FIG. 7A, each stage has widths of $W_1$ in the $x_1$ direction and $W_2$ in the $x_2$ direction as further depicted in FIG. 7B.

Figure 7C:
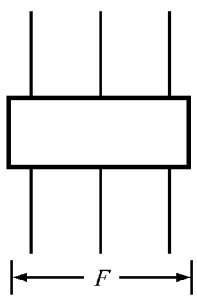
FIG. 7C shows the definition of the fanout variable F.
Figure 7D:
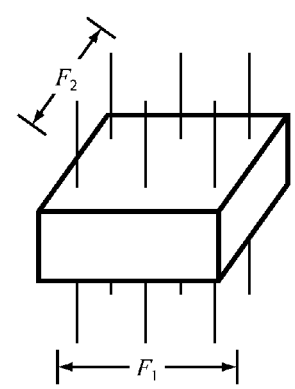
FIG. 7D shows the definition of the fanout variables $F_1$ and $F_2$ for the given two-dimensional multistage interconnection network.

The port width of a switching element is referred to in this disclosure as the fanout. This definition coincides historically with the definition of fanout in multistage interconnection networks. However, in practice, switching elements can include bidirectional ports; that is, traffic is allowed to flow in and out of each port, so this definition of fanout can differ from some meanings in the art. FIG. 7C depicts a switching element with a fanout of F; it has F top ports and F bottom ports. Similarly, if a stage of a multistage switching network is multidimensional, it can have various fanouts. For example, FIG. 7D shows a two-dimensional switching element with fanouts of $F_1$ in the $x_1$ direction and $F_2$ in the $x_2$ direction.

Figure 8A:
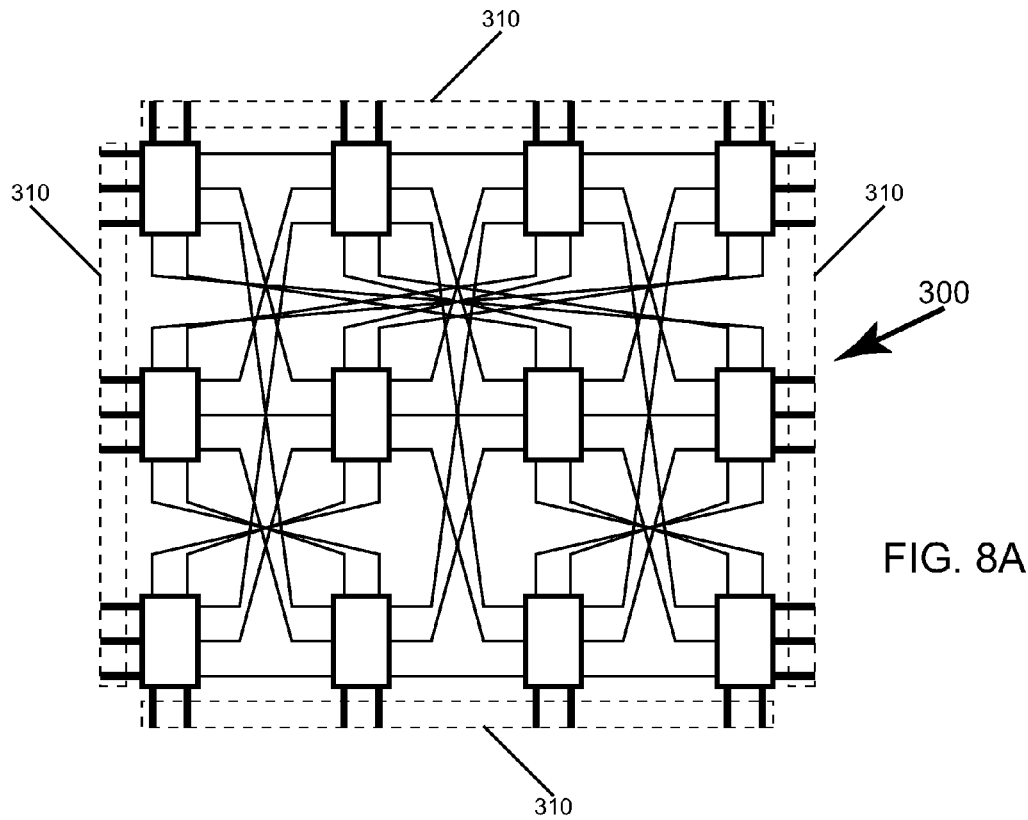
FIG. 8A, FIG. 8B and FIG. 8C defines various parts of an overlaid switching network.
Figure 8B:
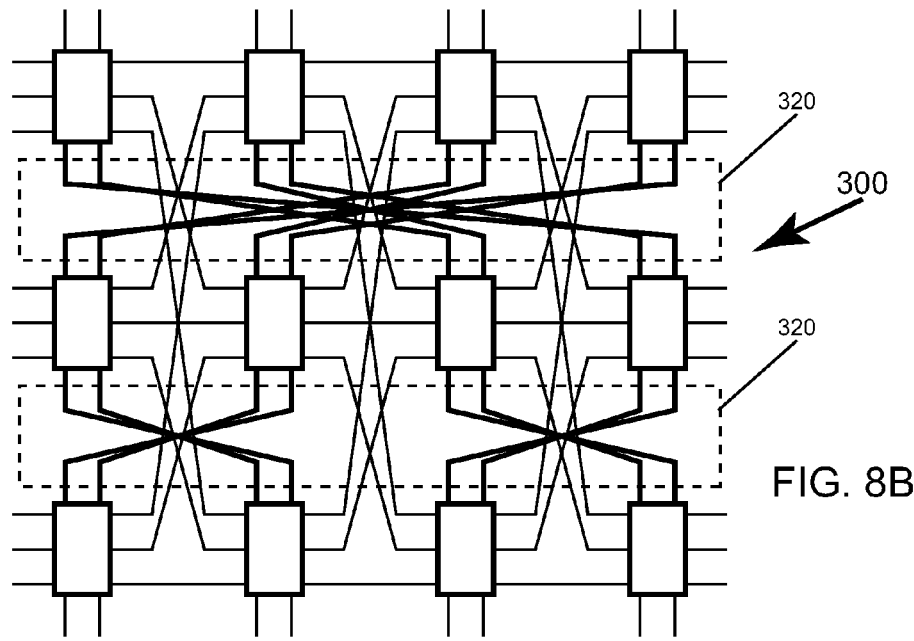
Figure 8C:
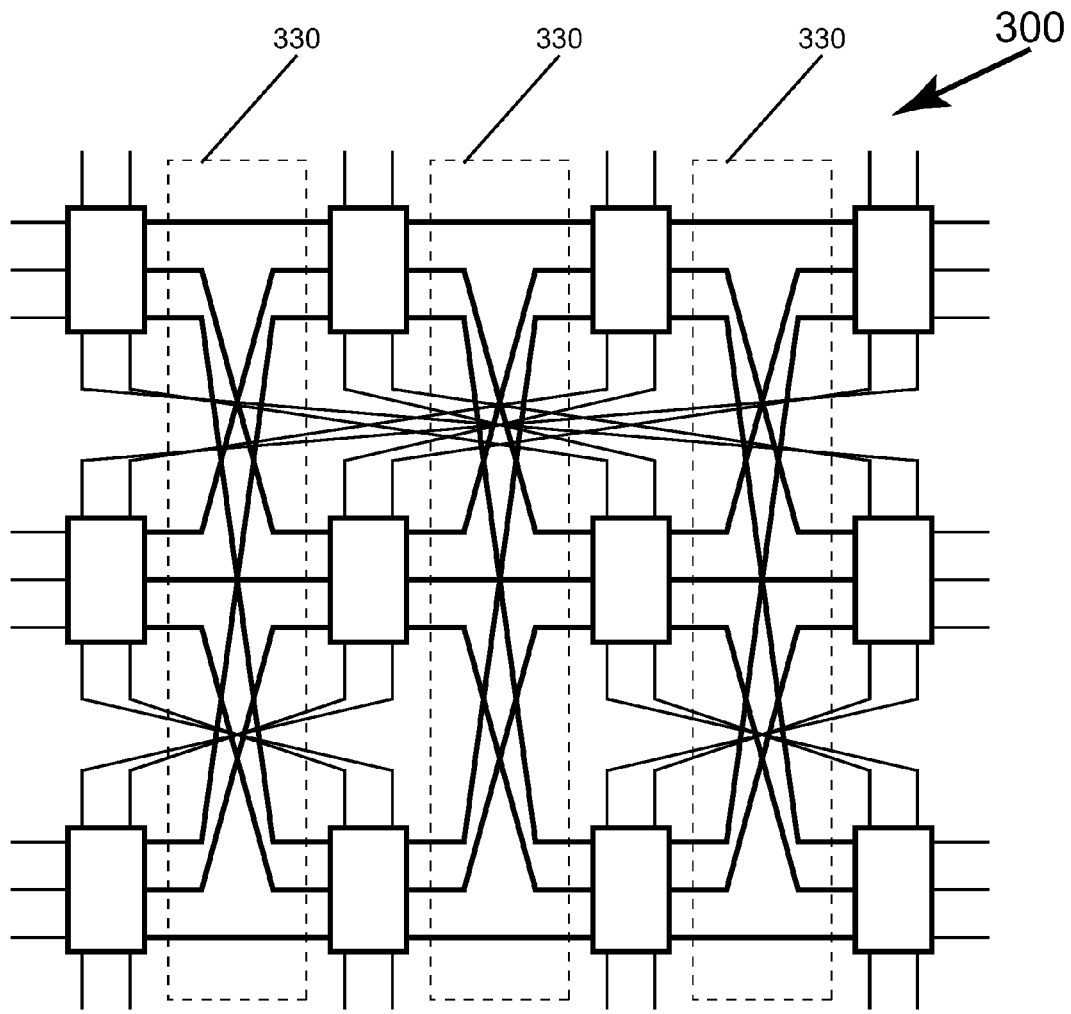

FIG. 8A, FIG. 8B and FIG. 8C depict an overlaid switching network 300 which is described in detail below, with external ports 320. It can be described in terms of rows and columns. Between rows can be an inter-row interconnection (IRIC) network 330 as indicated in FIG. 8B. Between the columns can be an inter-column interconnection (ICIC) network 330 as indicated in FIG. 8C.

As a convention in the diagrams, items are generally counted starting with 0 from top to bottom, left to right and, in the case of three dimensional drawings, front to back. For example, the stages of a multistage switching networks are numbered from top to bottom from 0 to H−1 with stage 0 at the top and the ports on the switching elements are numbered from left to right from 0 to F−1 with port 0 leftmost. Furthermore, the switching elements are numbered from left to right from 0 to W−1.

On occasion, it is convenient to refer to a port as belonging to a stage or ISIC network, that is a port belongs to a stage if it belongs to a switching element belonging to the stage. A port belongs to an ISIC network if it is a top port and the top ports of the stage to which it belongs is coupled to the ISIC network. Conversely, if the port is a bottom port, it belongs to an ISIC network if the bottom ports of the stage to which it belongs is coupled to the ISIC network. One should not by this convention a port need not be connected to belong to an ISIC network.

Figure 9:
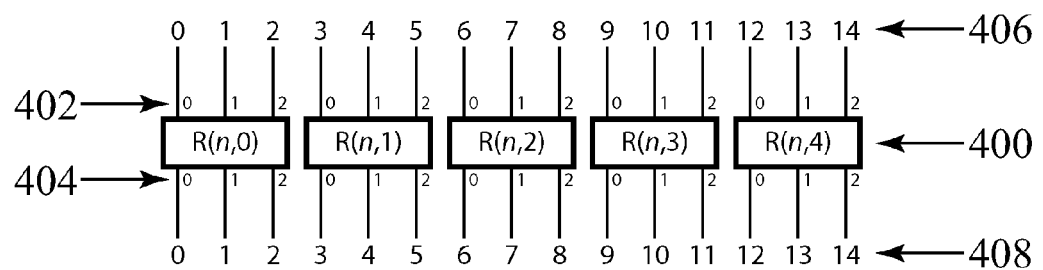
FIG. 9 shows the relationship between the numbering of the ports for each switching element and the number of ports for an entire row.

It is often convenient to number these ports from 0 to W×F−1. Notationally, each switching element can be labeled as R(n,W) indicating it is w+1 switching elements from the leftmost switching element in stage n+1. FIG. 9 depicts stage n+1 of switching elements, indicated as stage 400. In this example, F=3 and W=5 so the bottom and top ports for each switching element are numbered from 0 to 2, as indicated by 402 for the top ports and 404 for the bottom ports. If referring to the top ports and bottom ports of the stage, they are numbered from 0 to 14 as indicated by 406 and 408 respectively. Mathematically, the relationship is a simple equation, for instance, top port 2 of switching element R(n,4) would be top port 4F+2 of stage n. In discussion of higher dimensional switching networks, this concept can be extended to numbering of all ports of a two-dimensional stage. For instance, bottom port (1,3) of switching element R(n,2,3) would be bottom port $(2F_1+1,3F_2+3)$ of the ISIC network.

Figure 10:
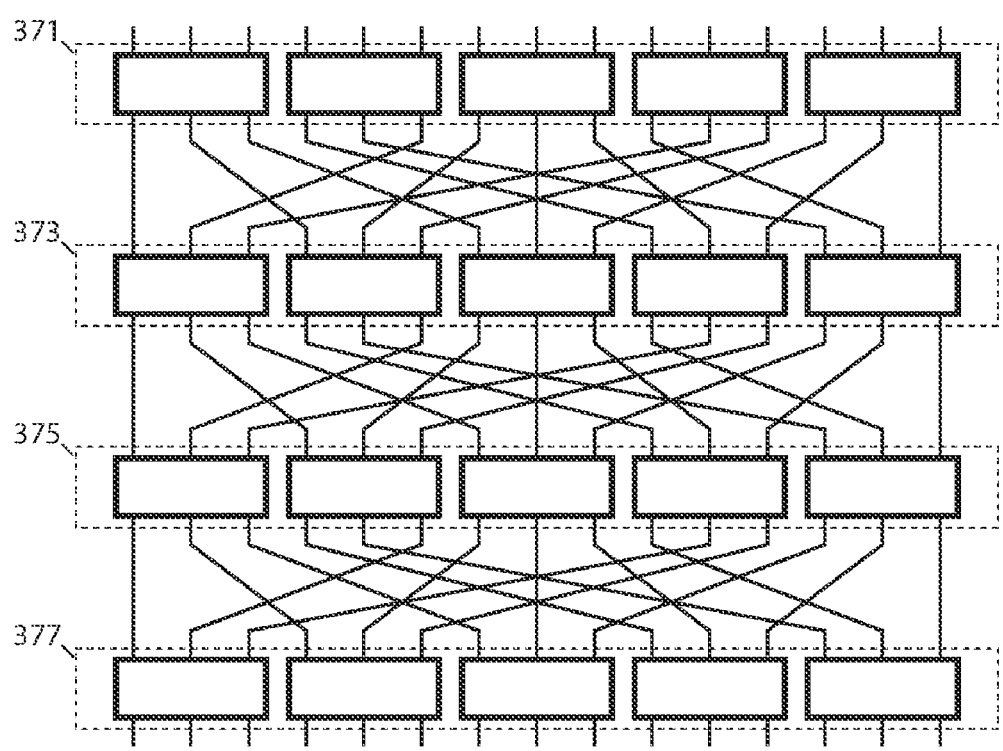
FIG. 10 shows a 30-port RBCCG network with 4 layers and width of 5 switching elements and per switching element fanout of 3.

By way of specific example, many of the switching networks described are redundant blocking compensated cyclic group (RBCCG) networks as described by Huang in U.S. Pat. No. 5,841,775; therefore, U.S. Pat. No. 5,841,775, entitled "Scalable Switching Networks," issued on Nov. 24, 1998 is incorporated herein by reference in its entirely as if set forth in full. Specifically, balanced RBCCG networks which have a stride value equal to the fanout such as the one depicted in FIG. 10 are used. The balanced RBCCG network depicted in FIG. 10 has a fanout of 3, a stride of 3, height of 4 (stages 371, 373, 375 and 377) and a width of 5. Each ISIC network in a balanced RBCCG is referred to as a cyclic group ISIC (CGISIC) network.

Though the RBCCG switching networks offer a wide variety of advantages over the fixed radix switching networks, the fixed radix switching networks have been more extensively studied and are considered more traditional. The methods described here utilize the advantages of the CGISIC networks in conjunction to augment the properties of the traditional multistage switching networks. Though this method is described for augmenting a fixed radix switching network, it can be applied to any multistage switching network.

Figure 12:
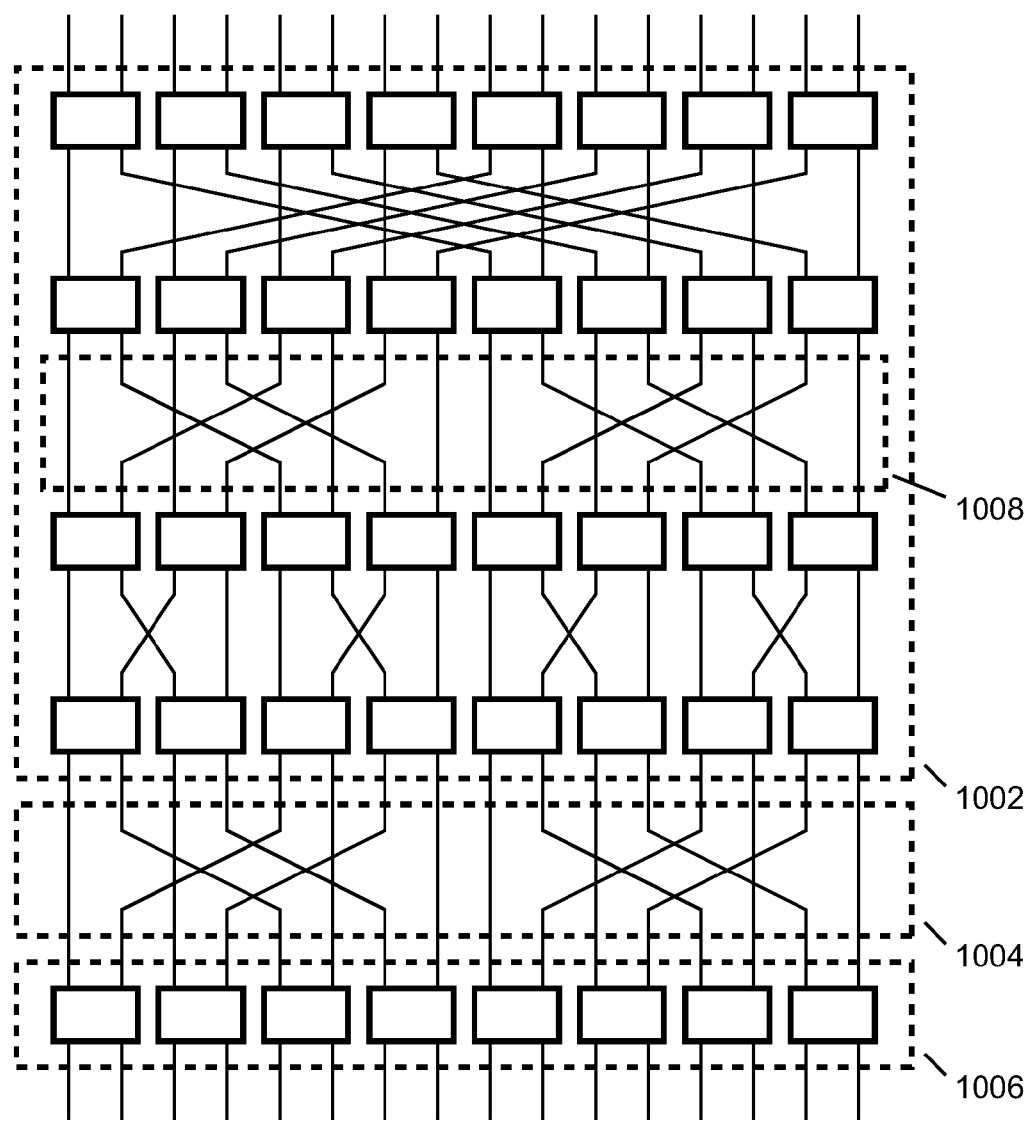
FIG. 12 shows a 32-port Banyan network with an extra stage comprising an extra Banyan stage at the bottom of the network.

One embodiment of a multistage switching network augmentation method is the insertion of an extra stage. FIG. 12 shows a network comprising a Banyan network 1002, an extra stage 1006 connected with ISIC network 1004, which in this case is identical to the ISIC network 1008 between the second and third stages of Banyan network. Since the Banyan network is functionally connected, the network depicted in FIG. 12 is also functionally connected with fault tolerance derived from redundant paths much in the same way as an RBCCG switching network. It falls short however in that the type of stages are not interchangeable, and the addition of new stages can not necessarily be made arbitrarily. The addition of a stage in the wrong position (or the wrong type of ISIC network) can yield a network which not only lacks fault tolerance, but may not be functionally connected.

Figure 11B:
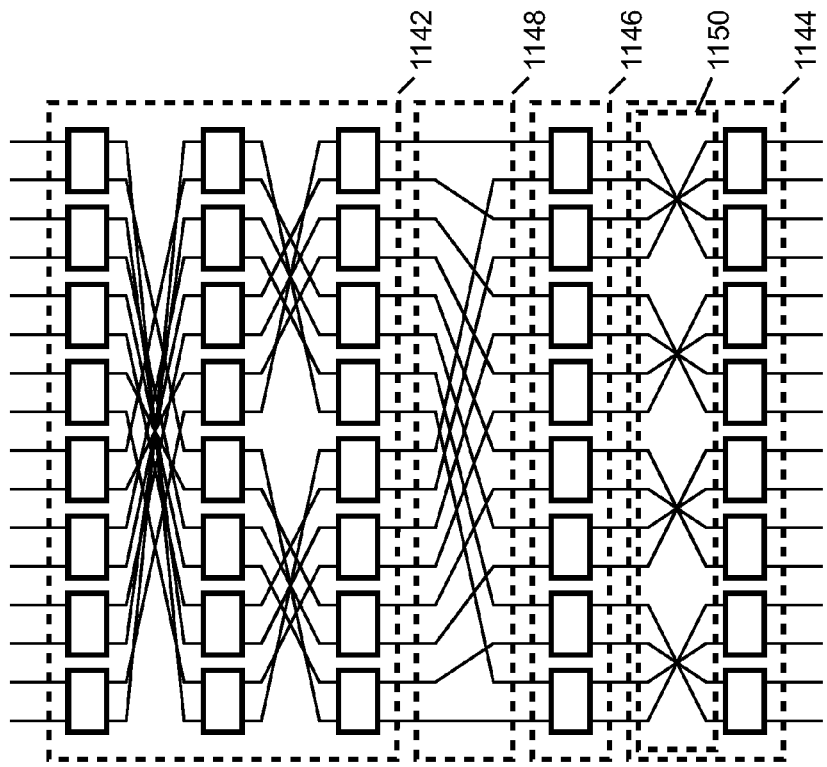
FIG. 11B shows a typical switching network with an extra stage inserted inside a traditional multistage switching network.
Figure 11A:
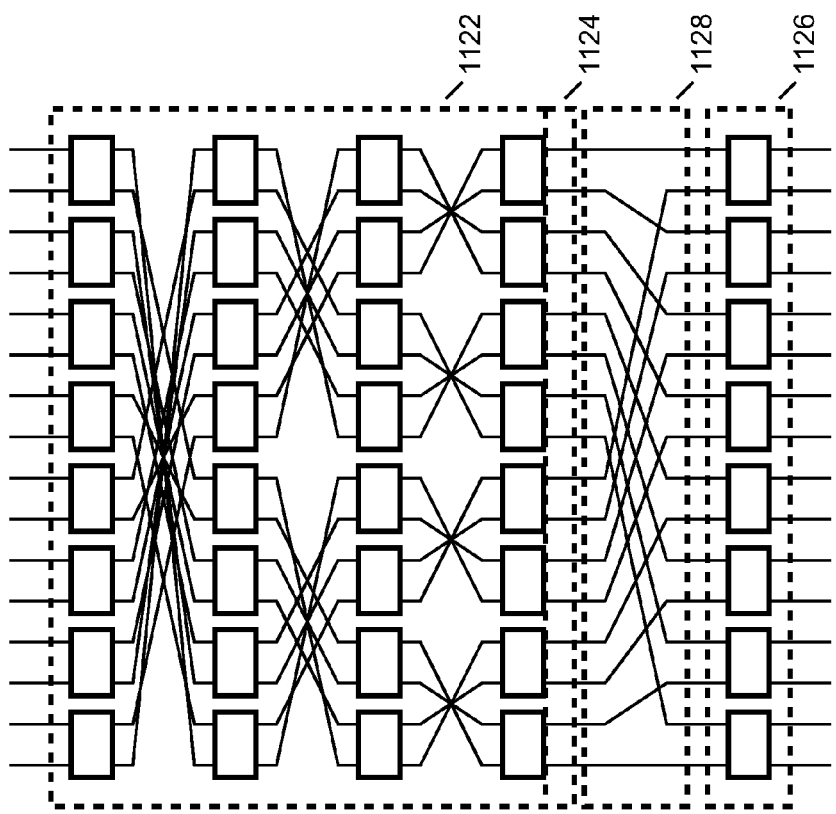
FIG. 11A shows a typical switching network with an extra stage inserted below a traditional multistage switching network.

The shortcoming of arbitrary stage augmentation yields the following refinement to the multistage switching network augmentation method: the insertion of an extra stage with a CGISIC network. As depicted in FIG. 11A, a multistage switching network 1122 is connected through one set of its external ports 1124 to another stage of switching elements 1126, by a CGISIC network 1128. In an alternate embodiment depicted in FIG. 11B, the same multistage switching network 1122 depicted in FIG. 11A is divided into two pieces 1142 and 1144, ISIC network 1150 is preserved with piece 1144. Equivalently, the multistage switching network could have been divided so ISIC network 1150 is preserved with piece 1142. A new stage 1146 is attached to piece 1142 through CGISIC network 1148, and to piece 1144 through ISIC 1150. Generally, the internal insertion depicted in FIG. 11B is less desirable than the external insertion depicted in FIG. 11A. FIG. 11A as an architectural design. Often times, the multistage switching network is available as a complete unit whereby the internal connections can not be broken. Furthermore, unlike the external insertion depicted in FIG. 11A, the connectivity of the network can be detrimentally impacted to the point of no longer being functionally connected, especially if the initial multistage switching network is a radix two network, whereas with an external insertion, the resulting network is guaranteed to be functionally connected if the initial multistage switching network is functionally connected. Furthermore, with an internal insertion, any calculation-based routing can be severely impacted, whereas with an external insertion calculation-based routing of the multistage switching network can be used in combination with the calculation-based routing of a CGISIC network described below.

Due to the symmetry of the topologies given above, an inverted CGISIC network could be used in place of the CGISIC networks 1128 or 1148 in FIG. 11A and FIG. 11B, respectively. Once this extra stage is added, fault tolerance is either established or increased. Additional stages can be added or the architecture can be converted to another switching network in a manner to avoid disruption of service as described below.

The following eight exemplars are products of eight embodiments of the augmentation method described above.

Figure 13B:
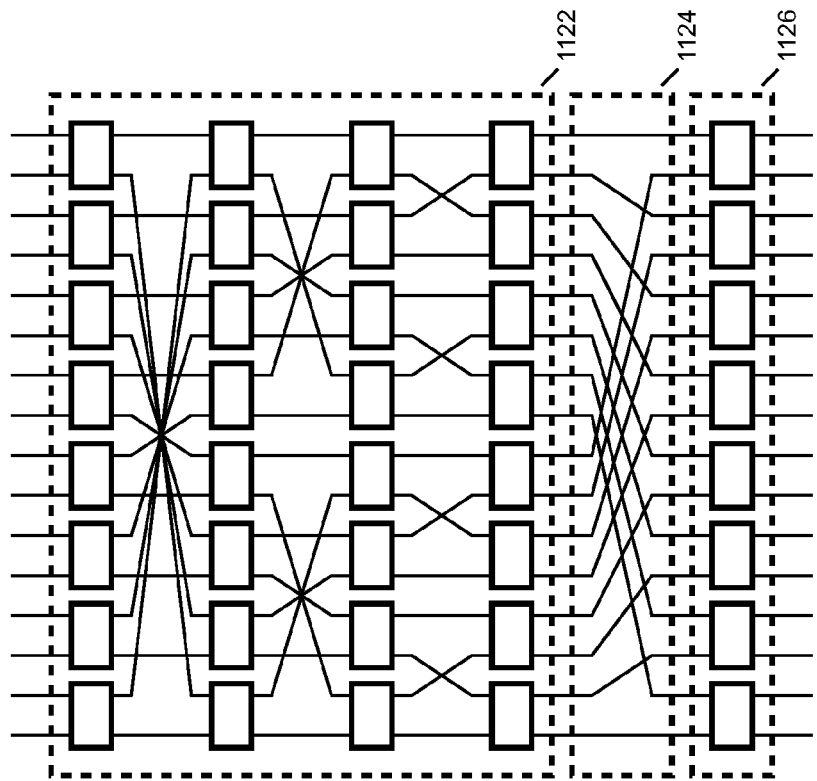
FIG. 13B shows a 32-port crossover network augmented with an extra CGISIC network stage at the bottom of the network.
Figure 13A:
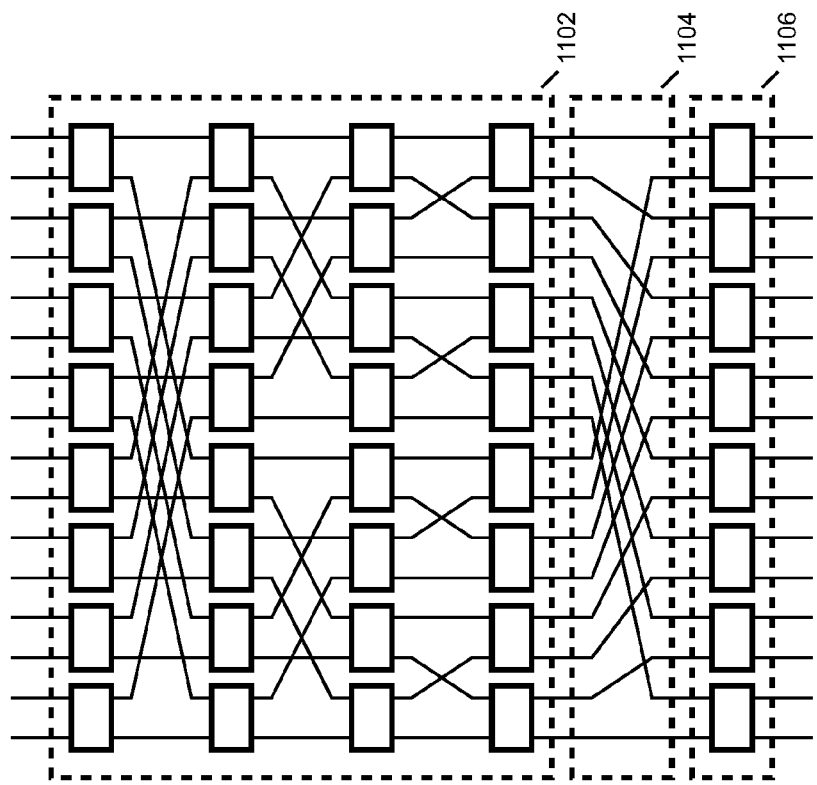
FIG. 13A shows a 32-port Banyan network augmented with an extra CGISIC network stage at the bottom of the network.
Figure 13D:
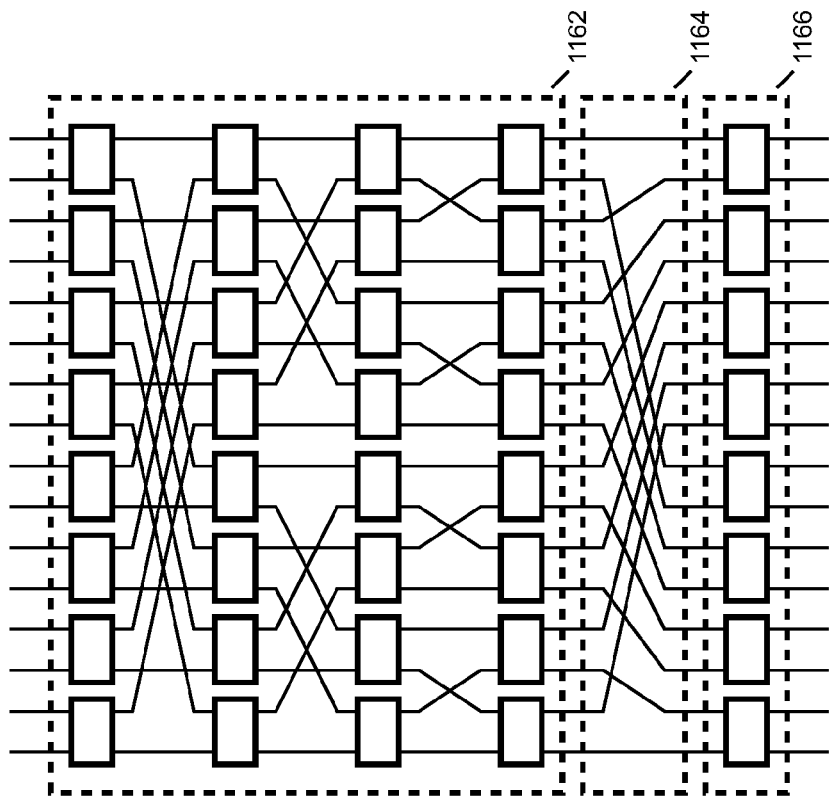
FIG. 13D shows a 32-port Banyan network augmented with an extra inverted CGISIC network stage at the bottom of the network.
Figure 13C:
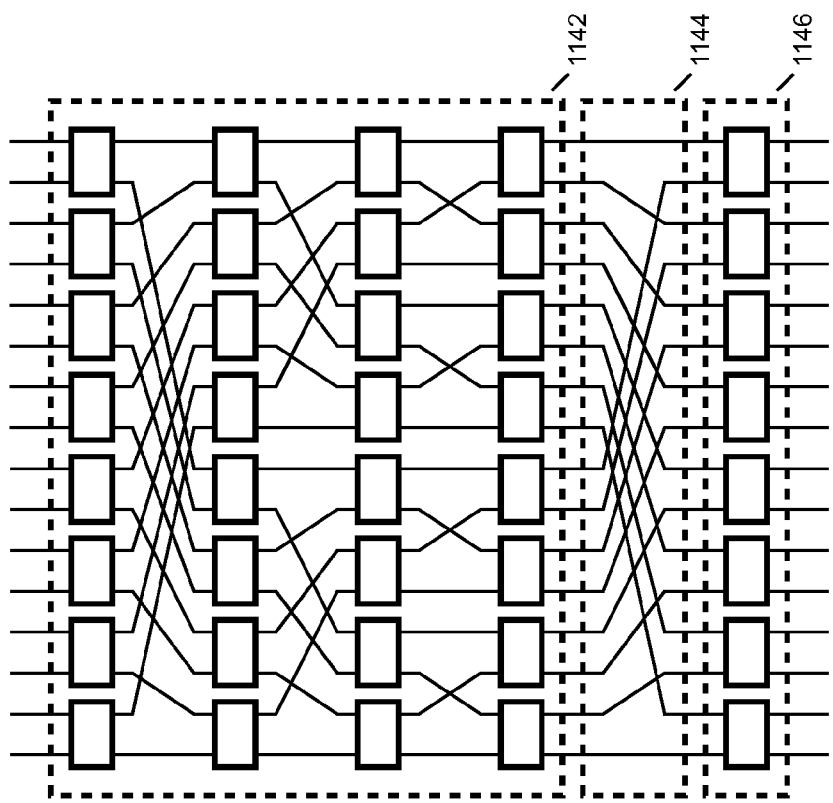
FIG. 13C shows a 32-port delta network augmented with an extra CGISIC network stage at the bottom of the network.
Figure 13F:
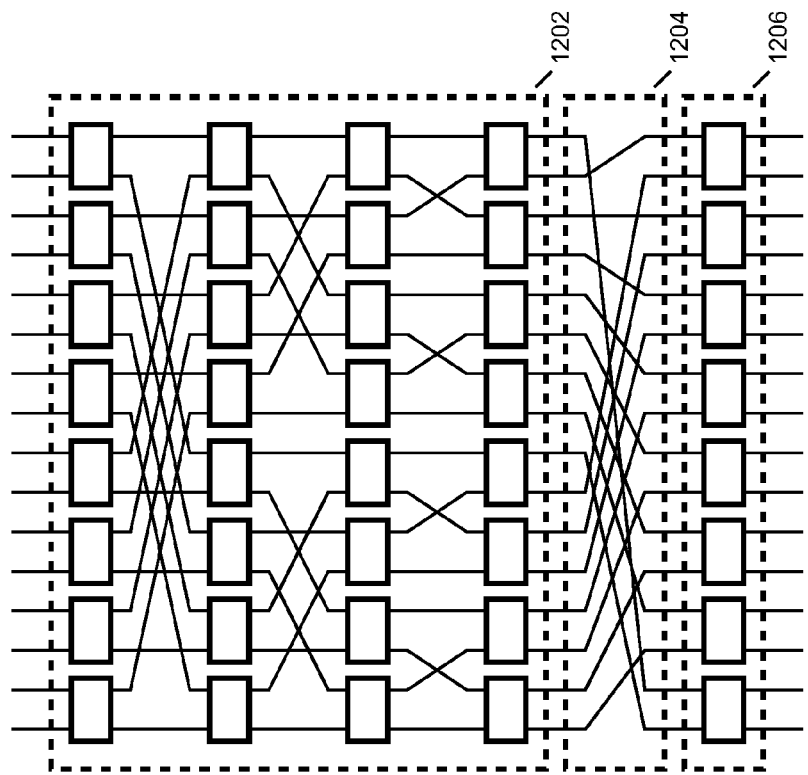
FIG. 13F shows a 32-port Banyan network augmented with an extra asymmetric CGISIC network stage at the bottom of the network.
Figure 13E:
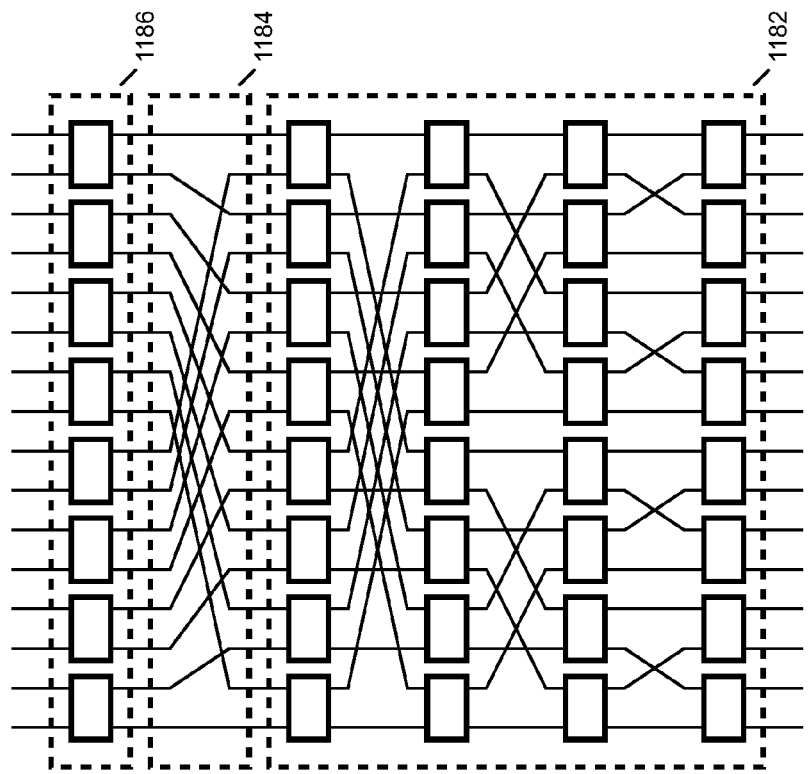
FIG. 13E shows a 32-port Banyan network augmented with an extra CGISIC network stage at the top of the network.
Figure 13G:
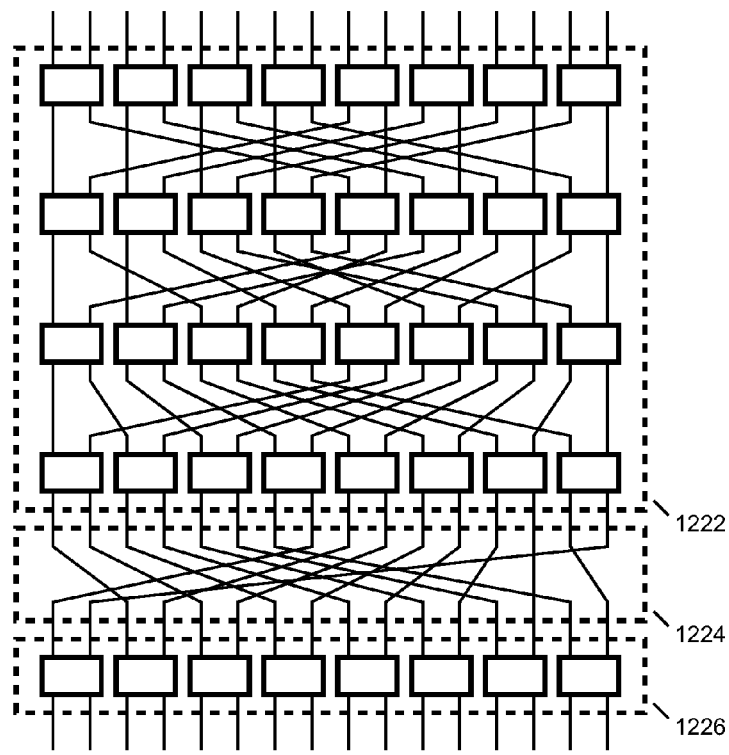
FIG. 13G shows a 32-port fast Fourier transform derived network augmented with an extra asymmetric CGISIC network stage at the bottom of the network.

The first example, depicted in FIG. 13A, shows a 32-port switching network comprising a Banyan network 1102, an extra stage 1104 and a CGISIC network 1106. The second example, depicted in FIG. 13B, shows a 32-port switching network comprising a crossover network 1122, an extra stage 1124 and a CGISIC network 1126. The third example, depicted in FIG. 13C, shows a 32-port switching network comprising a delta network 1142, an extra stage 1144 and a CGISIC network 1146. The fourth example, depicted in FIG. 13D, shows a 32-port switching network comprising a Banyan network 1162, an extra stage 1164 and an inverted (upside-down) CGISIC network 1166. It should be noted that the orientation of the ISIC network 1166 does not affect the positive properties of the hybrid architecture. The fifth example, depicted in FIG. 13E, shows a 32-port switching network comprising a Banyan network 1182, an extra stage 1184 and a CGISIC network 1186. This example differs from the example depicted in FIG. 13A in that the extra stage is attached to the top of the network rather than the bottom. It should be noted that whether the placement of the extra stage is at the top or bottom of the network does not affect the positive properties of the hybrid architecture. The sixth example, depicted in FIG. 13F shows a 32-port switching network comprising a Banyan network 1202, an extra stage 1204 and an CGISIC network 1206 generated from a variant of the standard group generator. This network differs from that of FIG. 13A in that the ISIC network 1206 utilizes a different generator than that of CGISIC network 1106. The seventh example depicted in FIG. 13G, shows a 32-port switching network comprising a BOP network 1222, an extra stage 1224 and an CGISIC network 1226 generated from a variant of the standard group generator. ISIC network 1226 uses the same generator as that of the ISIC network 1206.

Figure 1C:
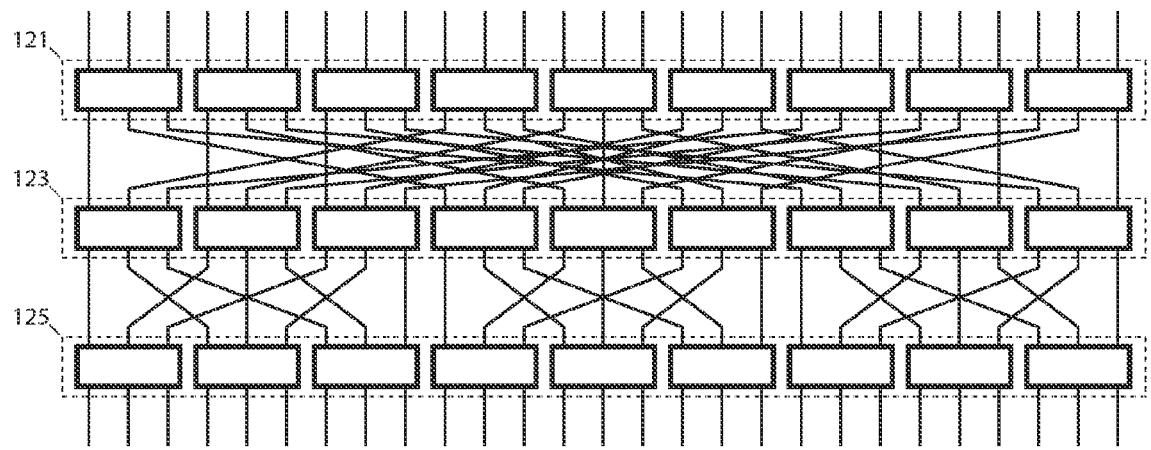
FIG. 1C shows a 54-port trinary Banyan multistage switching network with three TOWS.
Figure 1E:
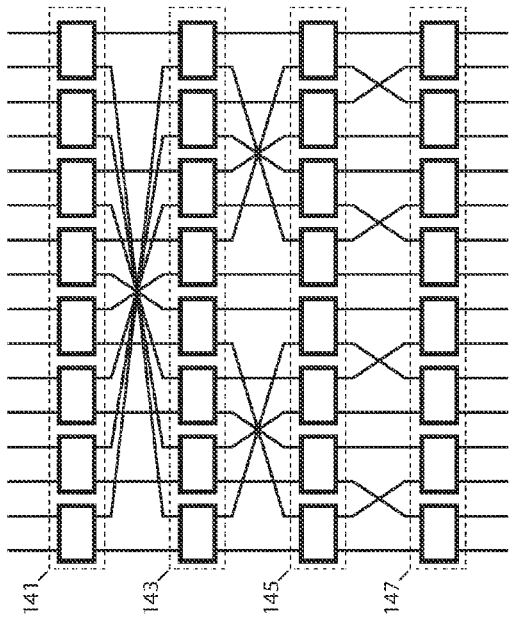
FIG. 1E shows a 32-port crossover multistage switching network with four rows.
Figure 1G:
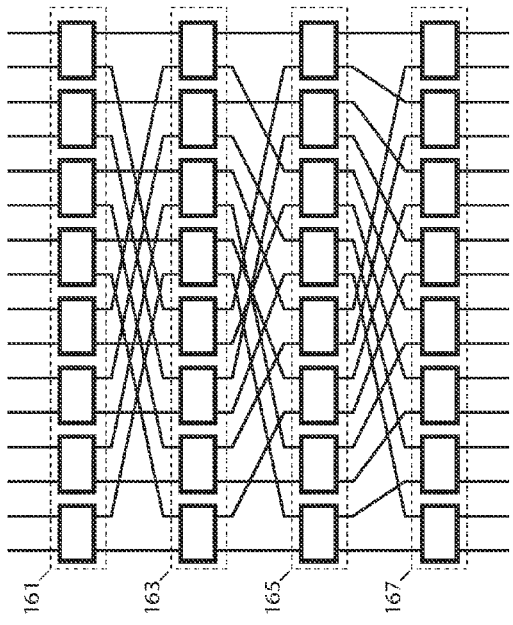
FIG. 1G shows a 32-port BOP multistage switching network with three four rows.
Figure 1D:
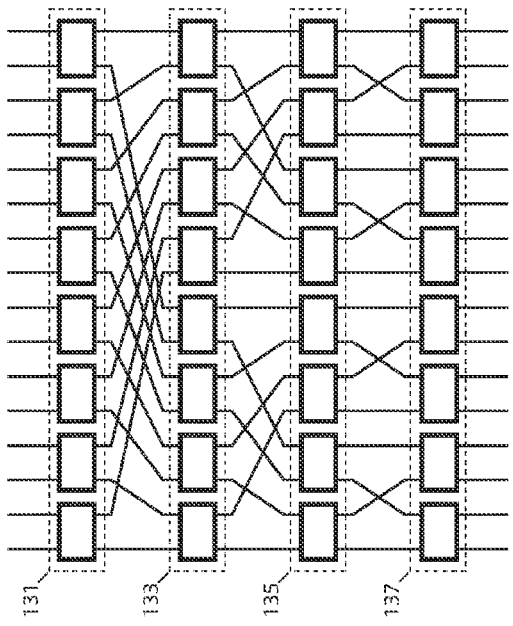
FIG. 1D shows a 32-port delta multistage switching network with four rows.
Figure 1F:
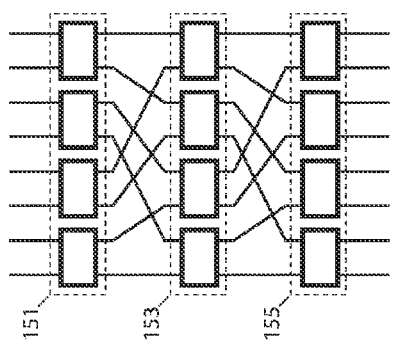
FIG. 1F shows a 16-port omega multistage switching network with three rows.
Figure 2A:
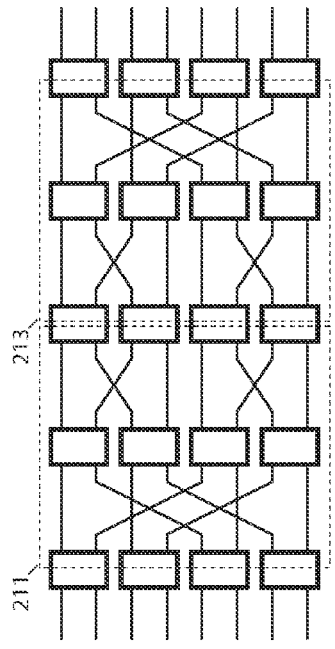
FIG. 2A shows a 16-port Benes network.
Figure 2B:
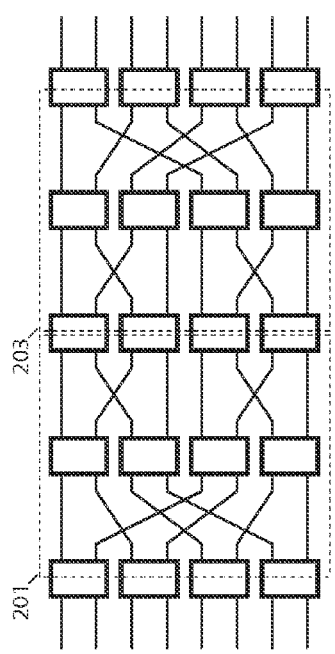
FIG. 2B shows a reconfigured 16-port Benes network that comprises two Banyan networks.
Figure 2D:
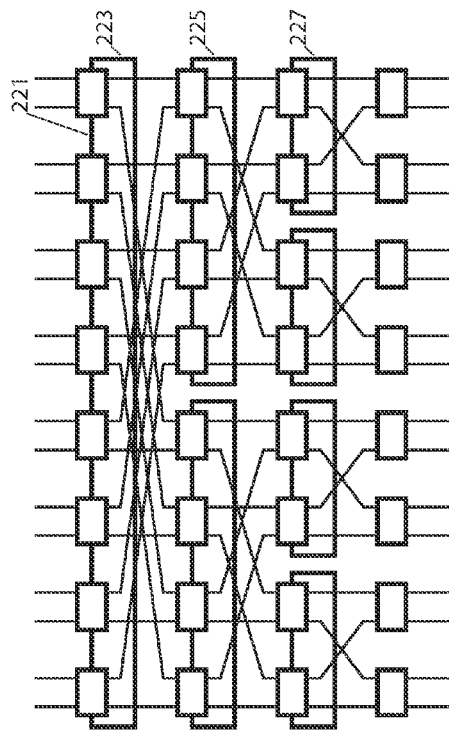
FIG. 2D shows a 32-port augmented shuffle-exchange network.
Figure 2C:
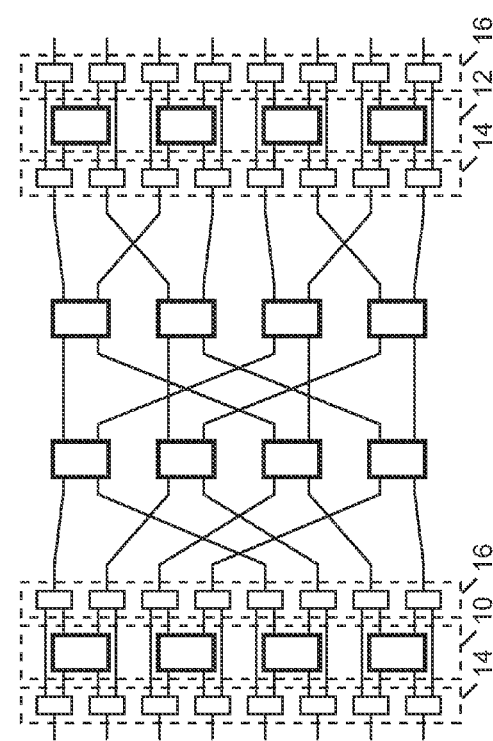
FIG. 2C shows a 16-port extra stage cube network.
Figure 3A:
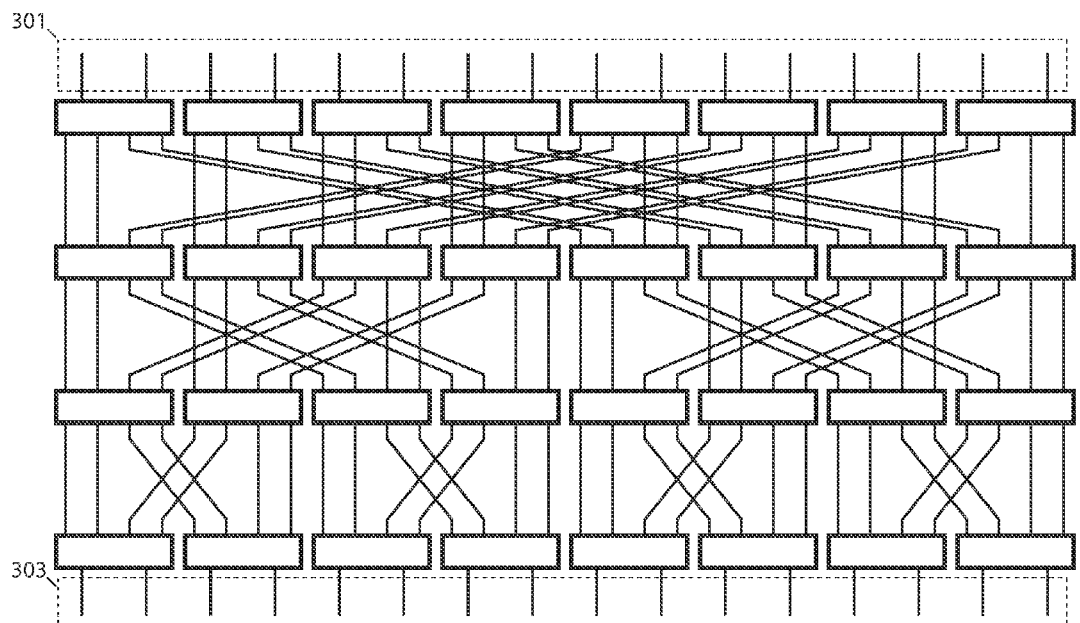
FIG. 3A shows a dilated Banyan network.
Figure 3B:
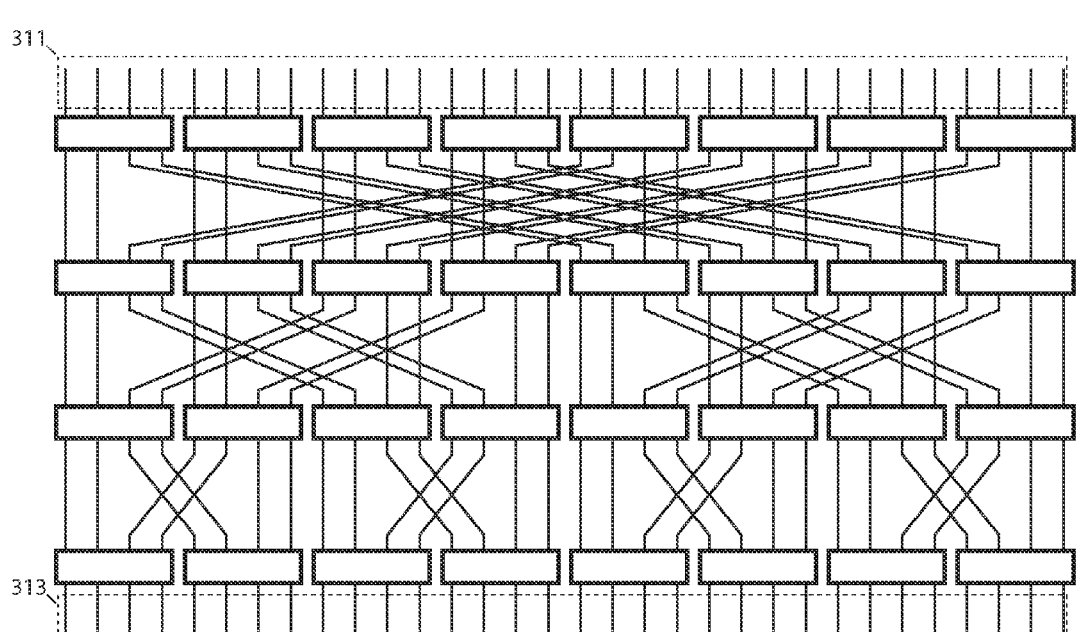
FIG. 3B shows a dilated Banyan network with 32 external ports added.
Figure 4A:
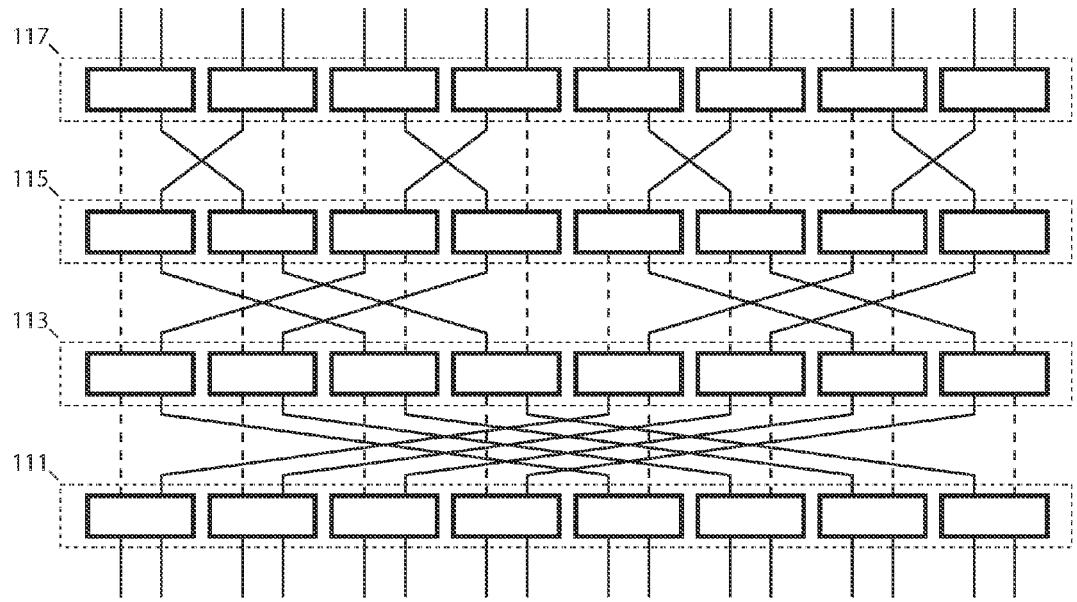
FIG. 4A shows an inverted 32-port Banyan network.
Figure 4B:
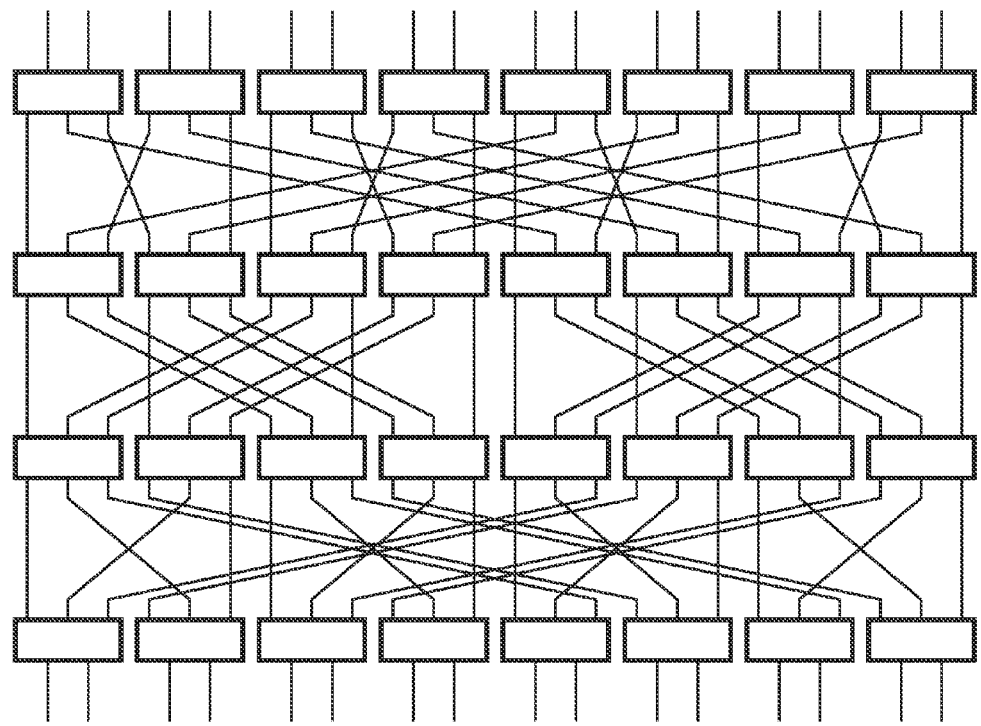
FIG. 4B shows a Banyan network overlaid on an inverted Banyan network.
Figure 13H:
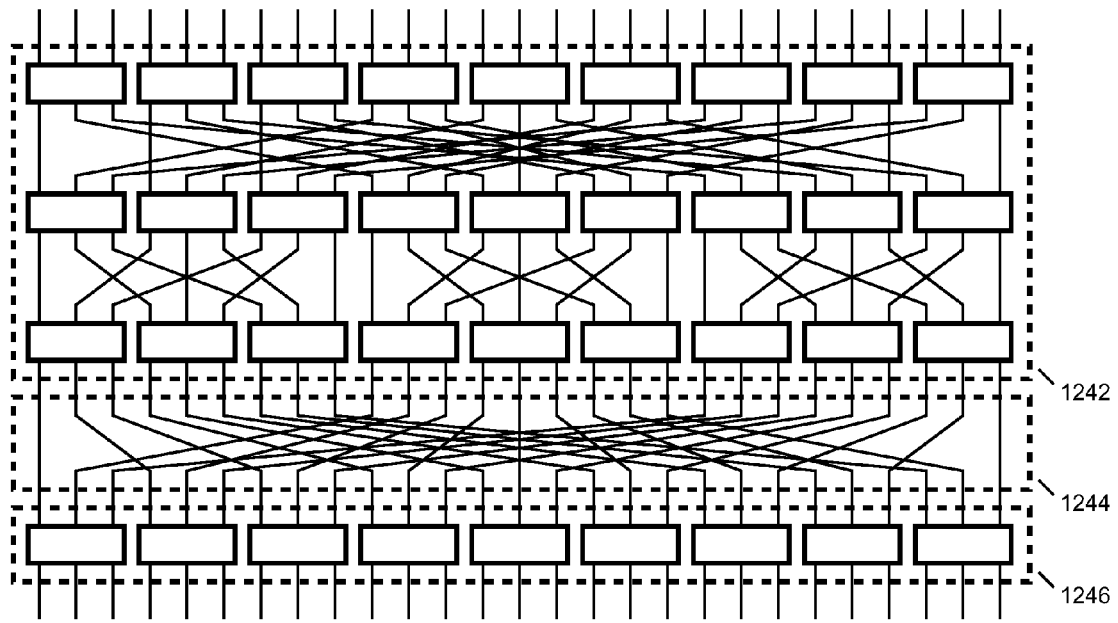
FIG. 13H shows a 54-port trinary Banyan network augmented with an extra trinary CGISIC network stage at the bottom of the network.

Finally, the eighth example depicted in FIG. 13H, shows a 54-port switching network comprising a trinary Banyan network 1242 like the one shown in FIG. 1C, an extra stage 1244 and a CGISIC network 1246 designed for switching elements of fanout of three.

An extra stage augmentation of fixed radix switching networks yields networks whose width is constrained to a power of the radix which typically is the fanout of each switching element. For example, FIGS. 13A-13G still have a width which is a power of two, although, they are no longer confined to a height which is radix-based logarithm of the width (i.e. $\log_F W$). Additional methods to augment many of the traditional multistage switching network architectures are given in the forthcoming examples.

Figure 14A:
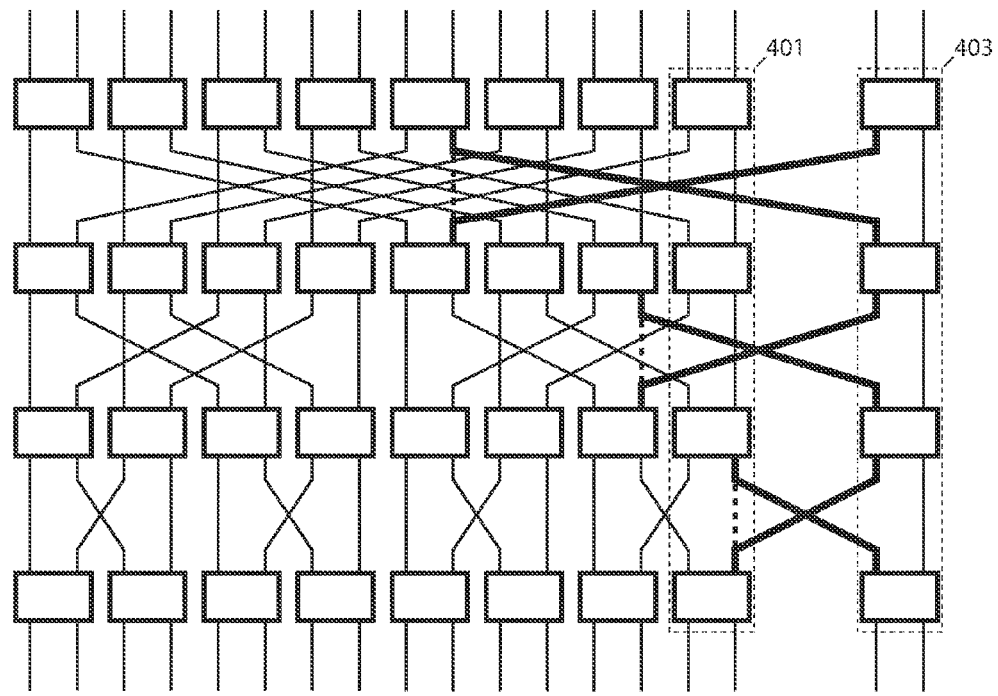
FIG. 14A and FIG. 14B show an augmentation to the traditional Banyan network by addition of a single column.
Figure 14B:
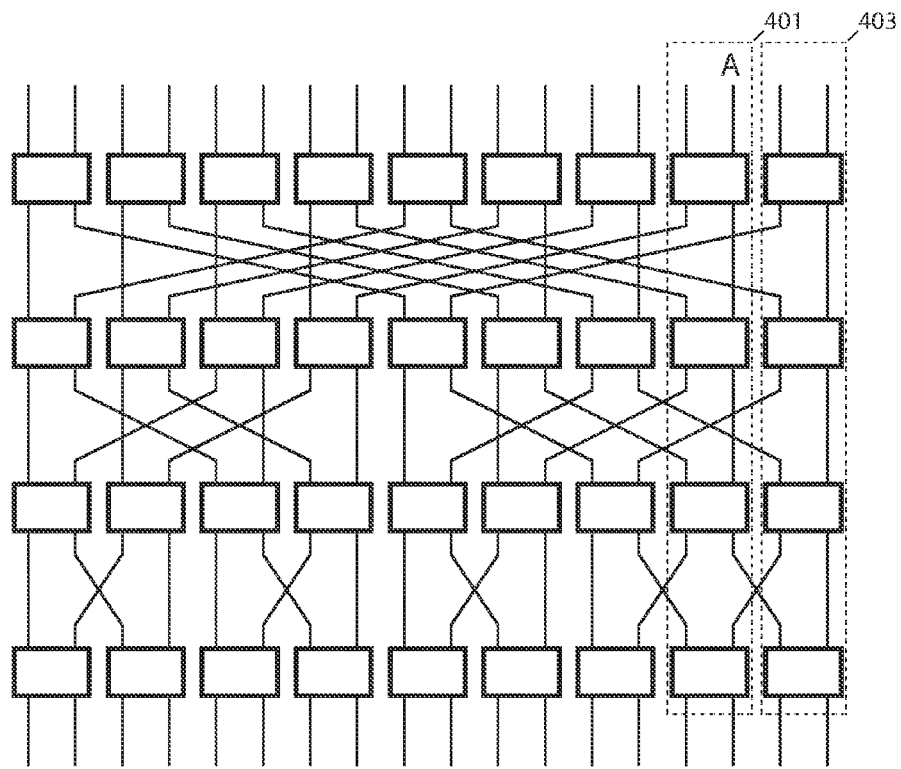

FIG. 14A shows a creation of a 36-port architecture from a standard 32-port Banyan network. The $8^{th}$ column (401) is duplicated into a $9^{th}$ column (403) adjacent to the original Banyan network. The new connections shown in bold can be connected to the original Banyan network. The dotted lines indicate connections that broken to accommodate the new connections. The result of this "last column" duplication is shown in FIG. 14B. It stands to reason that since the original Banyan network is functionally connected, the addition of an extra column would leave some inputs unable to communicate to some outputs. For example, there is no path between external port A to external port B.

Figure 14E:
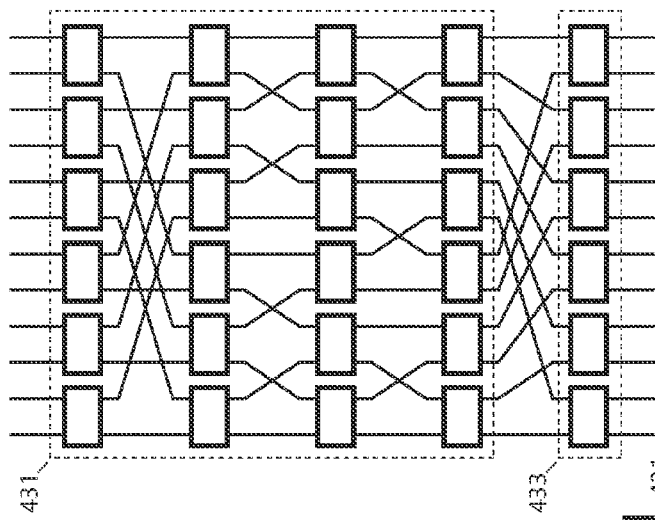
FIG. 14E shows the altered Banyan network further augmented with an extra inverted CGISIC network stage at the bottom of the network.
Figure 14D:
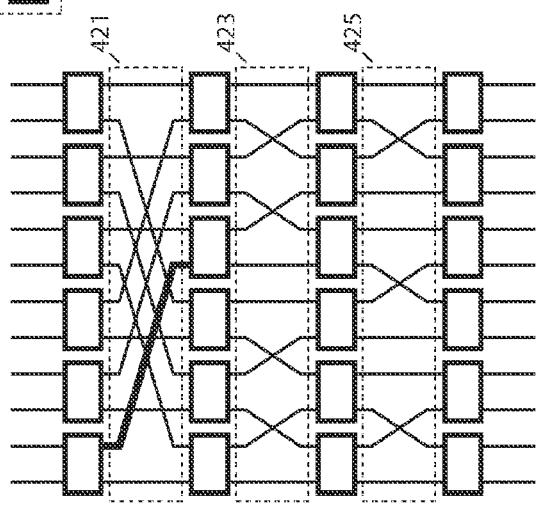
FIG. 14D shows an altered Banyan network where a non-traditional "stride" value is used.
Figure 14C:
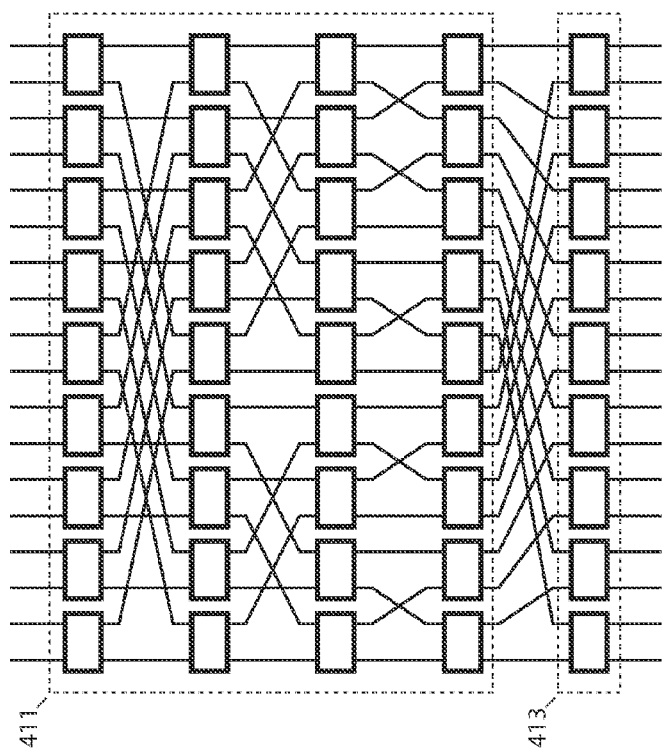
FIG. 14C shows the same augmented Banyan further augmented with an extra inverted CGISIC network stage at the bottom of the network.

The augmentation of the network in FIG. 14B (shown as network 411), with extra stage 413 connected by a CGISIC network shown in FIG. 14C not only reestablishes functionally connectivity between external ports, but also introduces some redundant paths between some external ports.

Another method to vary a Banyan network is to adjust the "stride" of the stages. In a traditional 32-port Banyan network, in ISIC network 421, one connection per switching element strides to the $4^{th}$ switching elements in the following stage. In ISIC network 423 the stride is two. In ISIC network 425, the stride is one. Normally, the stride is a power of the fanout.

FIG. 14D shows a non-traditional stride length in the topmost ISIC network. The bold connection shows an example of a connection with a stride of three. The second ISIC is augmented by the same kind of "column" augmentation shown in FIG. 14A. The resultant network is a load balanced functionally connected switching network with some fault tolerance. FIG. 14E shows the network (network 431) of FIG. 14D augmented by extra stage 433 connected with a CGISIC network, which bolsters the fault tolerance and permits the network to be further upgraded without disruption of service.

Figure 15A:
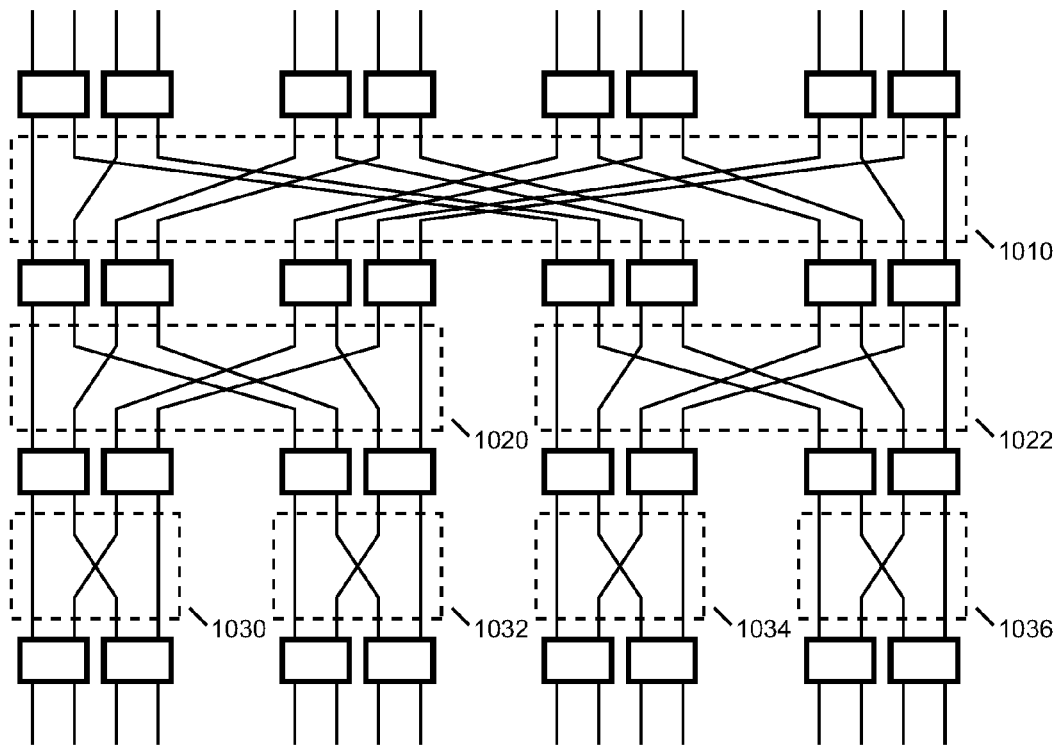
FIG. 15A shows a 32-port delta network.

FIG. 15A shows a delta network. It should be noted that in the delta network, the ISIC networks comprise inverted CGISIC networks. ISIC network 1010 is identical to an inverted CGISIC. ISIC networks 1020 and 1022 are identical to an inverted CGISIC network of a switching network of width 4. ISIC networks 1030, 1032, 1034, and 1036 are identical to an inverted CGISIC network of a switching network of width 2. One method of altering the delta network is to either reduce or increase the width, and to substitute an inverted CGISIC network of the appropriate width to compensate for the change in width.

Figure 15B:
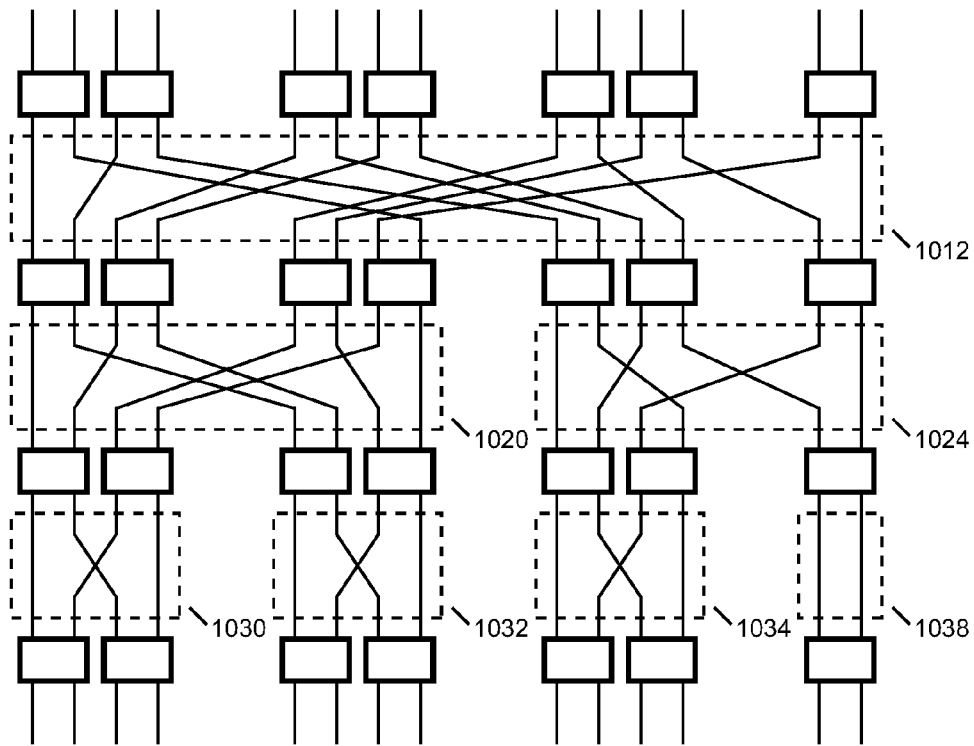
FIG. 15B shows a delta network modified to 28-ports.

For example, FIG. 15B is a modified delta network of width 7. ISIC network 1010 of FIG. 15A is replaced by an inverted CGISIC network 1012 of width 7. ISIC network 1022 of FIG. 15A is replaced by an inverted CGISIC network 1024 of width 3. ISIC network 1036 of FIG. 15A is replaced by an inverted CGISIC network 1038 of width 1.

Figure 15C:
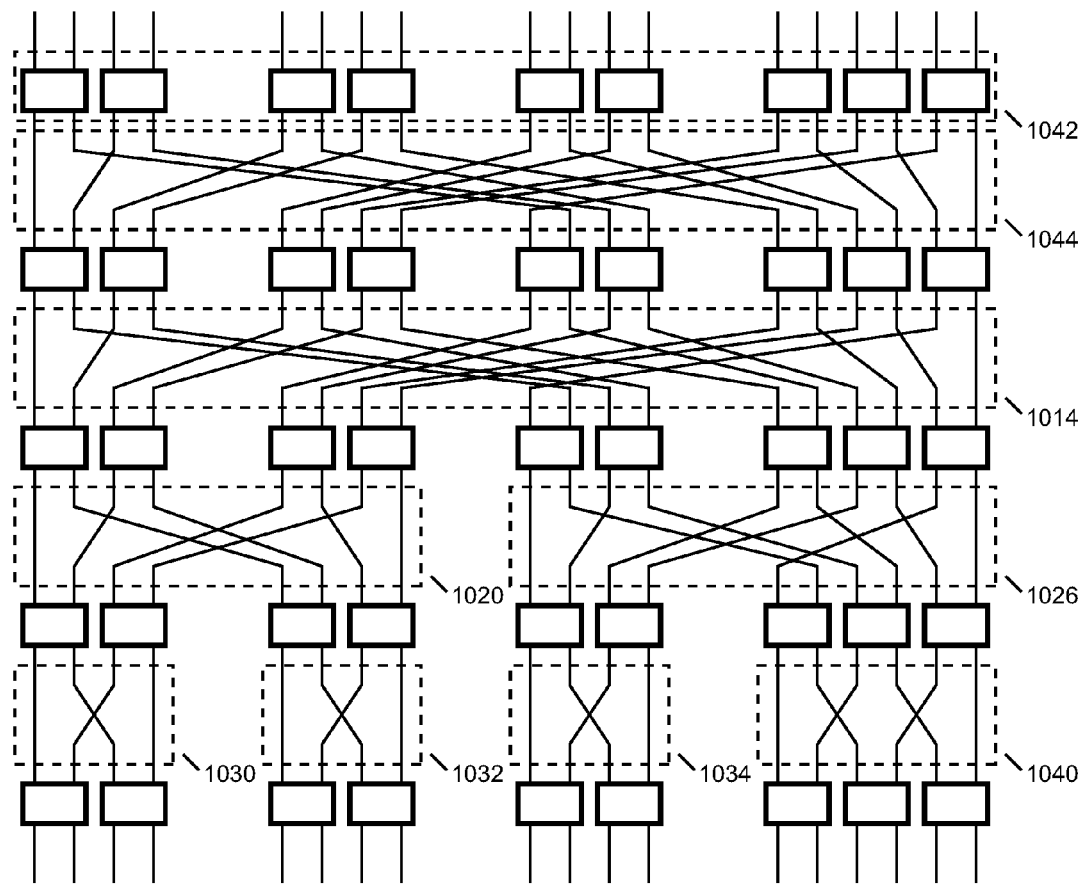
FIG. 15C shows a delta network modified to 36-ports comprising an extra CGISIC network stage.

FIG. 15C is a delta network modified to an increased width of 9. ISIC network 1010 of FIG. 15A is replaced by an inverted CGISIC network 1014 of width 9. ISIC network 1022 of FIG. 15A is replaced by an inverted CGISIC network 1026 of width 5. ISIC network 1036 of FIG. 15A is replaced by an inverted CGISIC network 1040 of width 3. Since the extension of the width would yield a network no longer functionally connected, an extra stage 1042 is added along with another inverted CGISIC network 1044 of width 9.

Unlike the hybrid architectures described above, the method of Cartesian product of switching networks is a design technique and is not intended to be used to alter pre-existing network architectures, but rather to take one or more networks and their ISIC networks as a template for a more elaborate switching network design.

In one embodiment of the design method, more than one RBCCG networks are used as templates. According to Huang in U.S. Pat. No. 5,841,775, the ISIC networks are derived from various possible cyclic groups. Let $G_1$ be such a cyclic group used to generate ISIC networks for an RBCCG with width $W_I$, height H and fanout $F_I$ (henceforth notated as a $W_1 \times H \times F_1$ RBCCG network) and $G_2$ be such a cyclic group used to generate ISIC networks for an RBCCG with width $W_2$, height H and fanout $F_2$. Then the interconnections are given by the group action generated by the Cartesian product $G_1 \times G_2$ of the two groups. This can explicitly be designated mathematically as follows: If $p_1$ represents a port of the $W_1 \times H \times F_I$ RBCCG network, and $G_1$ is the cyclic group action, then $p_1$ is connected to $\pi_{G1}(p_1)$, where $\pi_{G1}$ denotes the interconnection mapping defined by the group $G_1$. Similarly, if $p_2$ represents a port of the $W_2 \times H \times F_2$ RBCCG network, and $G_2$ is the cyclic group action, then $p_2$ is connected to $\pi_{G2}(p_2)$. The new connection mapping is defined for the two-dimensional extension as $\pi_{G1 \times G2}:(p_1, p_2) \to (\pi_{G1}(p_1), \pi_{G2}(p_2))$, where the port labeling is given by the ordered pair $(p_1, p_2)$.

Figure 16A:
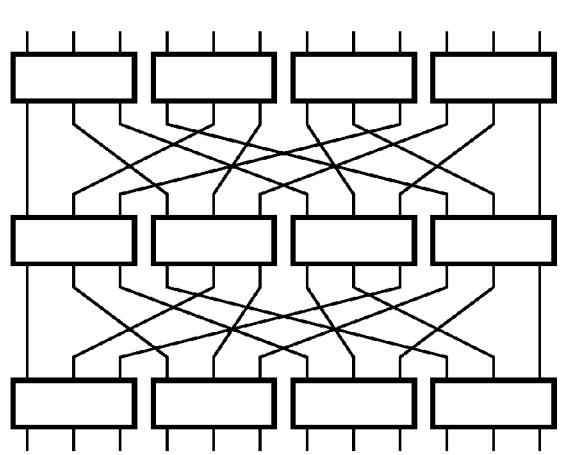
FIG. 16A and FIG. 16B show a 24-port RBBCG network and a 12-port RBCCG network, respectively, with per switching element fan-outs of 3 and 2 respectively.
Figure 16B:
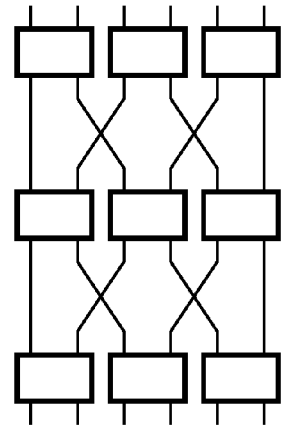

In an exemplary embodiment of multidimensional extensions of an RBCCG network, two balanced RBCCG networks depicted in FIG. 16A and FIG. 16B serve as templates. The balanced RBCCG network depicted in FIG. 16A has a fanout of 3 and a width of 4, which serves as the template in the $x_1$ direction, while the balanced RBCCG network depicted in FIG. 16B has a fanout of 2 and a width of 3, and servers as the template in the $x_2$ direction. Together they are used to constructed a two-dimensional RBCCG network with H=3, $W_1$=4, $F_1$=3, $W_2$=3, and $F_2$=3. In this example, the group generators are selected as such to generate a symmetric shuffle. FIG. 17A shows numerically the port mapping ($\pi_{G1}$) from the bottom ports of one stage of switching elements to the top ports of the next stage of switching elements corresponding to the ISIC networks shown in FIG. 16A. For instance, as a result of the mapping, bottom port 7 should be connected to top port 10, bottom port 2 should be connected to top port 6, etc. Similarly FIG. 17B shows numerically the port mapping ($\pi_{G2}$) from the bottom ports of one stage of switching elements to the top ports of the next stage of switching elements corresponding to the ISIC networks shown in FIG. 16B. The composite mapping ($\pi_{G1 \times G2}$) is shown in FIG. 17C. It should be noted that since the ISIC networks of both switching networks in FIG. 16A and FIG. 16B are identical between adjacent stages, the resultant Cartesian product network has identical ISIC networks between adjacent stages.

Furthermore, it should be noted that each component of the ordered pair is mapped independently. For example, according to FIG. 17A, bottom port 7 should map to top port 10 of the subsequent stage. Clearly, according to FIG. 17C, bottom port (7,*) maps to top port (10,**) of the subsequent stage, regardless of the value of the second component of the ordered pair. Additionally, the second component need not be the same and in fact is mapped according to the mapping defined in FIG. 17B. For example, according to FIG. 17B, bottom port 3 should map to top port 1 of the following row. Clearly, according to FIG. 17C, bottom port (*,3) maps to top port (**,1) of the following plane regardless of the value of the first component of the ordered pair.

FIGS. 18A-18G are intended to illustrate a three-dimensional rendering of the resultant network. Each subfigure represents a different perspective on the Cartesian product of the two RBCCG networks. Though the details can be difficult to discern from some of the detailed diagrams, the overall description of the resultant network should be clear to one of ordinary skill in the art through the perspective of all the subfigures.

Figure 18B:
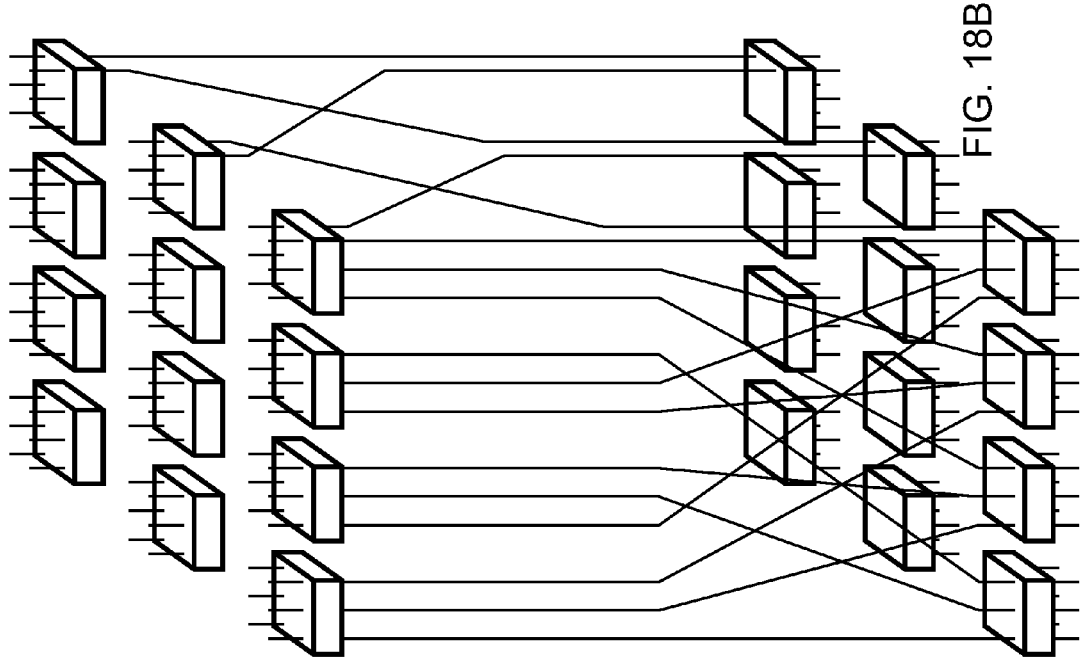
FIG. 18B shows the same interconnection network from the Cartesian product RBCCG network with only the near connections visible.
Figure 18A:
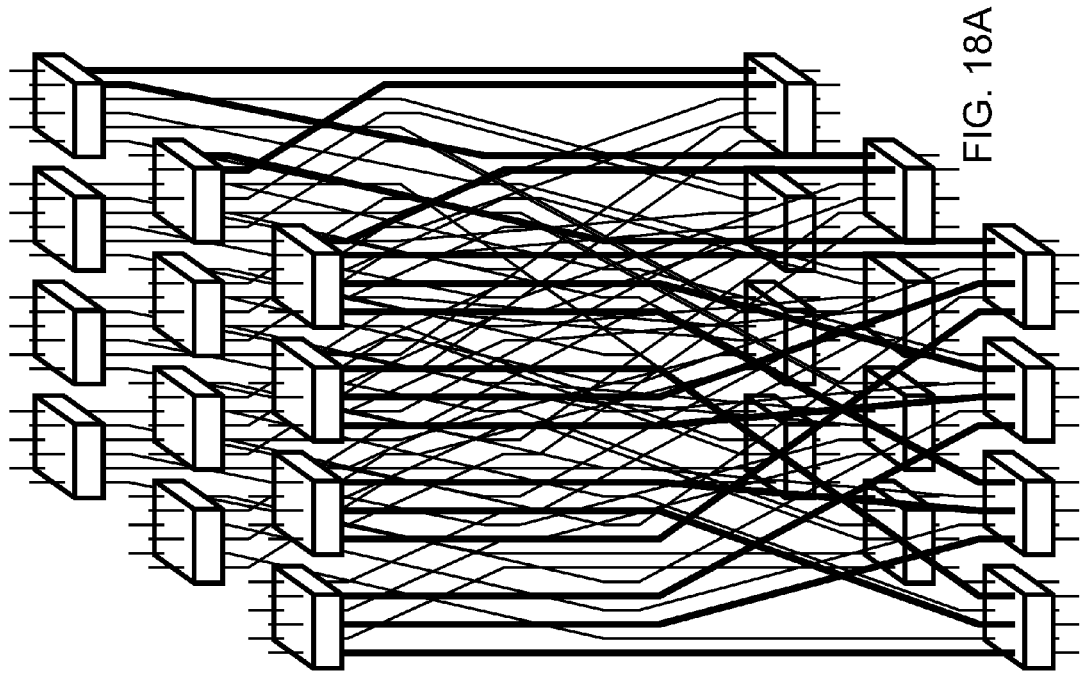
FIG. 18A shows one interconnection network from the Cartesian product RBCCG network with the $x_1$ interconnection separated from the $x_2$ interconnections in two stages.
Figure 18E:
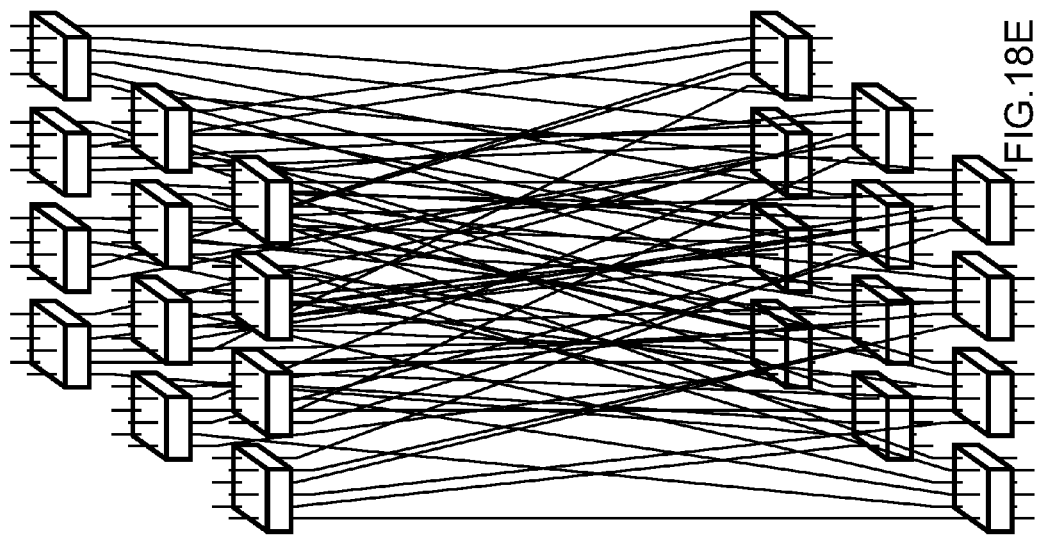
FIG. 18E shows one interconnection network from the Cartesian product RBCCG network, without separating the orthogonal mappings.
Figure 18D:
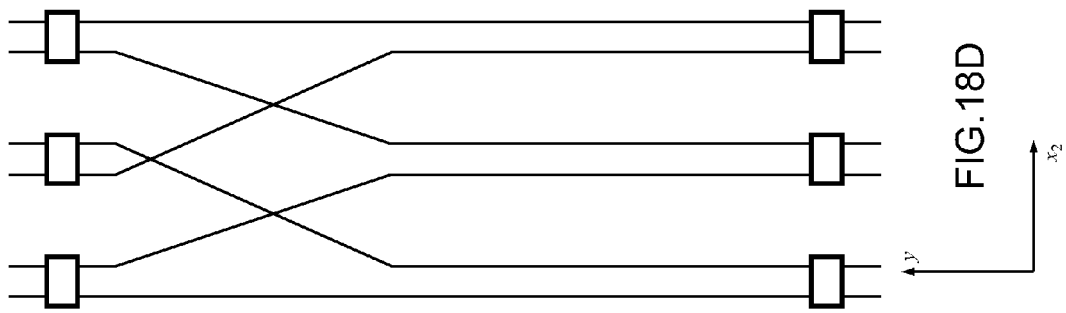
FIG. 18C and FIG. 18D show the cross sectional view of the same interconnection network from the Cartesian product RBCCG network, with respect to the $x_1$-y plane and the $x_2$-y plane, respectively.
Figure 18C:
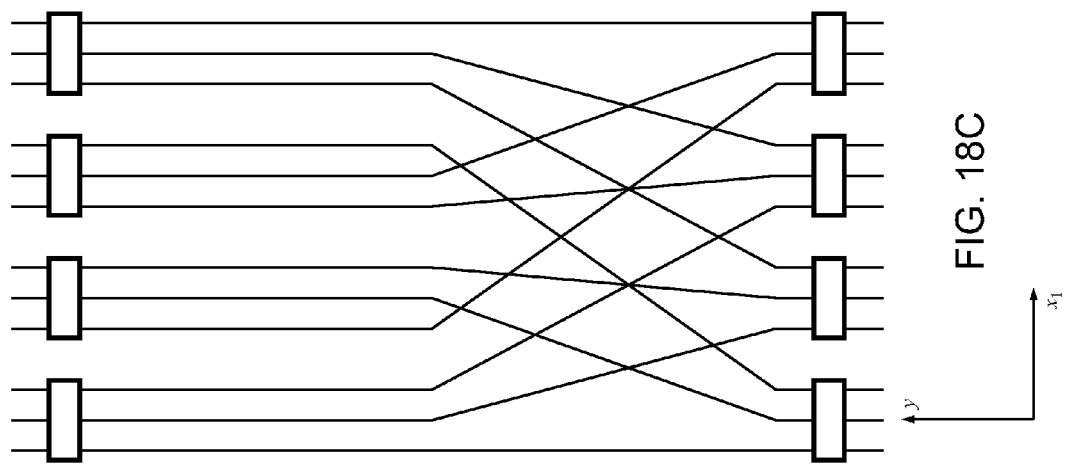
Figure 19:
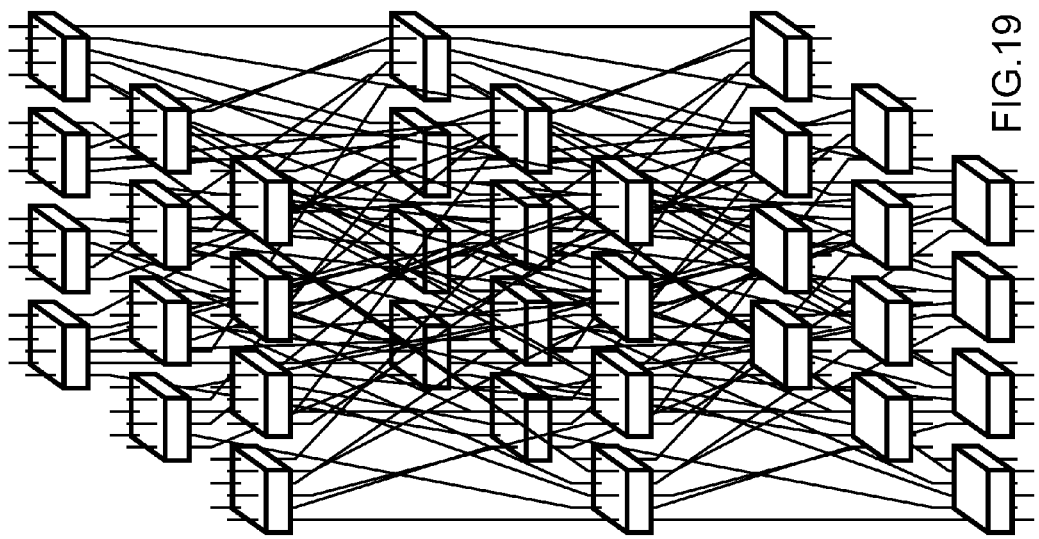
FIG. 19 shows the complete 144-port two-dimensional Cartesian product RBCCG network.
Figure 18G:
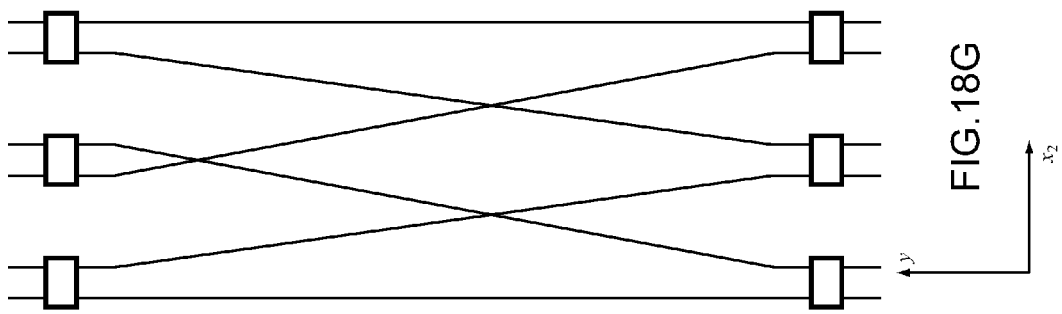
FIG. 18F and FIG. 18G show the cross sectional view of the same interconnection network from the Cartesian product RBCCG network, with respect to the $x_1$-y plane and the $x_2$-y plane, respectively.
Figure 18F:
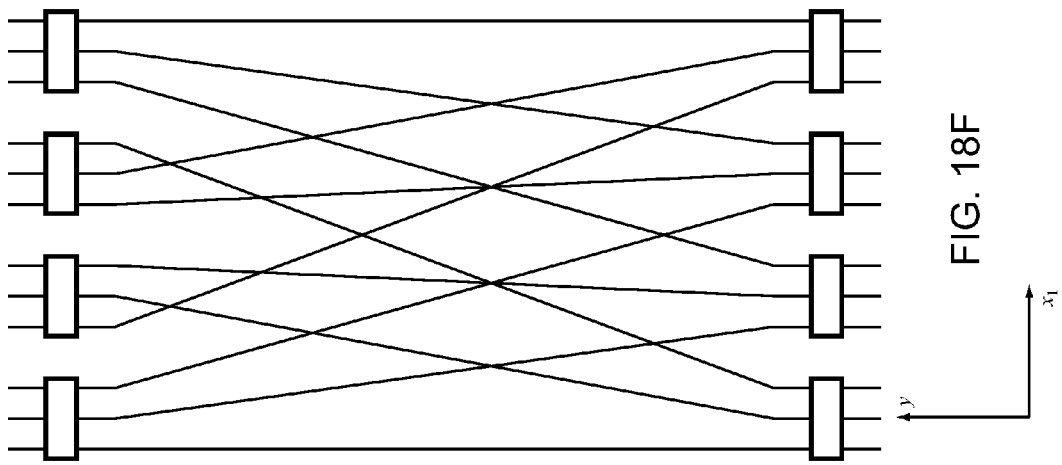
Figure 20A:
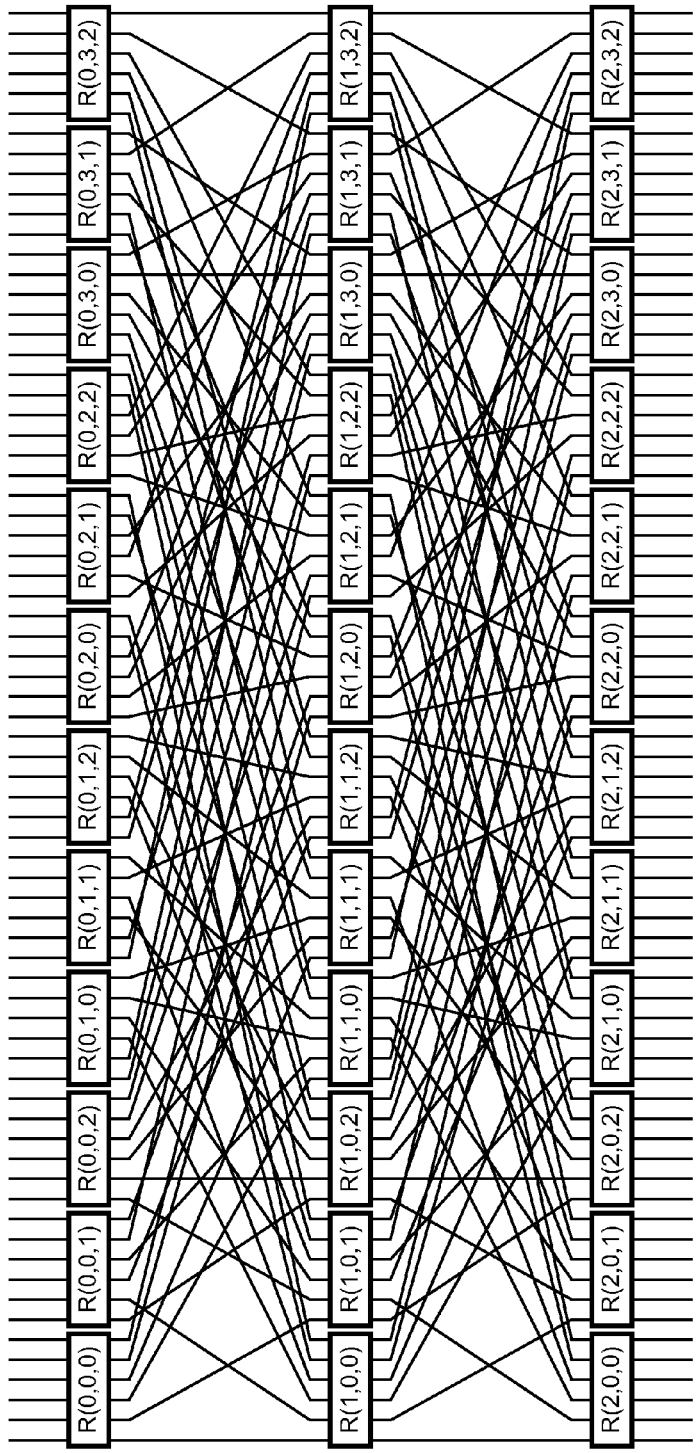
FIG. 20A shows the same complete 144-port two-dimensional Cartesian product RBCCG network but in a "flattened" form, where all the ports and switching elements are drawn in raster scan order.
Figure 20B:
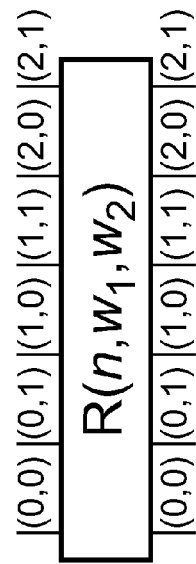
FIG. 20B shows a representative switching element which has been "flattened"

FIG. 18A shows all the connections between two adjacent stages of switching elements with those connections nearest the observation point highlighted with bolder lines. FIG. 18B shows the same interconnection network as FIG. 18A, except only those nearest the observation point are visible. In this particular depiction of the connections, they are broken up into two "phases." The upper phase represents the impact of applying the mapping of FIG. 16B to each $x_2$ component. The lower phase represents the impact of applying the mapping of FIG. 16A to each $x_1$ component. FIG. 18C and FIG. 18D show the side view of the interconnection; that is, FIG. 18C shows the interconnection network along the y-$x_1$ plane, and FIG. 18D shows the interconnection network along the y-$x_2$ plane. FIG. 18E shows the same interconnection network as in FIG. 18A, but without separating the mappings into the $x_1$ and $x_2$ phases. FIG. 18F and FIG. 18G show the interconnection networks along the y-$x_1$ plane and the y-$x_2$ plane, respectively. Finally, FIG. 19 shows the complete RBCCG network, resulting as the "Cartesian" product of the networks depicted in FIG. 16A and FIG. 16B. FIG. 20A shows a planar or "flattened" version of the network shown in FIG. 19. In this representation, the switching elements $R(n,w_1,w_2)$ are depicted in a raster scan fashion as are their ports. The raster scan ordering of the ports is shown in a single exemplar shown in FIG. 20B. Though the intricacy of the details are already difficult to resolve in two dimensions, mathematically they are easy to implement.

The extension described above apply to even higher dimensions follow from this example. For an n-dimensional Cartesian product of RBCCG networks, it would have a height, H, and n widths, $W_1, W_2, \ldots, W_n$ with n corresponding fanouts $F_1, F_2, \ldots, F_n$. Functional connectivity requires H≧max $(\log_{i1} W_1, \log_F W_2, \log_{Fn} Wn$ and fault tolerance requires ≧max$(\log_{i1} W_1, \log_{F2} W_2, \ldots, \log_{F2} Wn+1$. The mapping is given by the Cartesian product of the generating groups $G_i$ for the $W_i \times H \times F$, RBCCG networks from which they are based. Specifically, the mapping is given as $_{G1 \times G2 \times \ldots \times Gn}:(p_1, p_2, \ldots, p_n) \to (\pi_{G1}(p_1), \pi_{G2}(p_2), \ldots \pi_{Gn}(p_n))$.

The advantages of using a Cartesian product of RBCCG networks is that it reduces the lateral length that some connections take. In a RBCCG network with width $W_1 \times W_2$, some traffic can traverse a distance of up to $W_1 \times W_2$ switching elements. In a two-dimensional RBCCG with widths $W_1$ and $W_2$, which has the same number of switching elements as the $W_1 \times W_2$ width RBCCG network, the traffic would only traverse the square root of $W_1^2 + W_2^2$, a distance which in general is much smaller.

Though described for RBCCG networks, the Cartesian product of two or more networks can be defined in much the same way. The Cartesian product of two networks of equal height is to take the Cartesian product of their respective interconnection mappings defining each ISIC network. As an example of this method, FIG. 21A depicts a balanced RBCCG network and FIG. 21B depicts a Banyan network. The mapping of the ISIC network of FIG. 21A is shown in FIG. 22A. The mapping of the upper ISIC network of the Banyan network shown in FIG. 21B is shown in FIG. 22B and the mapping of the lower ISIC network is shown in FIG. 22C. The mapping of the Cartesian product of the two networks are shown in FIG. 22D for the upper ISIC network and FIG. 22E for the lower ISIC network. For clarity sake, no additional diagrams or depictions are shown, but one of ordinary skill could easily render such a network.

Since the Banyan network has no fault tolerance, the resultant network is not uniformly fault tolerant. It should also be noted that as a result, upgrade of such a network can not be achieved without disruption of service. Like the multidimensional design technique, the overlaying process of switching network design is intended to be a design process, and not a process to directly upgrade an existing infrastructure. However, it is possible if each switching element can be augmented with additional physical ports to use this method to reconfigure an existing network. A product of the overlaying process, a design can bolster the fault tolerance of a network and reduce latency in many cases. As is evident, the methods described herein can be applicable to more than two networks and in higher dimensions. For clarity, the embodiment of the overlaying process involving two networks is described in detail.

One embodiment of the overlaying process receives two multistage switching networks. One of the two networks is rotated by 90 degrees so that the top ports become left ports and the bottom ports become right ports (or equivalently top ports can become right ports and bottom ports can become left ports.) The two networks are registered so that wherever possible, switching elements are made to overlap. In an example where the first network has height H and width W, and the second network has height W and width H, the switching elements can be made to completely coincide. Once the two networks are registered and overlaid, whenever two switching elements overlap, a single switching element is defined at that location having the same ports as the two switching elements it replaces.

Figure 23:
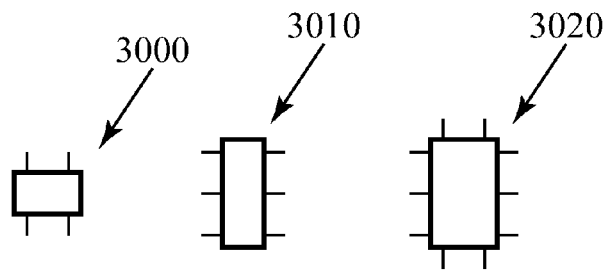
FIG. 23 shows how two switching elements that overlay in the overlay process are combined into one switching element.

FIG. 23 illustrates this process: switching element 3000 depicts a switching element with two top ports and two bottom ports. Switching element 3010 depicts a switching element from a rotated multistage interconnection network with three right ports and three left ports. If these two switching elements are overlaid, they are replaced by switching element 3020, which has two top ports, two bottom ports, three right ports and three left ports.

Furthermore, the ISIC networks of the first network become the IRIC networks of the resultant overlaid networks, and the ISIC networks of the second network become the ICIC networks of the resultant overlaid network.

In the example to follow, a first network and a second network are overlaid to form a resultant third network. In each situation, a variety of differing multistage interconnection networks are combined, illustrating the versatility of this technique.

Figure 24A:
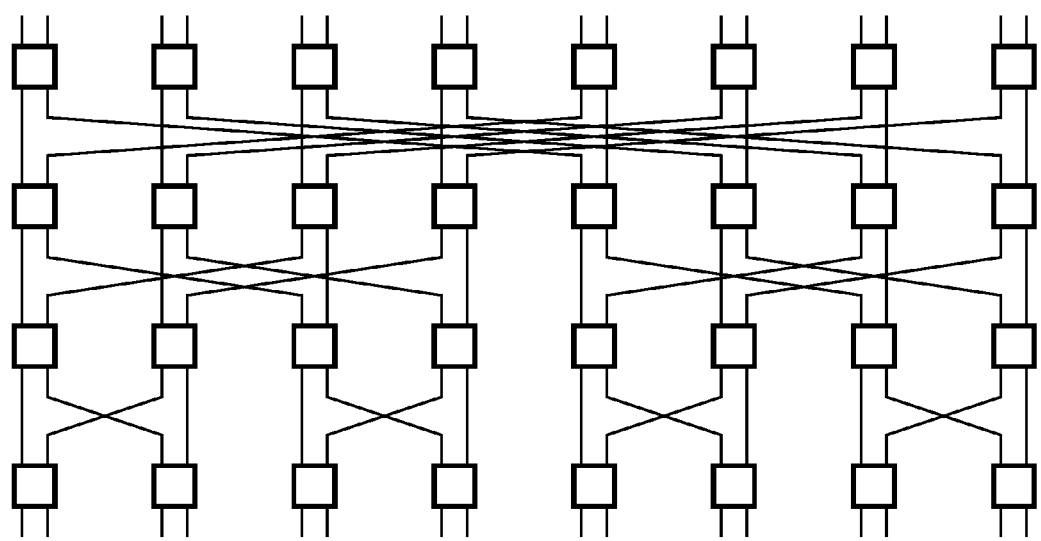
FIG. 24A, FIG. 24B and FIG. 24C show the process of a perpendicular overlay of a 32-port Banyan network and a 16-port, 8-stage RBCCG network.
Figure 24B:
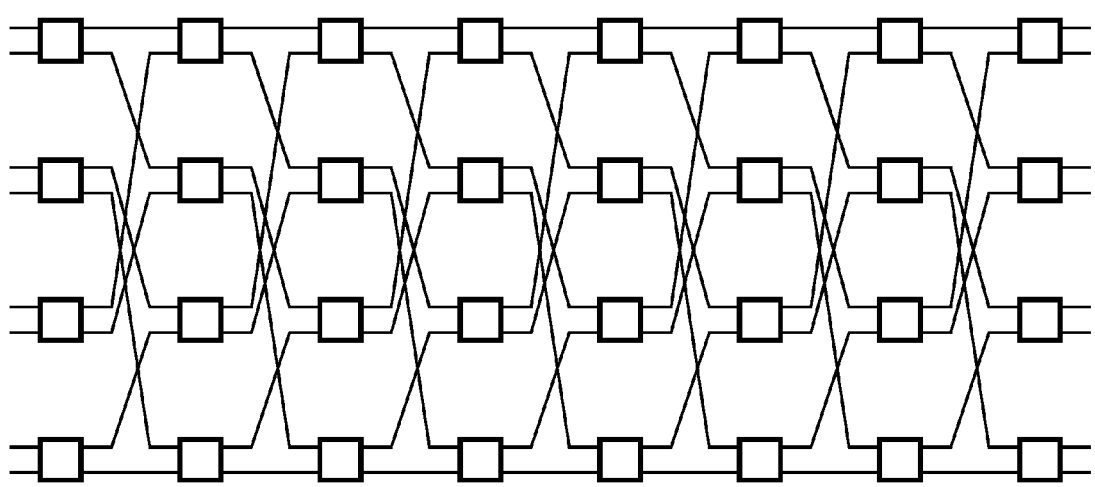
Figure 24C:
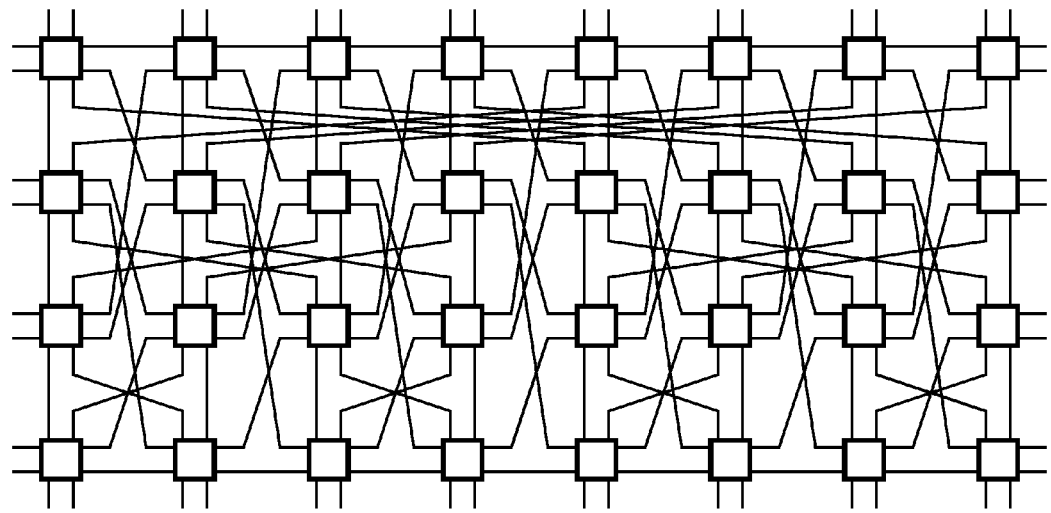
Figure 24D:
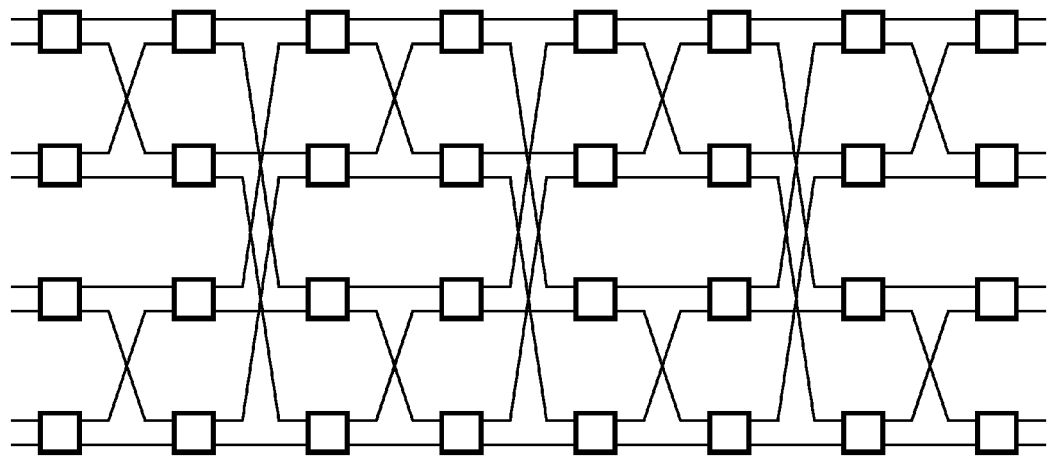
FIG. 24D and FIG. 24E show the process of a perpendicular overlay of a 32-port Banyan network and a 16-port, 8-stage multiple Banyan network.
Figure 24E:
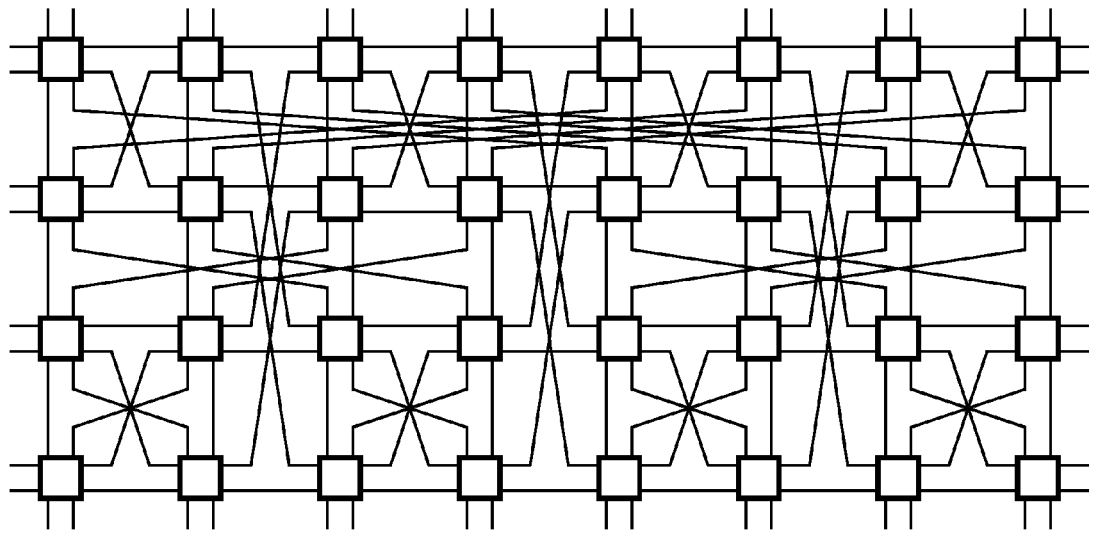

In one embodiment, the Banyan network shown in FIG. 24A with a 4 rows and 8 columns is overlaid on the balanced RBCCG network shown in FIG. 24B with 8 rows and 4 columns and fanout per switching element of 2, resulting in the overlaid switching network shown in FIG. 24C. In another embodiment, the Banyan network shown in FIG. 24A with 4 rows and 8 columns is overlaid on the switching network shown in FIG. 24D comprising three Banyan networks coupled through a common stage of switching elements having 8 rows and 4 columns and fanout per switching element of 2, resulting in the overlaid switching network shown in FIG. 24E.

Figure 25A:
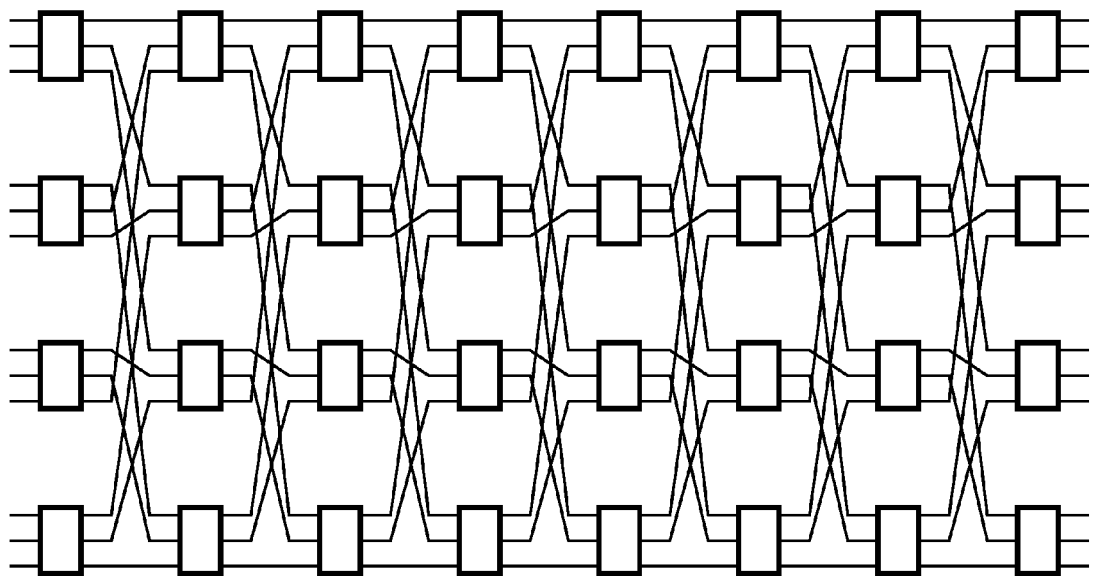
FIG. 25A and FIG. 25B show the process of a perpendicular overlay of a 32-port Banyan network and a 24-port, 8-stage RBCCG network.
Figure 25B:
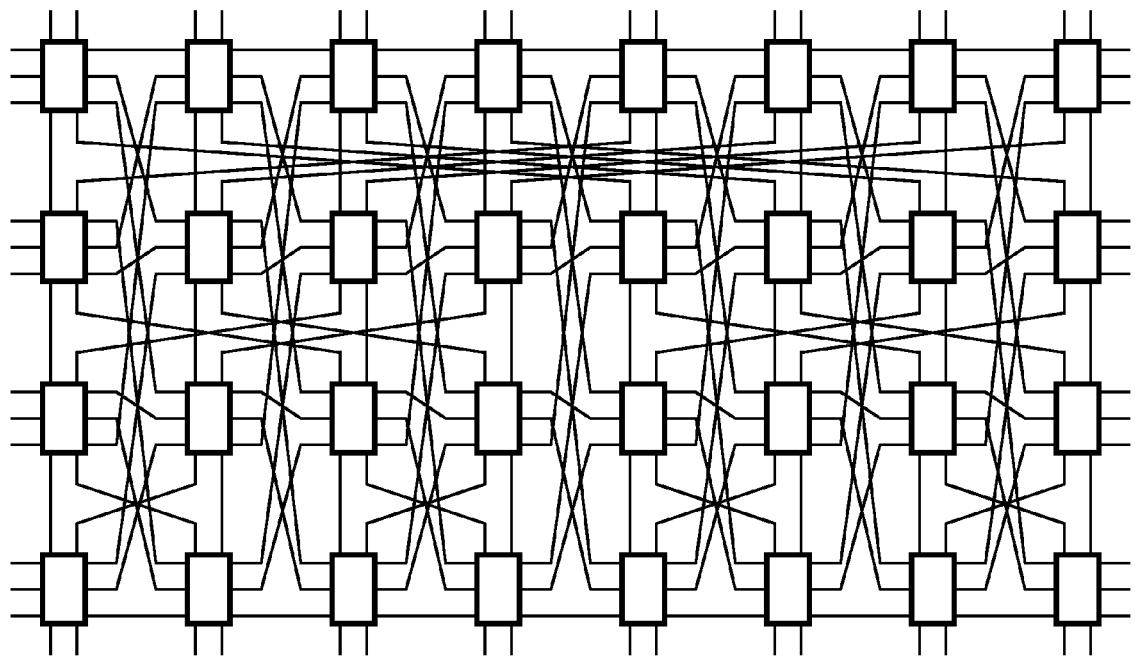
Figure 26A:
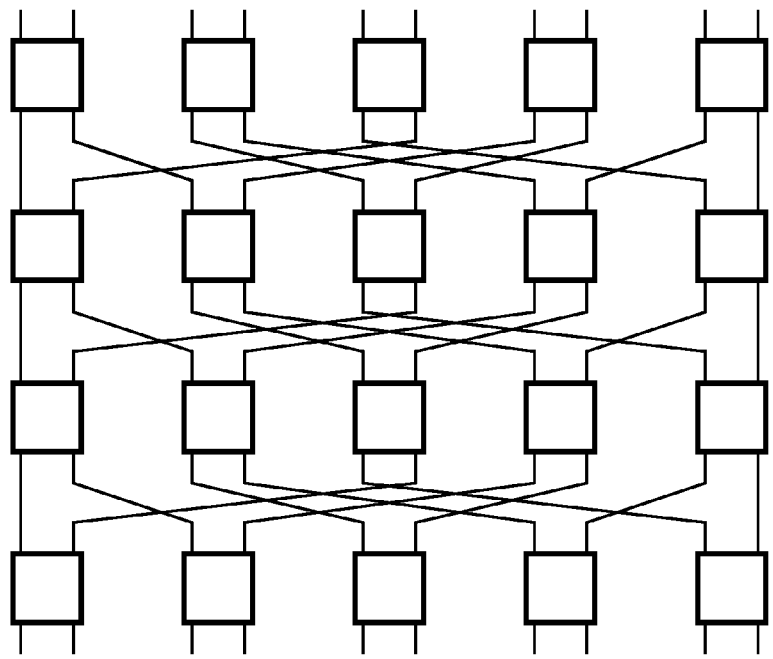
FIG. 26A, FIG. 26B and FIG. 26C show the process of a perpendicular overlay of a 20-port 4-stage RBCCG network and a 24-port, 5-stage RBCCG network.
Figure 26B:
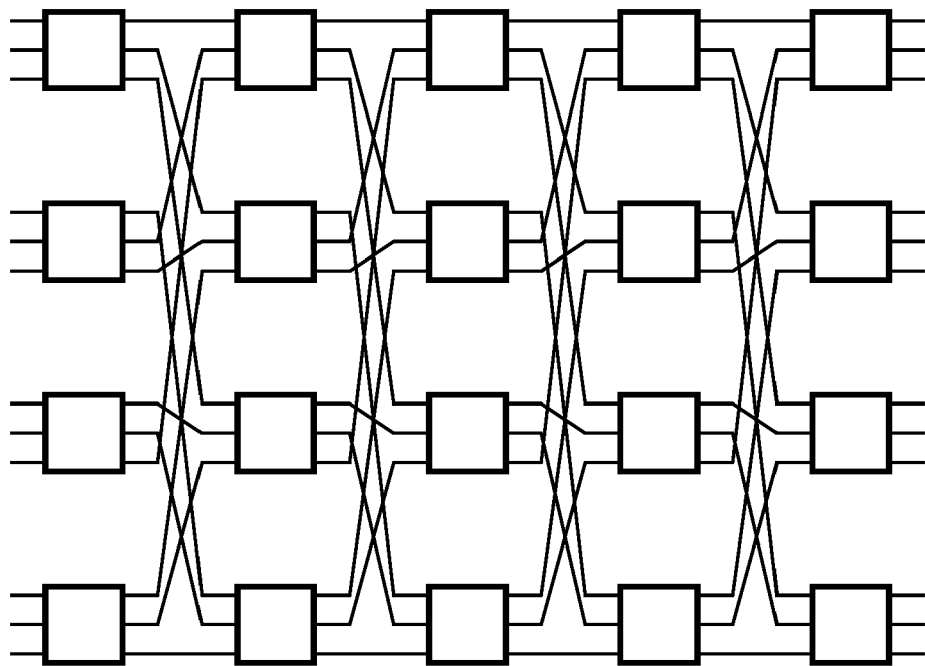
Figure 26C:
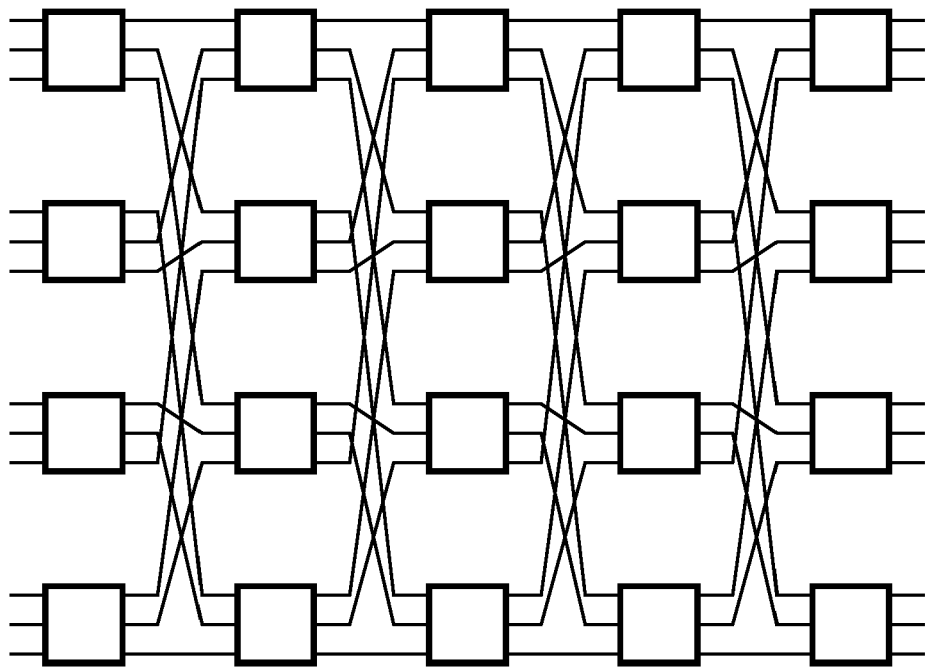
Figure 27A:
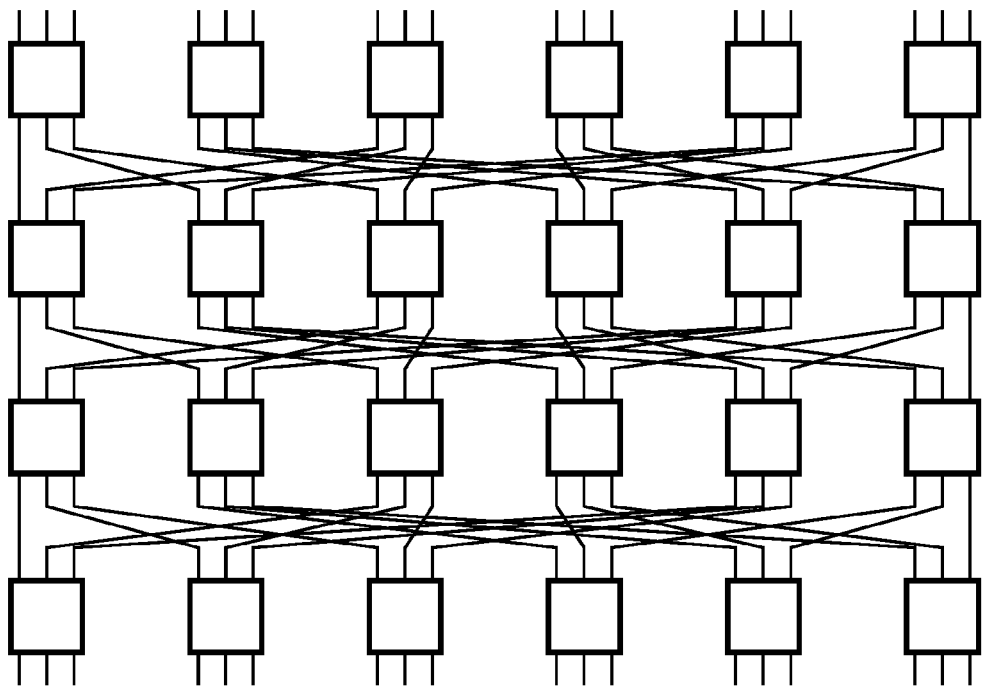
FIG. 27A, FIG. 27B and FIG. 27C show the process of a perpendicular overlay of a 36-port 4-stage RBCCG network and a 24-port, 6-stage RBCCG network.
Figure 27B:
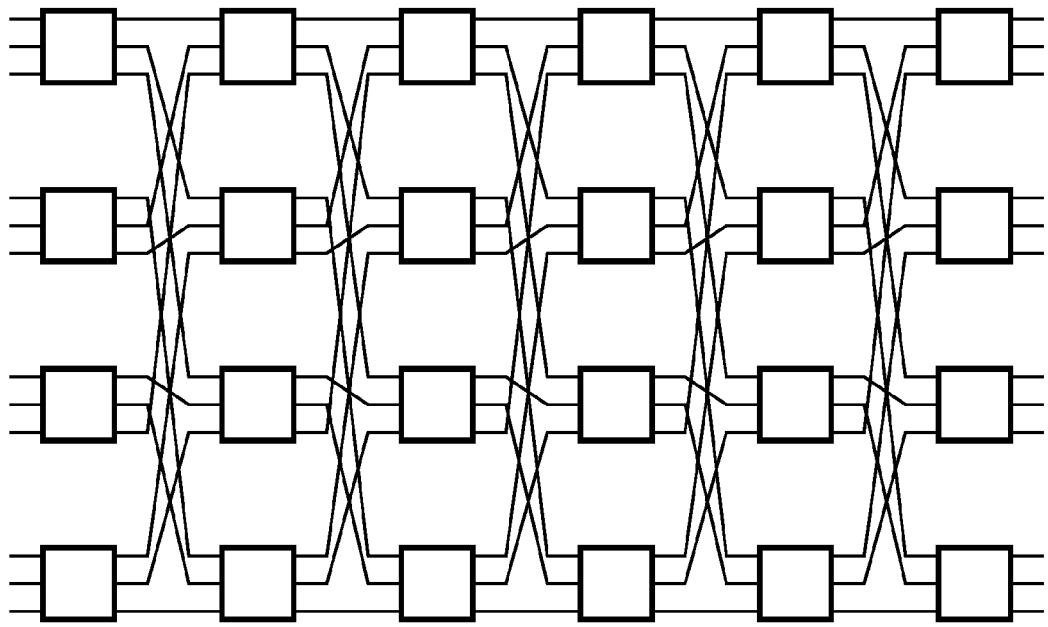
Figure 27C:
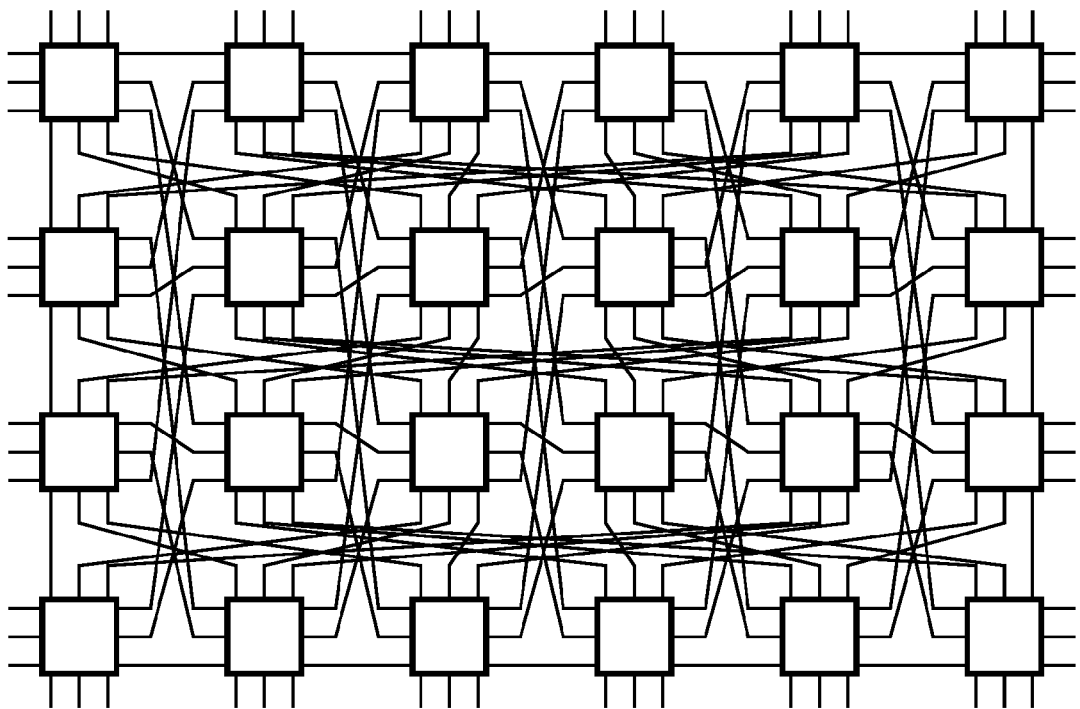
Figure 28A:
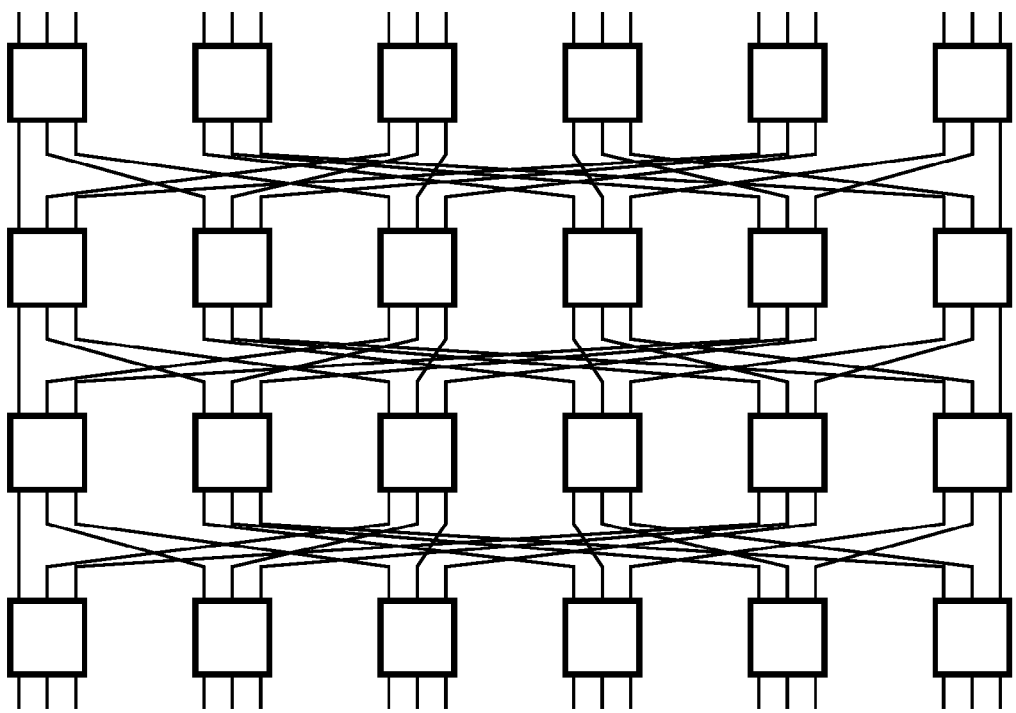
FIG. 28A, FIG. 28B and FIG. 28C show the process of a perpendicular overlay of a 36-port 4-stage RBCCG network and a 32-port, 6-stage RBCCG network.
Figure 28B:
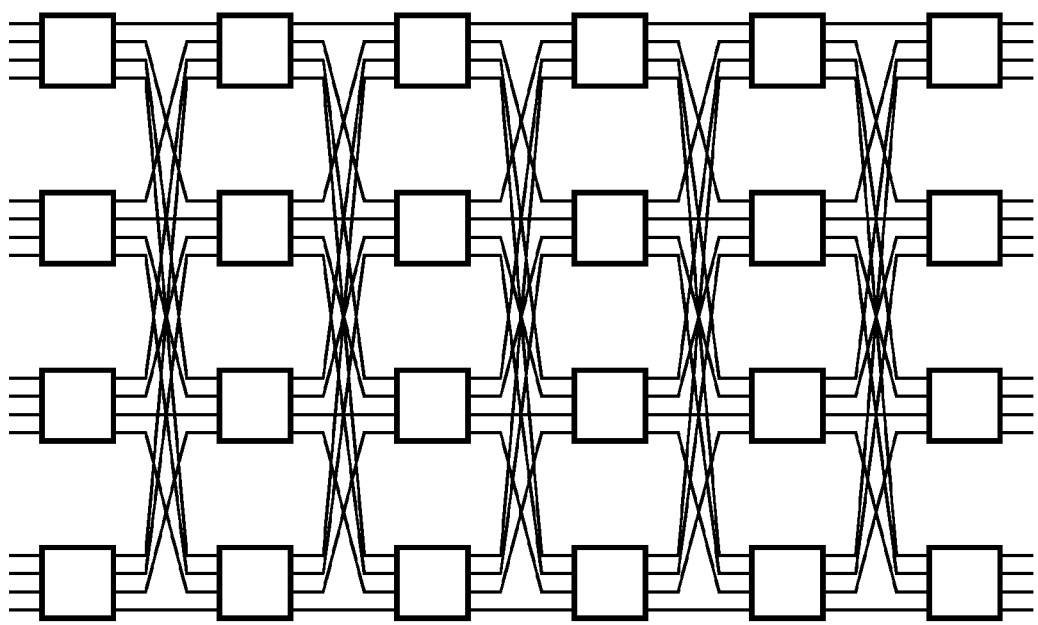
Figure 28C:
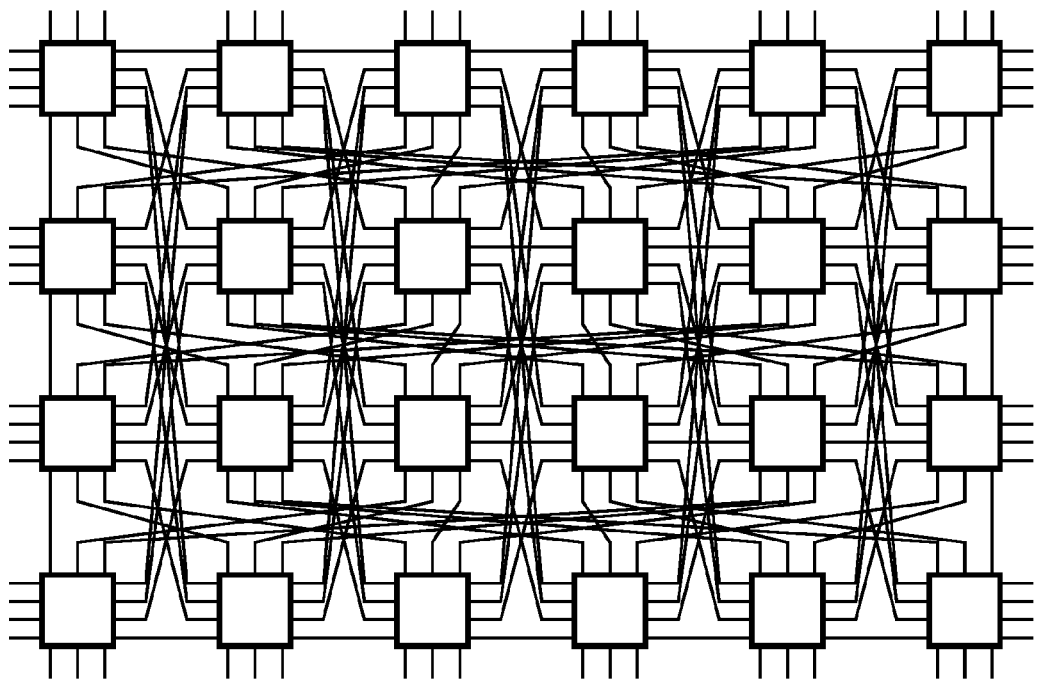
Figure 29A:
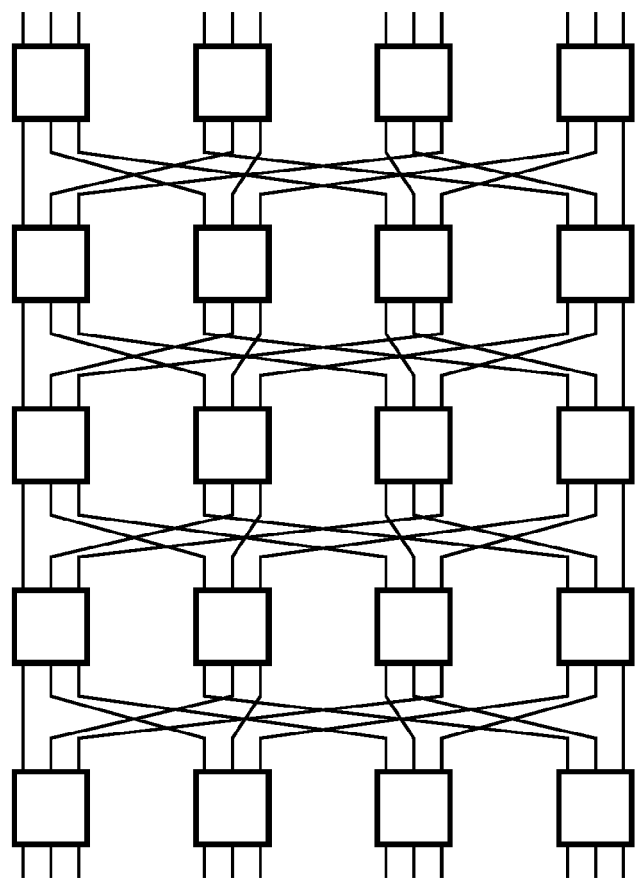
FIG. 29A, FIG. 29B, FIG. 29C, and FIG. 29D show the process of a perpendicular overlay of a 24-port 5-stage RBCCG network and an 18-port, 6-stage RBCCG network, with two types of registration
Figure 29B:
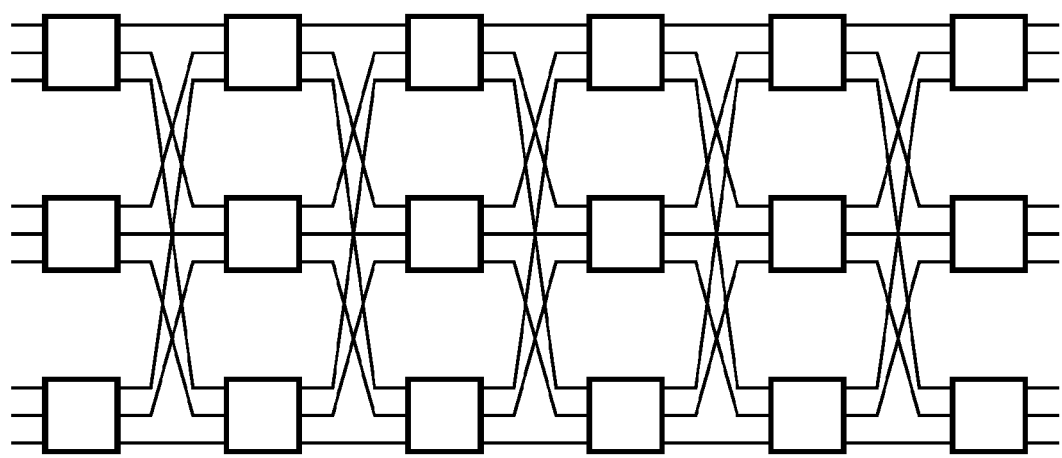
Figure 29C:
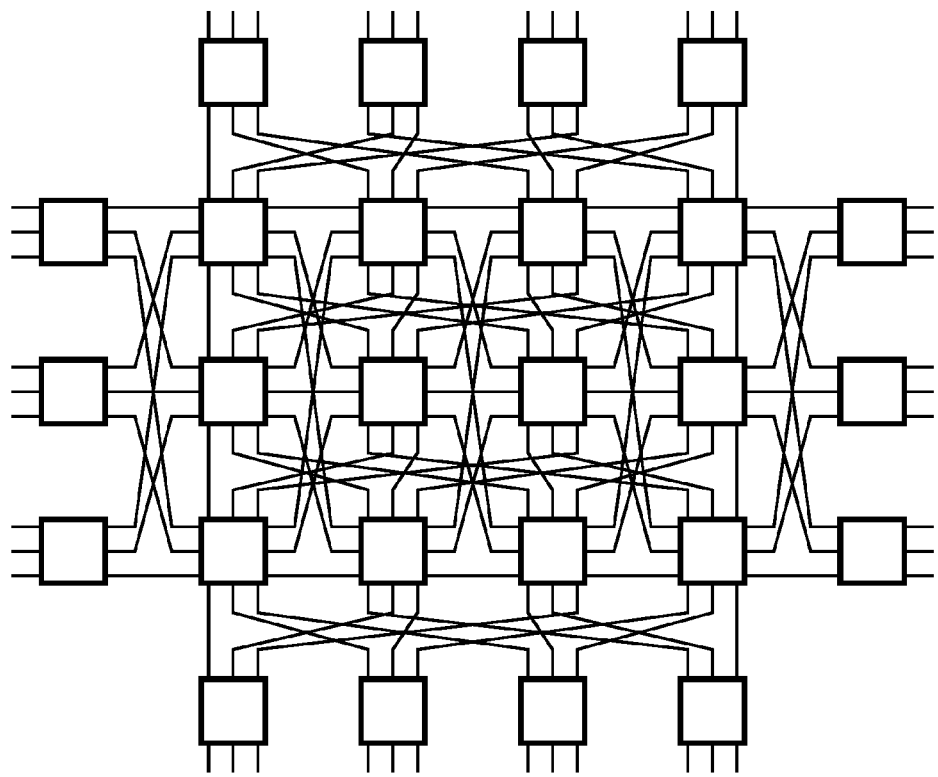
Figure 29D:
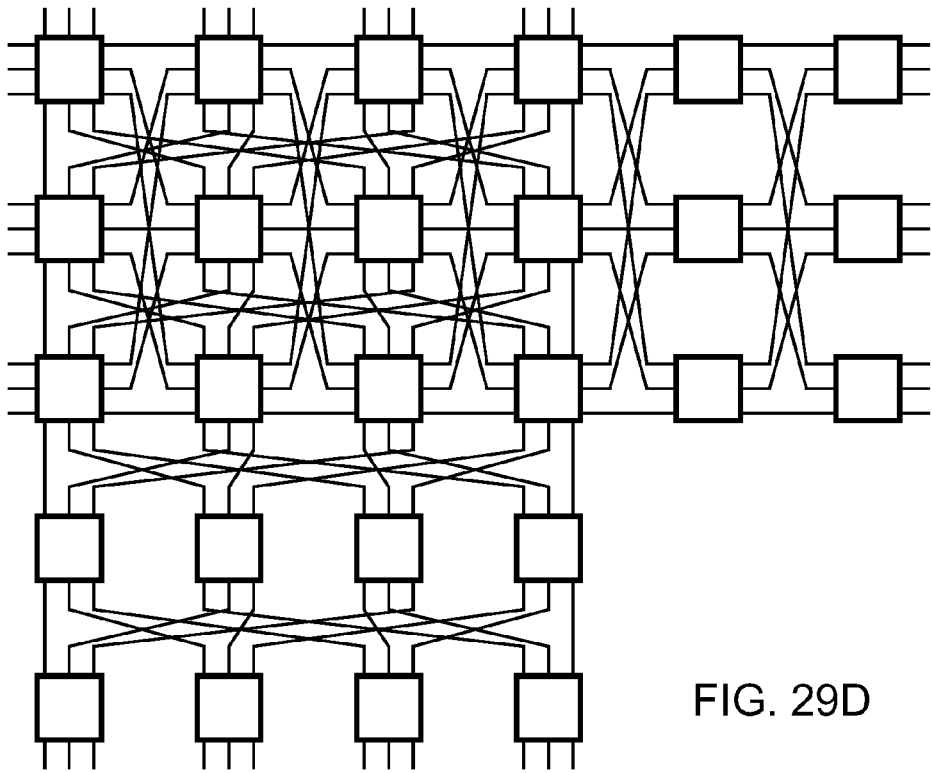

In another embodiment, the overlaying process is shown to be independent of the fanouts of the two networks being combined. For example, the Banyan network shown in FIG. 24A with 4 rows and 8 columns can be overlaid on the balanced RBCCG network shown in FIG. 25A having a different fanout to the Banyan network. The network having 8 rows and 4 columns and a fanout per switching element of 3. FIG. 25B illustrates the resultant overlaid switching network. In another embodiment, the balanced RBCCG network shown in FIG. 26A with 4 rows and 5 columns and fanout per switching element of 2 can be overlaid upon a 5 row, 4 column balanced RBCCG network with fanout per switching element of 3 as shown in FIG. 26B, resulting in the overlaid switching network of FIG. 26C. In another embodiment, the balanced RBCCG network shown in FIG. 27A with 4 rows and 6 columns and fanout per switching element of 3 can be overlaid upon a 6 row, 4 column balanced RBCCG network with fanout per switching element of 3 as shown in FIG. 27B, resulting in the overlaid switching network of FIG. 27C. In another embodiment, the balanced RBCCG network shown in FIG. 28A with 4 rows and 6 columns and fanout per switching element of 3 can be overlaid upon a 6 row, 4 column RBCCG network with fanout per switching element of 4 as shown in FIG. 28B, resulting in the overlaid switching network of FIG. 28C. In another embodiment, the balanced RBCCG network shown in FIG. 29A with 5 rows and 4 columns and fanout per router of 3 can be overlaid onto the balanced RBCCG network shown in FIG. 29B with 3 rows and 6 columns. Depending on the manner the two networks are registered, a variety of new switching network designs are possible. FIG. 29C illustrates the resultant overlaid switching network when the two networks are centered upon each other. FIG. 29D illustrates an alternate resultant overlaid switching network, based upon a different registration.

The many embodiments illustrated formed from the process of overlaying two RBCCG networks upon each other demonstrate the versatility of overlaying RBCCG networks upon a second RBCCG network. Clearly, unbalanced RBCCG networks could be utilized here for the first network, the second network or both networks. It is easy to find an RBCCG network with the proscribed height and width, and the selection of fanouts is arbitrary so that it can be selected to what suits the desired implementation best.

The product of the overlaying process results in switching networks that require more ports than either of the constituent switching network designs. However, the advantages gained include an overall reduction in latency. In the Banyan network, it requires four hops for traffic entering top port 0 of R(0,0) to exit bottom port 1 of R(3,1). In FIG. 24A, there is only one path, passing through R(0,0), R(1,0), R(2,0) and R(3,1). In FIG. 24C, there is a new path requiring only three hops, passing through R(0,0), R(1,0) and R(3,1). Though this savings is small, this is due to the fact that in this example there are not very many levels. However, looking at the RBCCG network in FIG. 24B, it requires eight hops for traffic moving left to right. For example, traffic entering left port 0 of R(0,0) to exit right port 1 of R(1,7) must take eight hops, regardless of the path chosen. However, in FIG. 24C there is now a path requiring only four hops, passing through R(0,0), R(1,5), R(2,6) and R(1,7). This is a significant savings in latency.

Another advantage is the addition of fault tolerance. By adding new internal connections, the network can tolerate more failures in connections and routers. In the case of the Banyan network which has no redundancy, it is clear from the preceding example of traffic entering top port 0 of R(0,0) and exiting bottom port 1 of R(3,1) that in the resultant architecture, there are more paths made available for that traffic. With more paths available, the architecture also reduces blocking, improving efficiency for isochronous traffic.

Figure 30A:
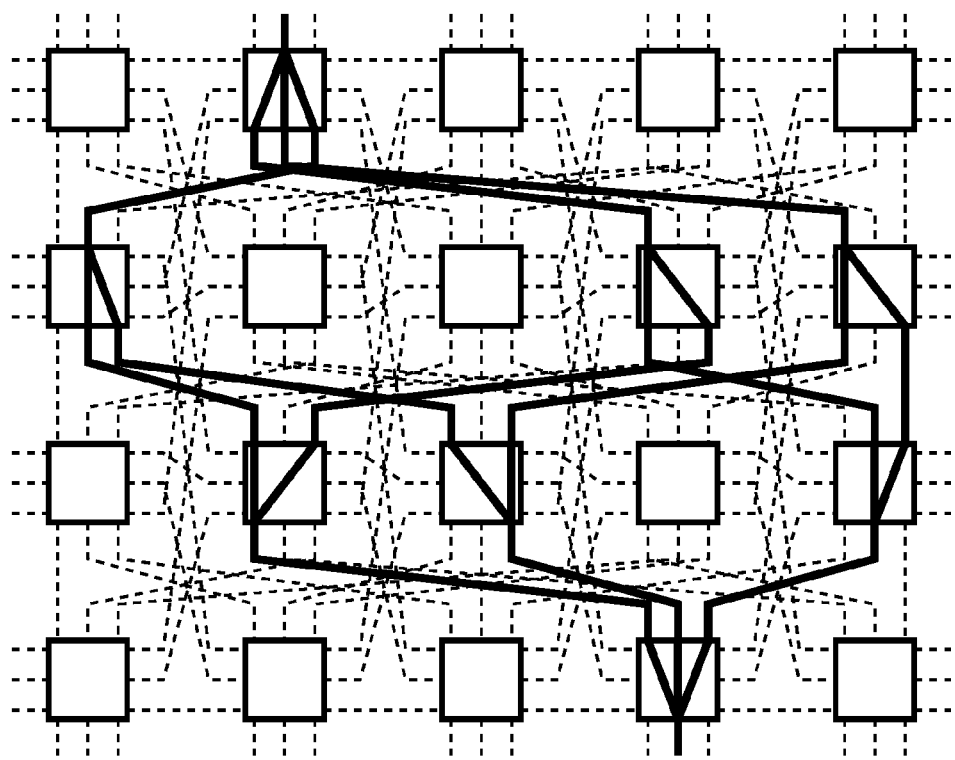
FIG. 30A and FIG. 30B show paths between two external ports with latencies of 3 hops and two hops, respectively.
Figure 30B:
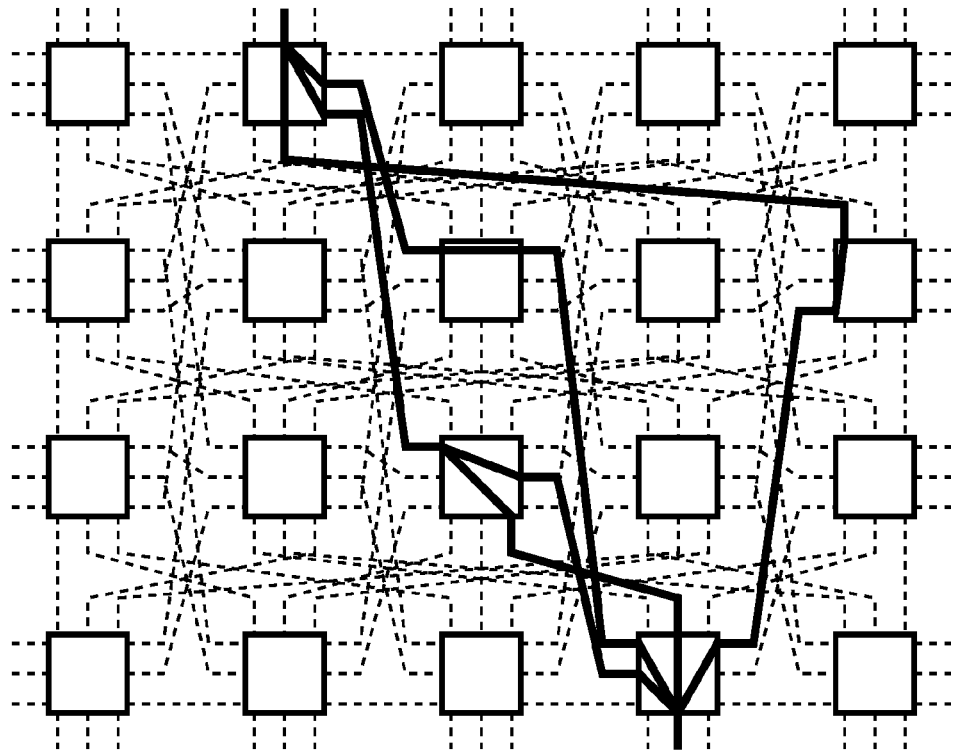

Furthermore, FIG. 30A and FIG. 30B further illustrate the advantages in improved latency and fault tolerance. FIG. 30A highlights the six paths from the two highlighted external ports that occur naturally as part of the IRIC networks flowing from top to bottom. FIG. 30B shows four additional paths which are shorter than the six "natural" paths. These four paths incorporate connections in the ICIC networks. The result is shorter latency options and additional paths. The added fault tolerance additionally facilitates the upgradeability of overlaid networks without disruption of service. Such upgrade methods are described below.

Another advantage is the number of external ports is related to the perimeter of the network rather than just the width alone, allowing the designer an extra degree of freedom in designing a network.

Figure 31A:
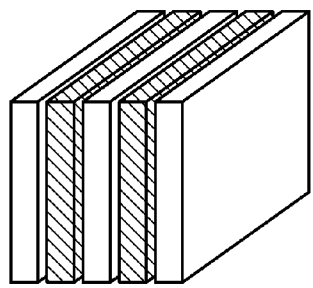
FIG. 31A, FIG. 31B, and FIG. 31C show three orientations of two-dimensional multistage interconnection networks for the purposes of overlaying networks.
Figure 31B:
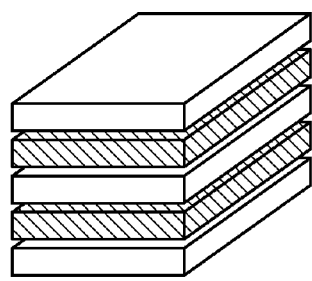
Figure 31C:
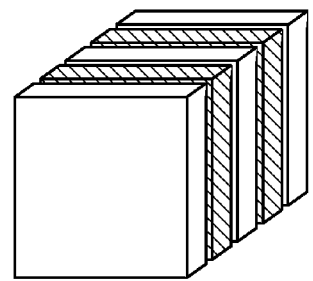

The perpendicular overlaid networks are fairly straightforward for planar designs such as those described above. The overlaying procedure can apply to higher dimensions as well. Additional degrees of freedom become available. FIG. 31A, FIG. 31B, and FIG. 31C show three orientations of two dimensional multistage switching networks with the interplane interconnection networks denoted in gray shading. Just as in the two dimensional overlaying, certain dimensions must match. For instance, the height, width and depth of a network must match the width, depth, and height of a second network or some other permutation of the three dimensions.

There are too many degrees of freedom to enumerate all the possibilities here, but essentially two networks can be overlaid if there is some orientation for which the dimensions of the two "match." Since there are three orientations available in three dimensional space, two of the three networks could be overlaid as well as all three. As in the planar example, the fanouts of the respective two-dimensional multistage switching networks are independent of each other.

Figure 32A:
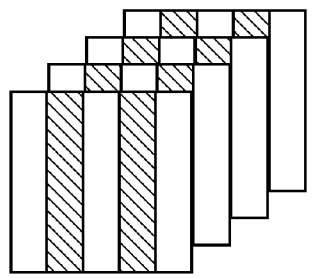
FIG. 32A, FIG. 32B, and FIG. 32C show how to combine one-dimensional multistage interconnections networks into a two-dimensional multistage interconnection network.
Figure 32B:
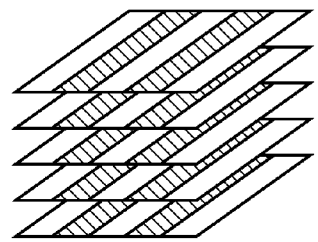
Figure 32C:
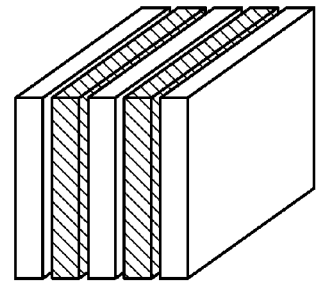

There are also techniques for generating a higher dimensional multistage interconnection network from a plurality of lower dimensional multistage interconnection network. FIG. 32A shows a 1-dimensional multistage interconnection network of height, H, width $W_f$ and per switching element fanout of $F_1$ being stacked with $N_1-1$ identical multistage interconnection networks, resulting in an rather uninteresting 2-dimensional multistage interconnection network of height H and widths $W_1$ and $N_1$, and fanouts per switching element of $F_1$ and 1. FIG. 32B shows a stack of $N_2$ multistage interconnection networks of height H and width $W_2$, and fanout per switching element of $F_2$. The two can be overlaid if $N_1=W_2 \times F_2$ and $N_2=W_1 \times F_1$. As shown in FIG. 32C. Again as in the preceding examples, the gray areas represent interconnection networks.

Figure 33A:
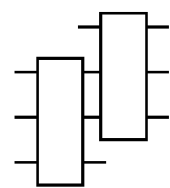
FIG. 33A, FIG. 33B and FIG. 33C show how to combine one-dimensional switching elements into two-dimensional switching elements.
Figure 33B:
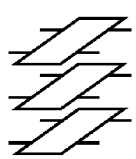
Figure 33C:
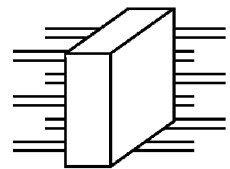

One detail is necessary to complete the overlay of the networks shown in FIG. 32A and FIG. 32B. FIG. 33A shows a stack of $F_2$ switching elements from the network in FIG. 32A. FIG. 33B shows a stack of $F_1$ switching elements from the network in FIG. 32B. In the overlaid result in FIG. 33C, those stacks of switching elements are replaced by a single two-dimensional switching element of total fanout of $2F_1 F_2$. The actual distribution of the fanouts across can be somewhat arbitrary, especially if these are used to construct three-dimensional overlays as described above. The important factor is that the data flows along the y-axis.

This last technique can be applied to arbitrary dimensions. However, the stacking and higher dimensional overlays result in smaller diameter networks for the number of external ports significantly reducing latency and increasing fault-tolerance. However, the requirement in hardware is also greatly increased, but this allows additional flexibility to the network designer.

As suggested by Huang in U.S. Pat. No. 5,841,775, modern routing protocols can be used to direct signals through the switching networks described above, especially dynamic routing protocols such as Open Shortest Path First (OSPF). These protocols enable the switching network to automatically adapt to faults in the network, and also to adapt to the changing topology of the network, should it be altered. This is an important property when performing upgrades by the methods as discussed below. The use of dynamic routing protocols during the upgrade process enables these scalable switching networks to be upgraded while in switching operation. In addition, the use of such protocols can give the network designer the freedom to derive complex routing formula for each potential network design. In particular, these protocols can be used in any of the above described network designs.

However, the drawback is that most of these dynamic routing protocols are designed to operate on ad hoc networks where there is no semblance of regularity, as such are often implemented by using substantial memory and large tables. In contrast, routing in many traditional fixed radix networks, particularly the radix two networks, is based on mathematical or algorithmic calculations rather than the table lookup techniques. Since many of the fixed radix networks were designed from sorting algorithms, many of the routing formulas are based on sorting techniques. For example, a switching element in the third stage can look at the third bit of the destination address and route the signal to the right if the bit is set and to the left of the bit is not set.

Consider the balanced RBCCG switching network with a stride equal to the fanout, a height of H, a width of W switching elements per stage, and a fanout of F comprises a plurality if CGISIC networks. Specifically, each CGISIC is generated by the following mapping, bottom port s of stage n is connected to top port d of stage N+1, (recall that according to FIG. 9 these port numbers are numbered from 0 to WF−1) where d=((s mod W)F+(S/W)) mod(WF). Traffic can be routed through this balanced RBCCG switching network using the following formula, $p=((d-sF^{H-k})$ mod $W+i W)/F^{H-k-1}$ where p is the port on switching element R(k,i) to which the signal should be directed to reach switching element R(H,d) and i can be any integer value for which the resultant p makes sense (i.e. $0 \leq p \leq F$). The division operation in the preceding formula is integer division, that is division where the remainder is discarded. The power of this formula lies in that each switching element, knowing its location within the switching network and the destination of the signal, can decide which output port it must route the signal to without the need for tables or information from other switching elements.

The following is an example of an application of this routing algorithm. Depicted in FIG. 34 is a 24-port RBCCG switching network, To traverse from port S to port D, the signal must be routed between R(0,1) to R(3,2). At router R(0,1), the routing formula yields a solution for p of either 0, 1, or 2 meaning that the signal could be routed through any of the output ports, all of which are equally valid. If the signal is routed through port 0, it arrives at R(1,3), according to the routing formula to route from R(1,3) to R(3,2) yields only one possible value for p that of 1, so the signal must be routed through output port 1 to R(2,2). To route from R(2,2) the routing formula from R(2,2) to R(3,2) yields only the value of p=0 so the signal must be routed through output port 0 to R(3,2) where it is finally conveyed through output port 2 to destination D.

In some instances of applying the routing formula, several solutions for the output port can result. In such situations, a routing algorithm is free to select any solutions and allow the switching element in the next stage to carry out the next calculation. Though FIG. 34 describes one path from S to D, there are in fact five paths, which derive from the different choices of when multiple solutions exist. The first path as described above has the signal passed from S to R(0,1) where it traverses through output port 0 to R(1,3) where it traverses through output port 1 to R(2,2) where it traverses through output port 0 to R(3,2) where it is finally conveyed through output port 2 to destination D.

A second path has the signal traverses through output port 1 to R(1,0) where it traverses through output port 0 to R(2,0) where it traverses through output port 2 to R(3,2) where it is finally conveyed through output port 2 to destination D.

A third path has the signal passed from S to R(0,1) where, like in the second path, it traverses through output port 1 to R(1,0) where, unlike the second path, it traverses through output port 2 to R(2,2) where it traverses through output port 0 to R(3,2) where it is finally conveyed through output port 2 to destination D.

A fourth path has the signal passed from S to R(0,1) where it traverses through output port 2 to R(1,1) where it traverses through output port 1 to R(2,0) where it traverses through output port 2 to R(3,2) where it is finally conveyed through output port 2 to destination D.

A fifth path has the signal passed from S to R(0,1) where like in the fourth path, it traverses through output port 2 to R(1,1) where unlike in the fourth path, it traverses through output port 0 to R(2,3) where it traverses through output port 1 to R(3,2) where it is finally conveyed through output port 2 to destination D.

This gives an alternative routing technique for the RBCCG switching networks, allowing these switching networks to be used in applications where the switches are constrained to simple logic. In addition, this formula can be used as part of a formulaic routings algorithm for the hybrid architectures mentioned above. Additionally, since the interconnection mappings of the Cartesian product networks are separable (that is, they are independent in the various $x_1$ directions), this routing formula can be used to route based on each component of the address. For example, if the $x_1$ direction shows a Banyan interconnection pattern, and the $x_2$ direction is a RBCCG switching network, a Banyan formula can be used to calculate the $x_1$ component, $p_1$, of output port based on the $x_1$ component of the destination address. The routing formula given above for the RBCCG switching network can be given be used to determine which the $x_2$ component, $p_2$, of output port based on the $x_2$ component of the destination address, thereby yielding a resultant output port of $(p_1,p_2)$. This formula can also be used in various combinations to route in any of the overlaid networks where one of the networks overlaid is an RBCCG switching network.

In any of the preceding architectures, if a dynamic routing algorithm as used by protocols, such as Routing Information Protocol (RIP), OSPF, Exterior Gateways Protocol (EGP), and Border Gateway Protocol (BGP) is employed, the redundancy of the networks can be exploited to provide fault tolerance. Once a fault is detected through non-response, perhaps using a network management protocol such as Simple Network Management Protocol (SNMP), the dynamic routing algorithm can remove the entry from its routing tables and all traffic can be routed around the defective switching element or connection. When the defective switching element or connection is repaired, the repair can be detected, perhaps through the same network management protocol, and the dynamic routing algorithm can reintroduce the formerly defective elements back to its routing table and traffic can resume through the formerly defective element(s).

Having path redundancy, detecting faults and the ability to dynamically route traffic leads to automatic fault tolerance. For example, FIG. 35A depicts a 30-port balanced RBCCG switching network with five paths (shown in bold) from port S to port D. With dynamic routing described above, switching element R(0,2) would determine three paths out of switching element R(0,2), and depending on the routing algorithm, any one of those three paths can be taken. Depending on which path is taken, the corresponding switching element in stage 1 detects the remaining paths available to port D. For example, if the traffic gets routed by switching element R(0,2) to switching element R(1,3) two paths are available, so switching element R(1,3) can select either path.

Suppose a breakdown occurs in switching element R(1,3) which is denoted by a hatched switching element in FIG. 35B. The neighboring switching elements R(0,1), R(0,2) and R(0,4) in stage 0, as well as switching elements R(2,0), R(2,1) and R(2,4) in stage 2, can become aware of the breakdown of switching element R(1,3) through a network management protocol. Once these switching elements remove R(1,3) from their own routing tables, the rest of the switching elements in the switching network become aware of the breakdown through the use of a dynamic routing protocol, which exchanges routing information with its neighbors. Using the example of FIG. 35B, there are now three paths (shown in bold) available from port S to port D. With the new updated routing information, switching element R(0,2) recognizes only two paths out of switching element R(0,2) that can reach port D.

Figure 36:
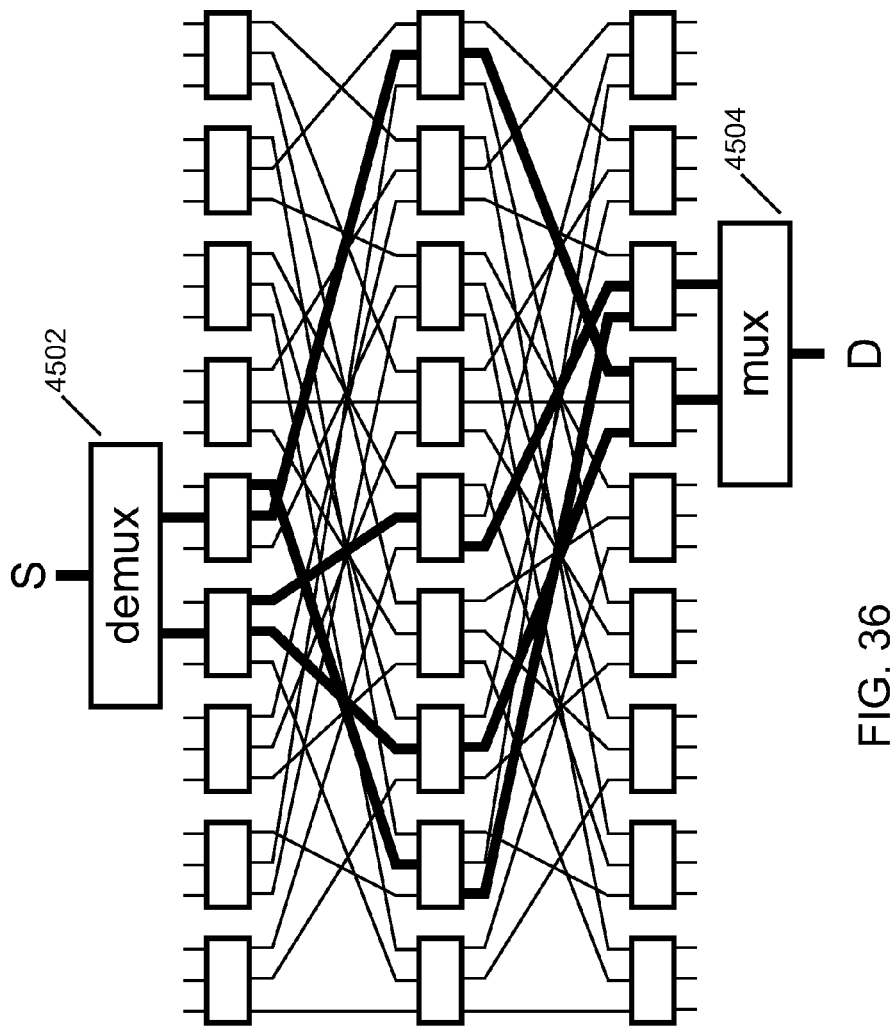
FIG. 36 shows a multiplexer demultiplexer scheme addressing faults in the switching elements at the edge of a switching network.

The difficulty arises when the fault occurs in a switching element at the perimeter of the switching network. For instance, in FIG. 35A, if switching element R(0,2) fails, no traffic can flow in from port S regardless of where the traffic is intended. Many embodiments of switching elements comprise a plurality of line cards which could fail individually. In other circumstances the switching elements themselves could fail. Huang suggests in U.S. Pat. No. 5,841,775 as depicted in FIG. 36 the use of a multiplexer 4502 and demultiplexer 4504 to distribute the traffic across multiple switching elements at the perimeter of the switching network. In another embodiment, access routers could be used in place of the multiplexers and demultiplexers which provide for a more responsive system to the occurrence of a fault. However, this merely pushes the single point of failure from the switching elements at the perimeter of the switching network to the access routers.

Another approach is the method described by Kumar in the background section, where an extra stage is added and can selectively be activated and deactivated. Though this approach can remedy the problems of faults encountered at perimeter switching elements, the deactivation of an entire stage when only one faulty switching element is detected leaves a number of fully functional switching elements completely inactive.

Figure 37:
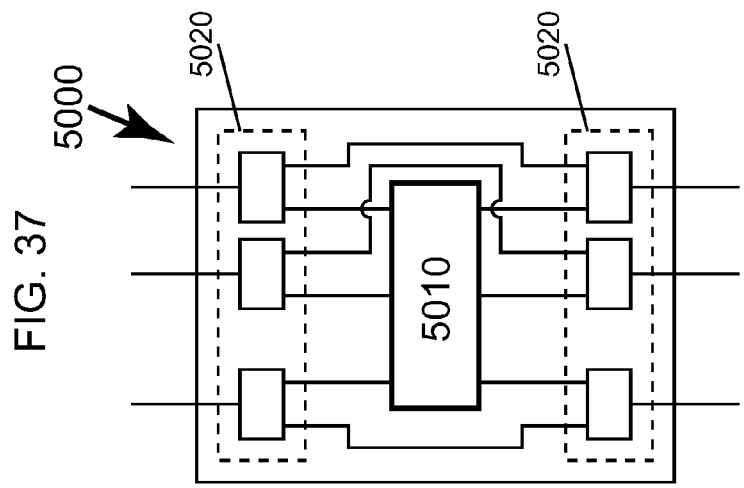
FIG. 37 shows a special switching element designed for use at the edge of a switching network.

FIG. 37 depicts a specially adapted switching element, comprising a central switching element 5010 and a switch pair 5000 through which a bypass is provided for each top port and bottom port. In some embodiments, this switch pair is a multiplexer-demultiplexer pair. In other embodiments, they could be "dead man switches" commonly used in optical networking. The dead man switches remain in a state which directs traffic to the central switching element, but when no signal such as a conventional "keep alive signal" is detected, the dead man switch switches to direct traffic to bypass the central switching element. These switches are known in the art and have been used for hot standbys in telecommunications for years. In one embodiment of the switching element, the switch pairs could be incorporated physically into a switching element. For example, a router could have line cards equipped with two ports, whereby traffic can bypass the router and flow between the two ports on the line card in the event of some failure on the part of the router.

Figure 38A:
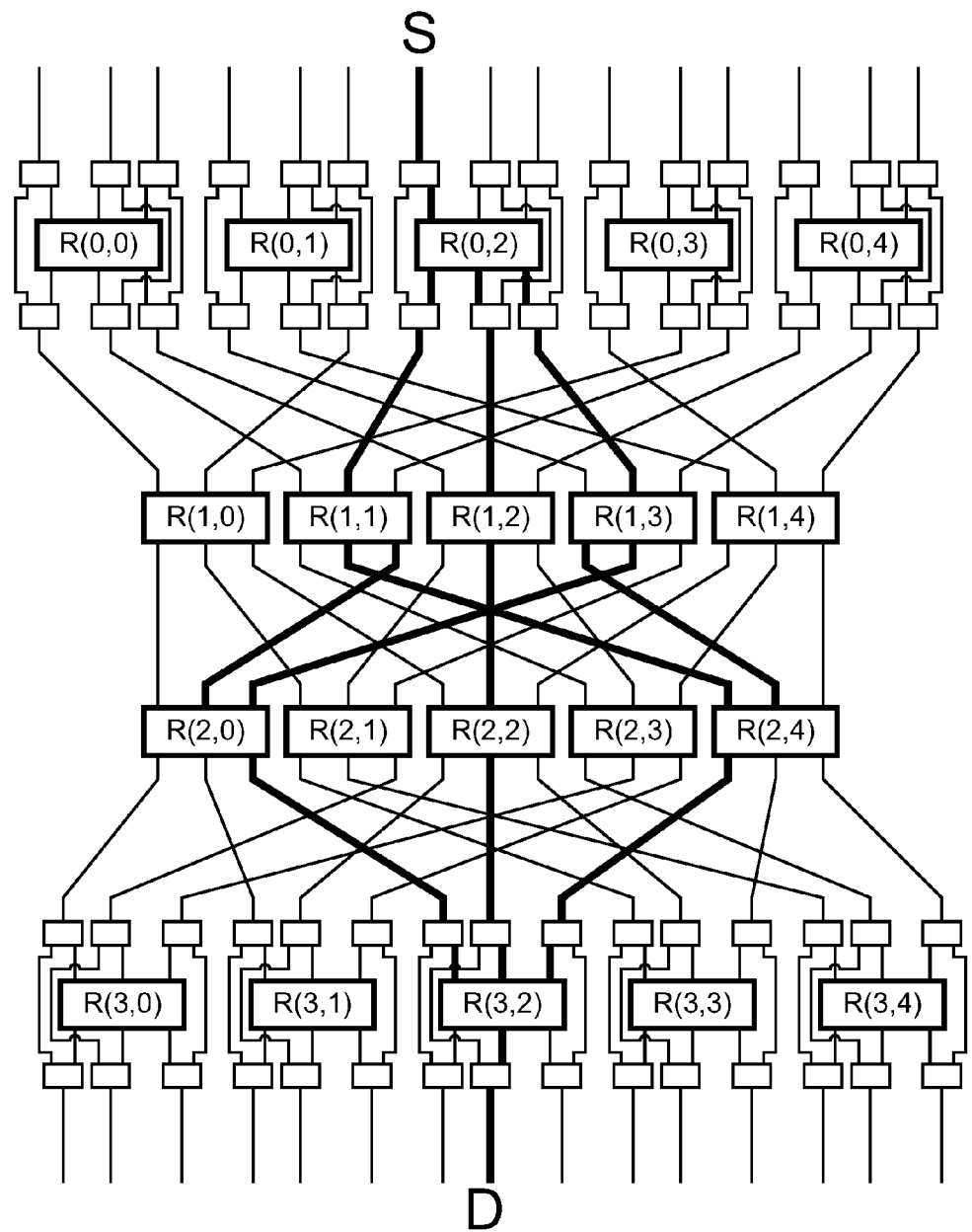
FIG. 38A and FIG. 38B show the special switching element is used for fault tolerance in a scalable switching network.

FIG. 38A depicts the same 30-port RBCCG switching network as that of FIG. 35A except in the first and last stages, i.e. stage 0 and stage 3 in this example, the switching elements are the specially adapted switching elements of FIG. 37. Again, the five paths from port S to port D are highlighted in bold.

Figure 38B:
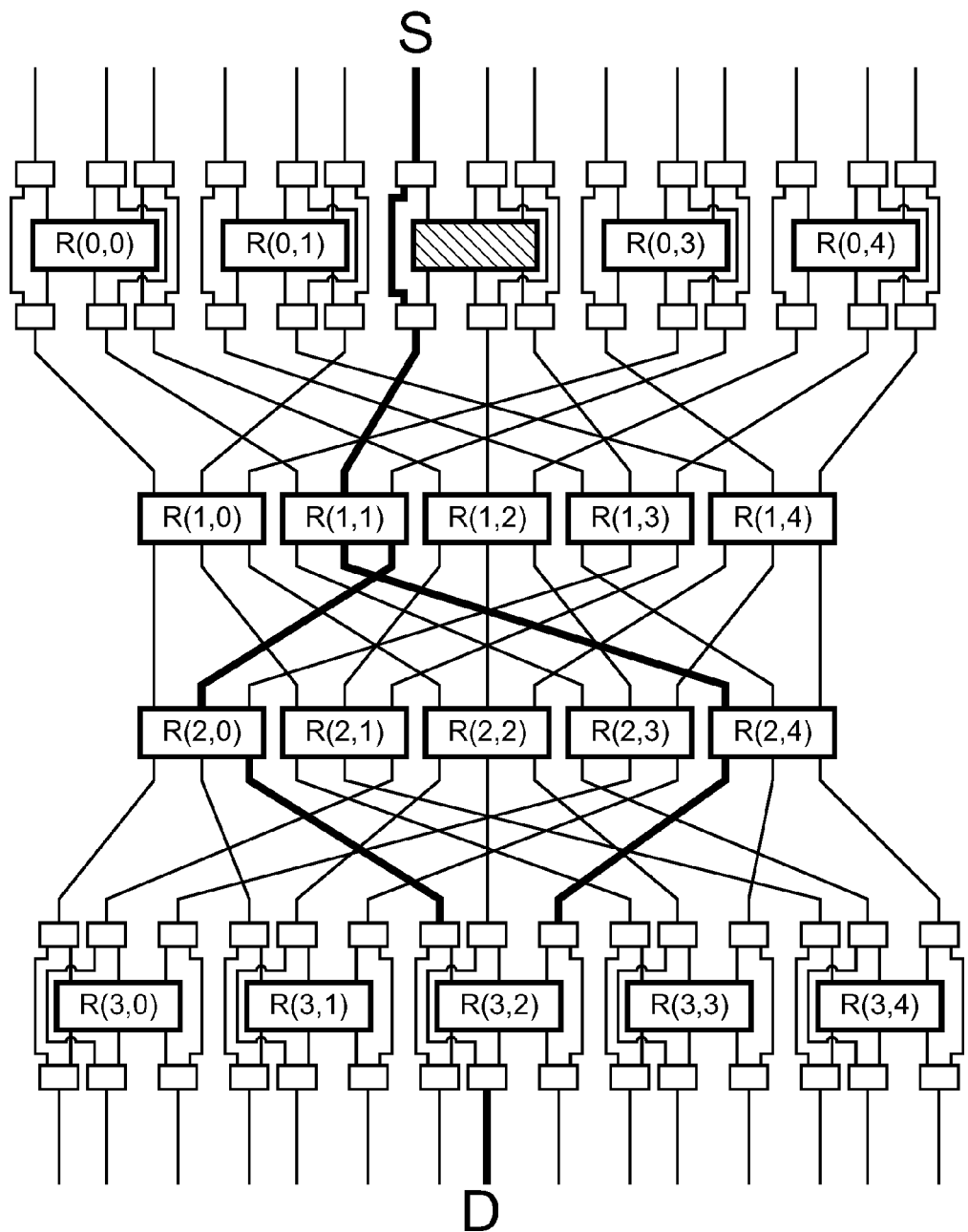

FIG. 38B illustrates the situation if switching element R(0,2), denoted with crosshatching, fails. Traffic from top port 0 of switching element R(0,2) is automatically diverted out of bottom port 0 of switching element R(0,2) without passing through the central switching element within switching element R(0,2) and hence to top port 1 of switching element R(1,1). This leaves two remaining paths for the traffic to reach port D. With the specially adapted switching elements of FIG. 37, fault tolerance of a switching network to the failures of switching elements extends to all switching elements within the switching network.

Figure 39A:
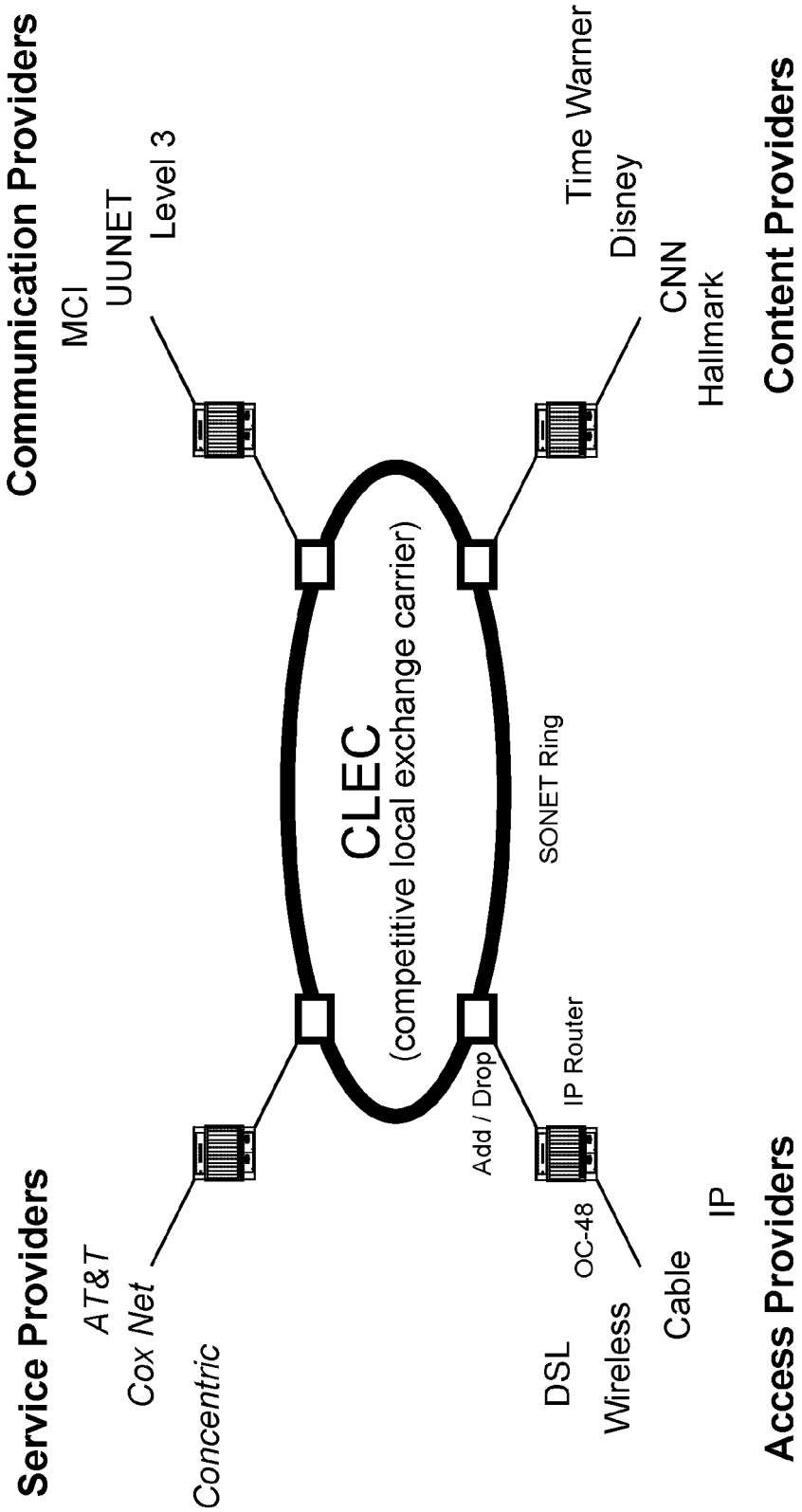
FIG. 39A shows a typical modern implementation of a metropolitan area switching network.

This approach differs significantly from the extra stages used by Kumar, in that each switching element functions independently of any other switching element regarding the bypass capability, so that all switching elements not involved in a failure continue to relay traffic. Once a failure occurs in the system described by Kumar, the entire stage is bypassed, leaving any remaining switching element in the stage inactive even if it is still functioning. FIG. 39A shows a typical competitive local exchange carrier (CLEC) for a metropolitan switching network. Add/drop nodes are connected in a ring topology with optical fiber. The CLEC is analogous to a freeway beltway that encircles many cities. The Add/Drop nodes are analogous to the freeway on/off ramps. Long distance telecommunications providers such as MCI and AT&T, long distance data communications providers such as UUNET and MCI, local telecommunications access providers such as cellular telephone providers and RBOC's (regional Bell operating companies), data access providers such as digital subscriber line (DSL) providers, Internet Service Providers (ISP), cable modem providers, service providers such as AT&T, Cingular, and Cox Networks, and content providers such as Time Warner and Disney are or will be connected to the CLEC to provide communication based services.

The optical fibers carry Synchronous Optical Networking (SONET) circuits such as Optical Carrier-12 (OC-12) and Optical Carrier (OC-48). The nodes use SONET add/drop multiplexers to add and drop various SONET circuits. The dropped SONET circuits can be connected to either telecommunications or data switching equipment. Operationally, a typical packet from an access subscriber is sent to an access provider. The access provider routes this packet onto one of the SONET Add/Drop circuits. The SONET circuit is connected another SONET Add/Drop on the CLEC. This SONET Add/Drop is connected to another router that routes the packet to either an access subscriber or to a network backbone provider.

Figure 39B:
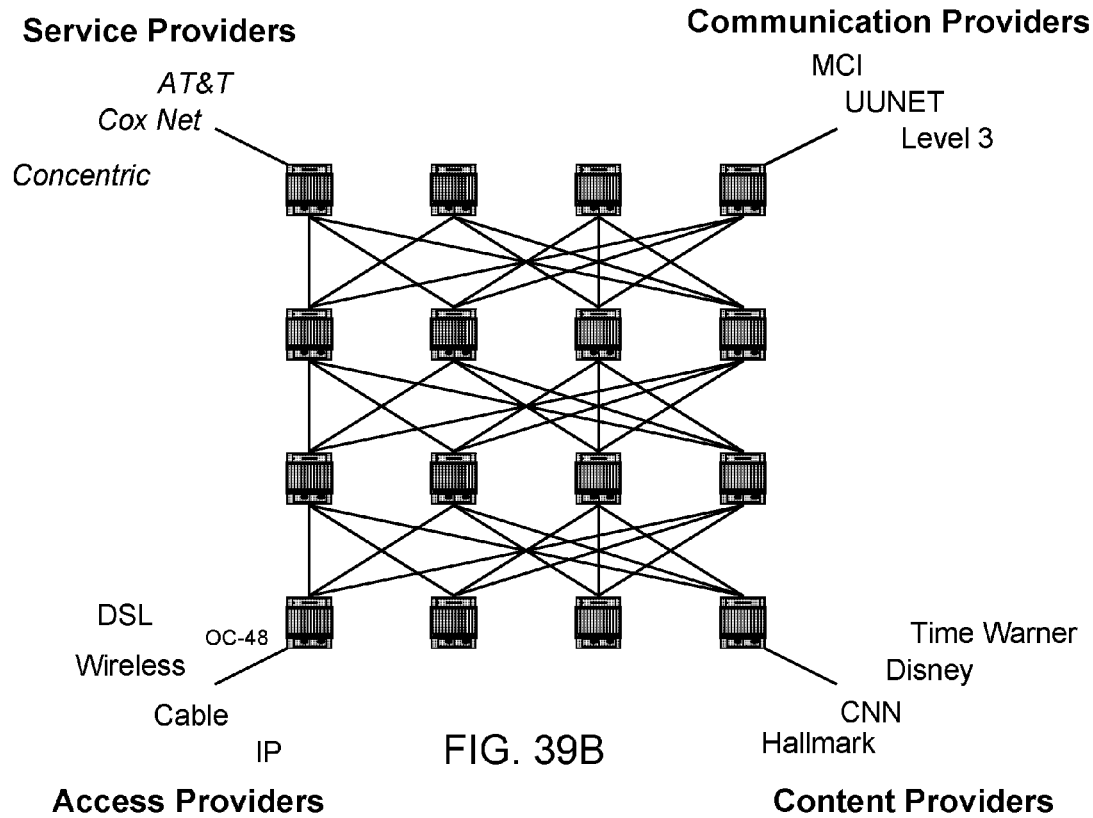
FIG. 39B shows a proposed implementation of a metropolitan area switching network using scalable switching networks as the core infrastructure.

FIG. 39B shows an alternate configuration for a metropolitan switching network. In this configuration, all access to the metropolitan network is directed through a central switching router network. The ring topology is replaced with a star topology. Each service provider is connected directly to this central switching router network. In this particular embodiment a RBCCG switching network is depicted, but any of the scalable switching networks described here can be used depending on the requirements of the metropolitan area. The advantages of this configuration include the elimination of the need for Add/Drop hardware, and the assumption of large access routers into the central router network. The current preference towards the CLEC architecture lies in the fact that a very large switching capability is required, and that conventional clustering of routers is ad hoc in nature with the drawback of not adequately supporting isochronous traffic such as voice and video. In addition, ad hoc clustering of routers is not designed for any semblance of fault tolerance, and any redundancy is accidental.

However, by employing large internet protocol (IP) routers such as the Cisco 12000, a network of IP routers can be constructed which has a high capacity to switch asynchronous and isochronous traffic simultaneously. In addition, any level of fault tolerance can be designed in. This configuration has the advantage that it can also be upgraded without disruption of service. In order to best preserve fault tolerance, even at the edges, service providers with multiple connections to the router network should connect their connections to different routers whenever possible.

The centralized RBCCG network shown in FIG. 39B can also be implemented in a distributed manner on top of a ring topology. The individual switching elements of the RBCCG, which as shorthand are called RBCCG routers, can be distributed among various CLEC nodes and these routers can be interconnected by CLEC circuits.

Figure 39C:
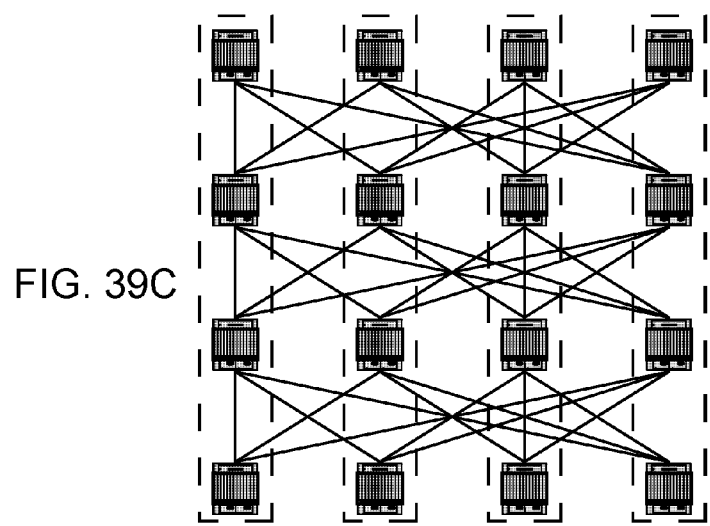
FIG. 39C shows a detailed view of the RBCCG network at the heart of a metropolitan area switching network.

There is an advantage to locating certain RBCCG routers in certain locations. As mentioned previously, all the routers in a column of RBCCG routers as shown in FIG. 39C can malfunction or be disconnected and the remaining columns of RBCCG routers will continue to function. It would thus be advantageous to locate all the routers associated with a column of RBCCG routers at the same CLEC node. CLEC communications bandwidth is thus used to increase the fault tolerance of the CLEC.

Traditionally, the Add/Drop multiplexers are circuit based and not packet based. A new generation of packet based Add/Drop multiplexers is being developed which combine the functionality of a circuit based Add/Drop multiplexer and a packet based router. A RBCCG network can also be used to accomplish this. Each column of routers of an RBCCG network can be located at different CLEC node. The connections from the top of the top column router and the bottom of the bottom column router are connected to either an access provider, communication provider, content provider, or service provider. The connections from the internal column routers are either connected to other routers in the column are remotely connected by the CLEC to the internal column routers associated with other nodes. The RBCCG routers thus separate the local traffic from the CLEC traffic and also help route the packets to their final destination.

Figure 40:
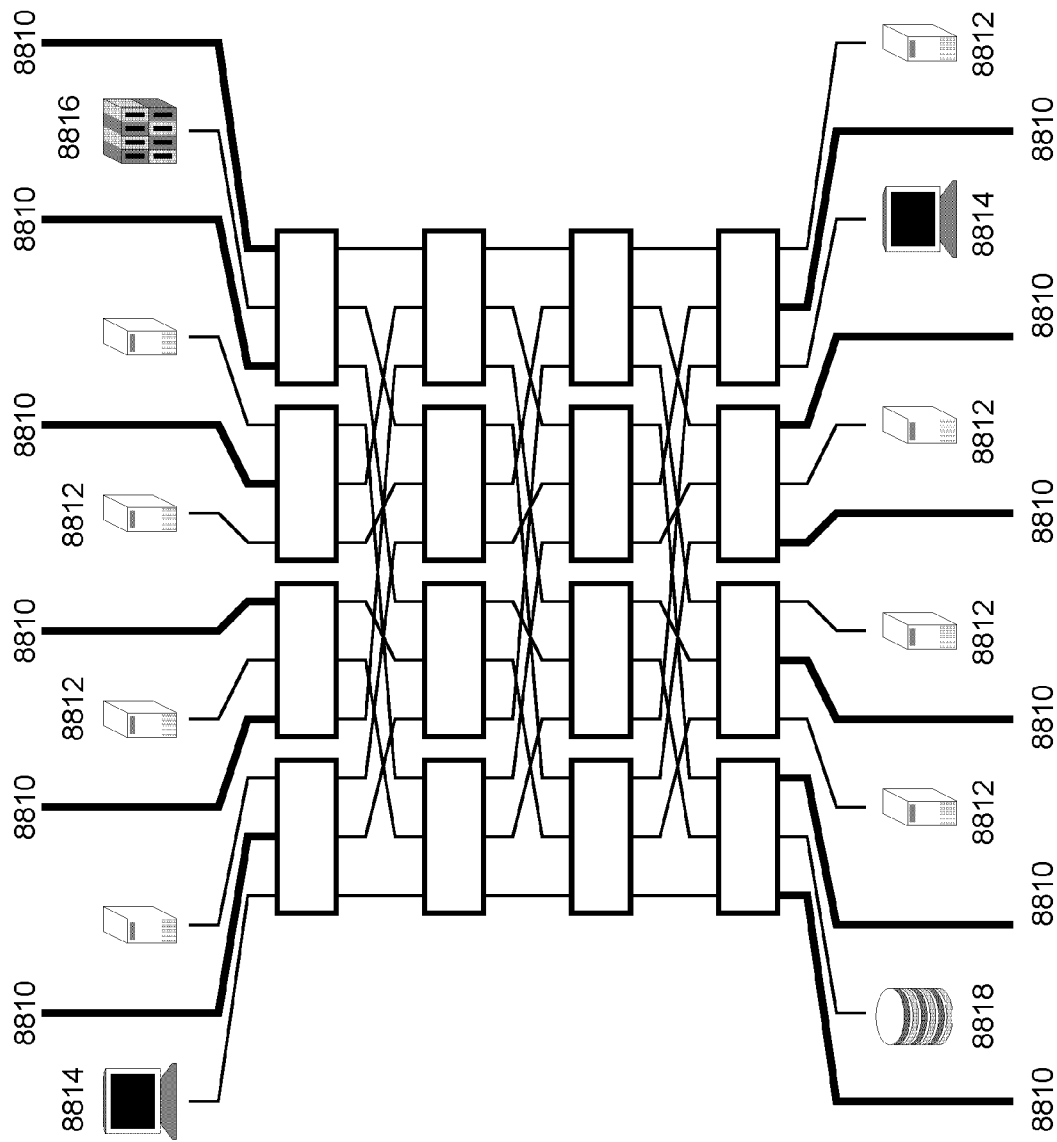
FIG. 40 shows a deployment of a complex of servers and services using a scalable switching network.

The preceding section describes how scalable switching networks such as RBCCG networks can be used to connect content providers, access providers, communications providers, and service providers on a metropolitan scale. This model can also be applied on a smaller scale. FIG. 40 shows a typical "server complex" utilizing a high bandwidth scalable switching core much in the same way as the metropolitan switching network shown in FIG. 39A. This network comprises a plurality of external connections 8810 as well as a plurality of servers 8812. Furthermore, this embodiment comprises local access points 8814. In addition to these components, this embodiment incorporates storage units such as a tape drive 8816 and a disk drive (or array of disk drives) 8818. A networked storage disk or tape drive could be considered a server, such as 8812. Here a server is any computer or device which provides any kind of service on the network. Typical servers include audio servers, video servers, web servers, databases, networked storage, or compute servers (a server dedicated to providing computation services for a network).

The switching network depicted in this embodiment is a basic 24-port 4-stage RBCCG network. Each switching element can be a variety of routers from large IP routers to Ethernet switches. In the latter case of Ethernet switches, some features such as fault coverage and upgradeability become more difficult. For instance, while running standard protocols such as OSPF for routing, an outage of a line card, connection, or complete router will automatically trigger a rerouting around the defective part of the network. With simple switches, detection and rerouting can need to be handled by a central server monitoring status, which it can do using a standard protocol such as SNMP. Similarly, during an upgrade, a system with dynamic routing such as OSPF can automatically adapt to the changing topology inherent in the upgrade process. While still feasible, a central server may be required to manage the individual routing tables of the switches during the upgrade process.

Figure 41A:
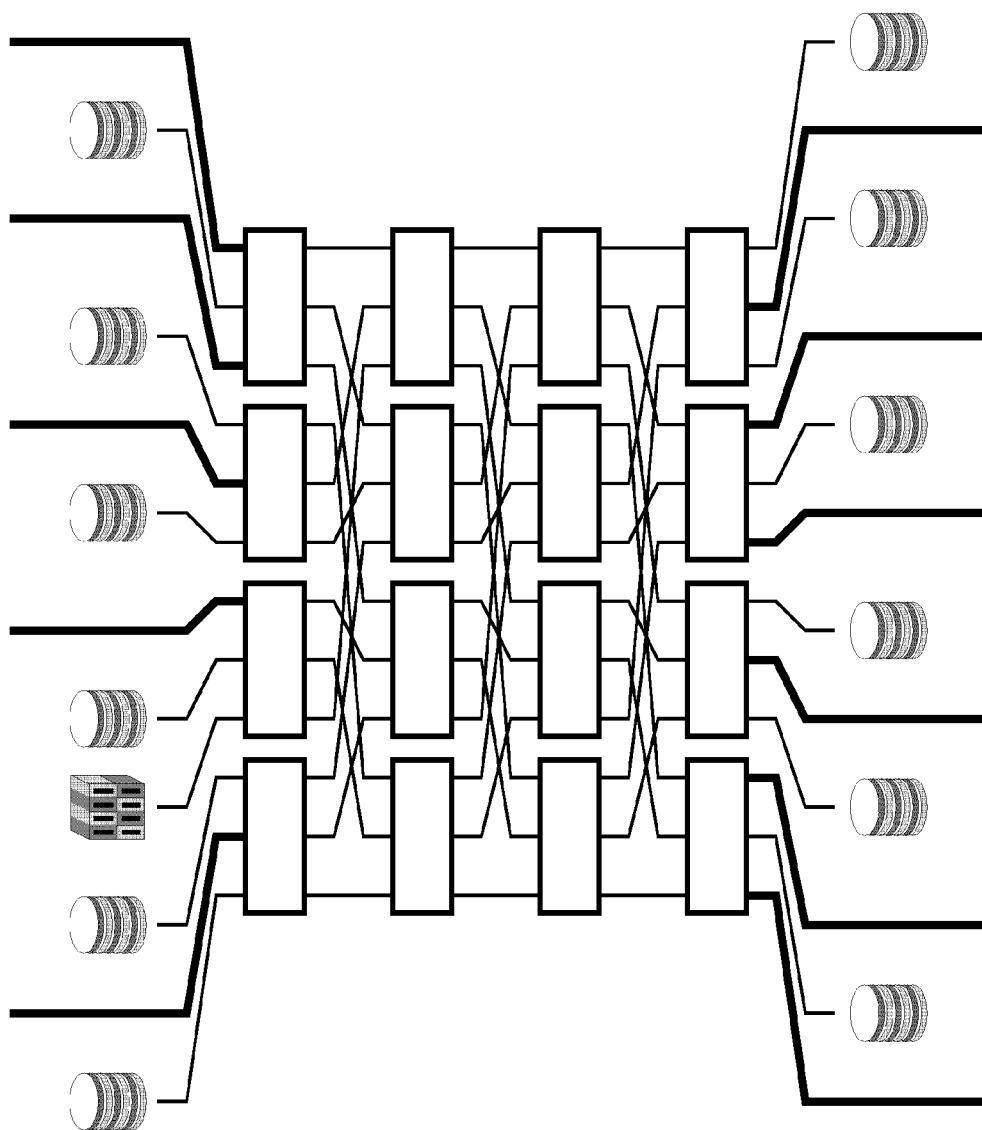
FIG. 41A shows a deployment of a networked attached storage (NAS) unit using a scalable switching network.

When all the servers in such a complex are used strictly for networked storage, this architecture becomes a network attached storage (NAS) unit. FIG. 41A shows a typical NAS configuration. In this embodiment, a tape drive unit is depicted for the purposes of backing up the storage units. It should also be noted that the external connections and the storage devices are intermingled rather than grouped together. This provides an extra degree of fault tolerance in the event of an outage on an external switching element or connection.

Figure 41B:
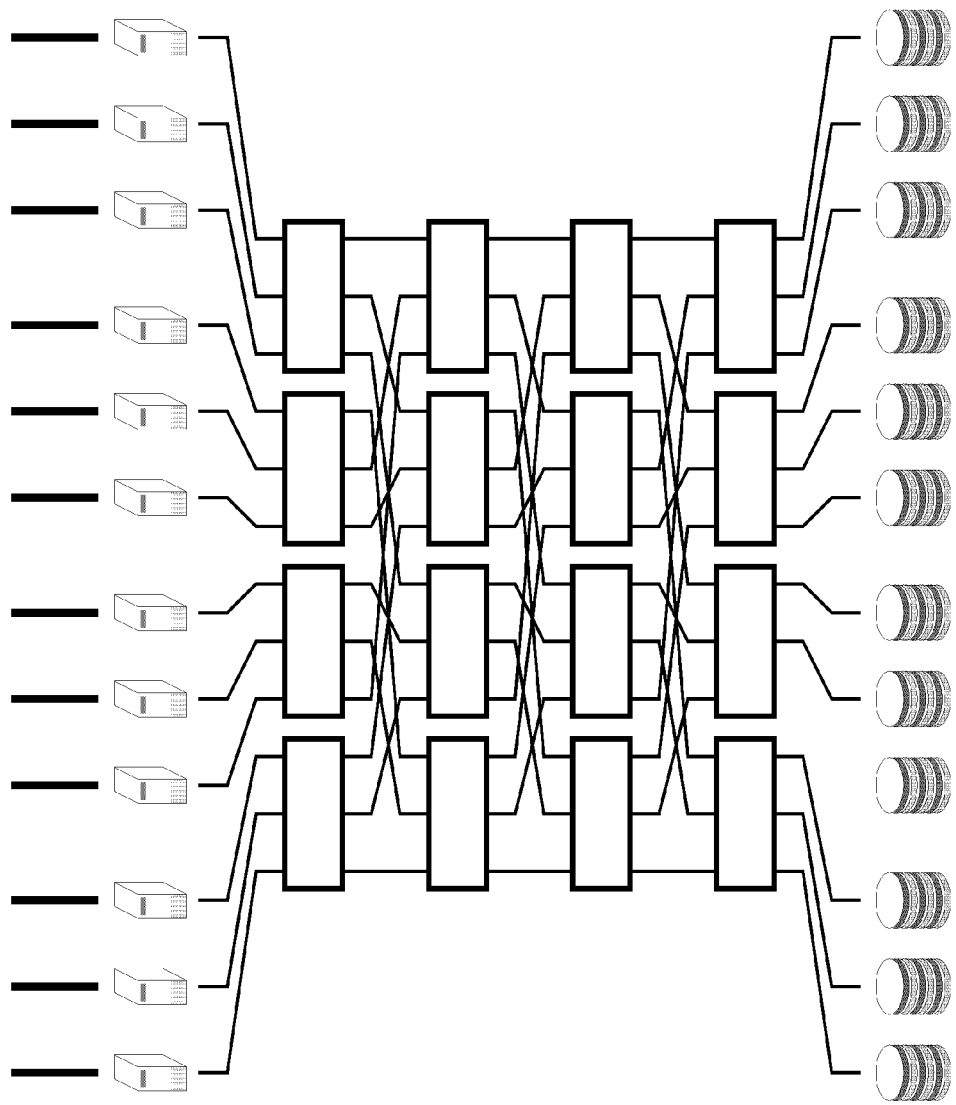
FIG. 41B shows a deployment of a storage area network (SAN) using a scalable switching network.
Figure 41C:
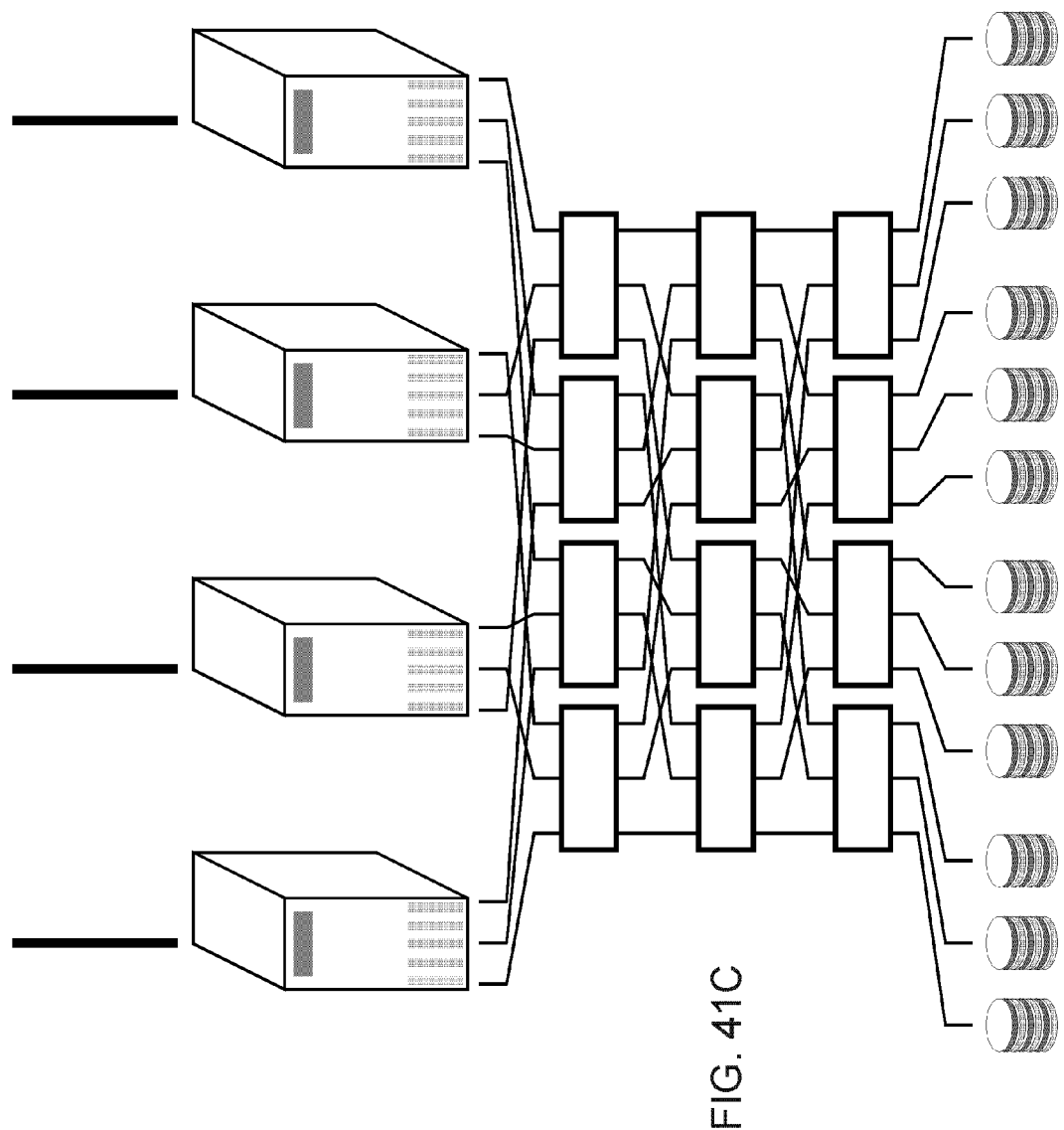
FIG. 41C shows a deployment of a storage area network (SAN) using a scalable switching network employing large gateway servers.

Though subtly different, a storage area network (SAN) is defined to be a network array of storage devices interfaced to servers which communicate externally to the end user, whereas a NAS does not require such servers. In typical embodiments of SANs, the networking employed to connect the storage units is often a much simpler protocol. But since such networks still require switching, and when properly configured such switching also requires some form of routing, the scalable switching networks described above can be applied to the design of SANs. FIG. 41B shows a typical SAN design using the same 24-port 4-stage RBCCG. FIG. 41C shows another SAN design where larger servers with higher networking capacities are employed.

Figure 42:
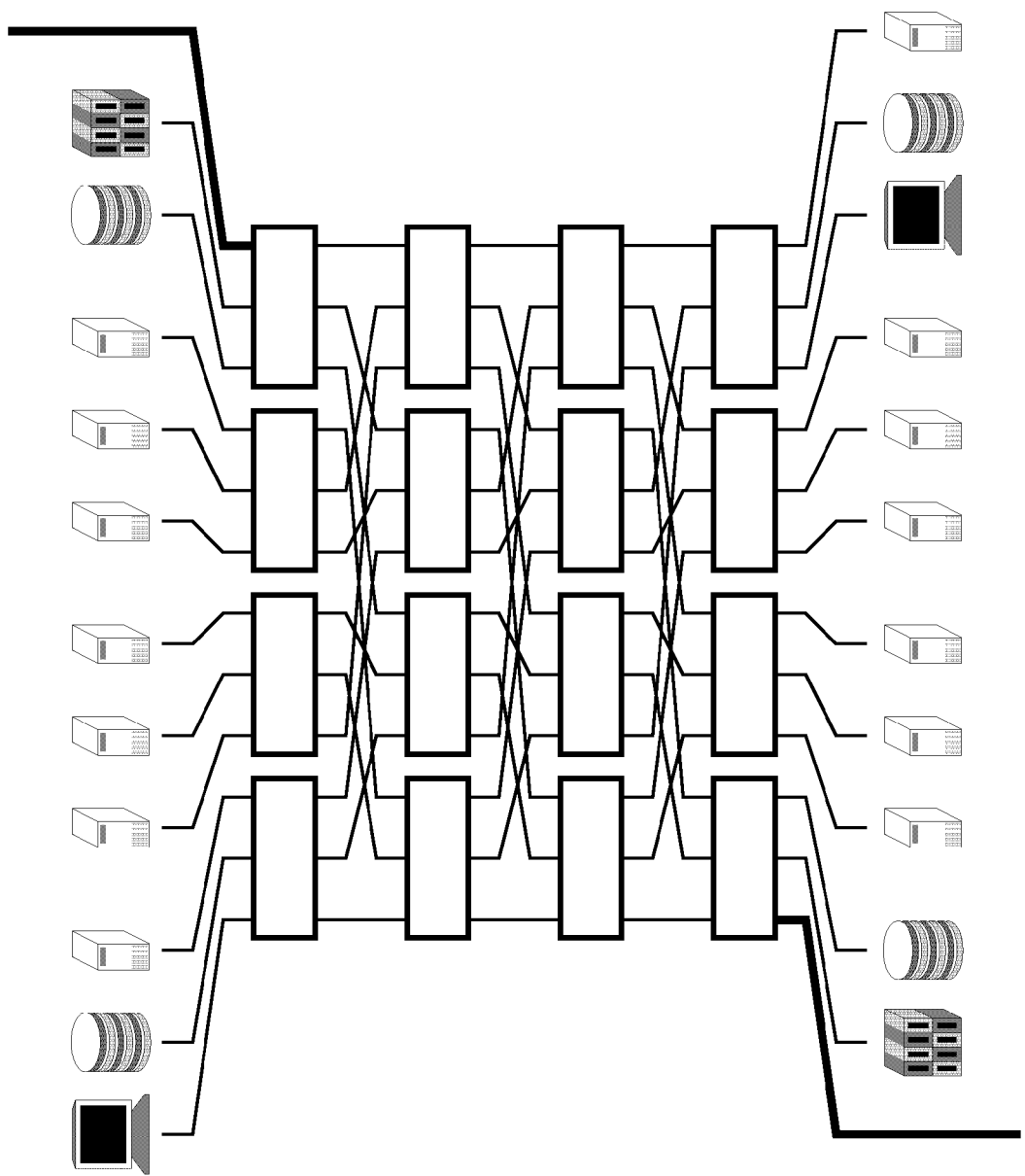
FIG. 42 shows a deployment of processor cluster such as Beowulf using a scalable switching network.

FIG. 42 depicts an embodiment of a server complex where most of the servers are computer servers with some monitoring stations, and with some storage and some backup services, such as in a Beowulf cluster. In this specific embodiment, there are a very limited number of external connections. The purpose of this architecture is to create a very large computing unit. Processor farms of this type have often been used in the world computer animation. This architecture supplies an arbitrary expandable design for creating very large computing devices.

Using an RBCCG network as part of a server complex as shown in FIG. 40, an NAS as shown in FIG. 41A, a SAN as shown in FIG. 41B and FIG. 41C, or a server complex as shown in FIG. 42 reduces the cost, increases the fault tolerance, and reduces the blocking of isochronous traffic.

The previous section shows a progression of using a scalable switching network as the core to various application clusters. The scale progressed from metropolitan, to wide area, to local area, and even to smaller applications such as a processor farm.

Scalable switching networks can be applied on even a smaller scale. Consumer grade connectivity starts to rival internal bus speeds in the interior of computers. In addition, the construction of routers with chips such as the IXP1200 processor allow for simpler routers, simpler protocols, and faster small scale communications. It is natural to next look at replacing the various buses in a computer system with a scalable switching network.

Figure 43A:
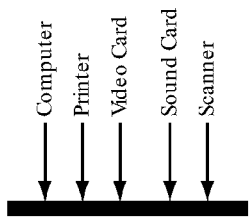
FIG. 43A shows a typical implementation of a peripheral bus for a computer.
Figure 43B:
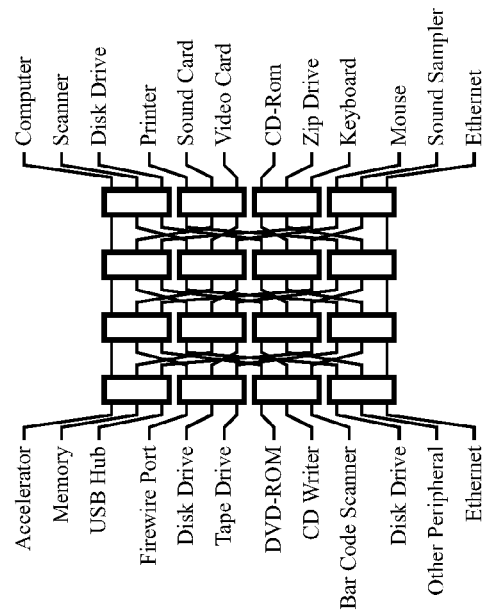
FIG. 43B shows an architecture where the peripheral bus is replaced by a scalable switching network.

FIG. 43A shows a schematic of a simple computer and its communications buses such Peripheral Component Interconnect (PCI), Small Computer System Interface (SCSI), Universal Serial Bus (USB), and FireWire. FIG. 43B shows the same computer system with these buses replaced by a switching network. It assumes that the peripheral devices are designed to communicate in a packet protocol such as Ethernet. This is not unreasonable since many devices, such as printers, disk drives, and tape drives already have interface variations that allow them to sit independently on a network.

Figure 44A:
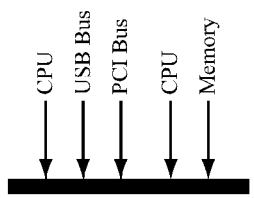
FIG. 44A shows a typical implementation of a system bus internal to a computer.
Figure 44B:
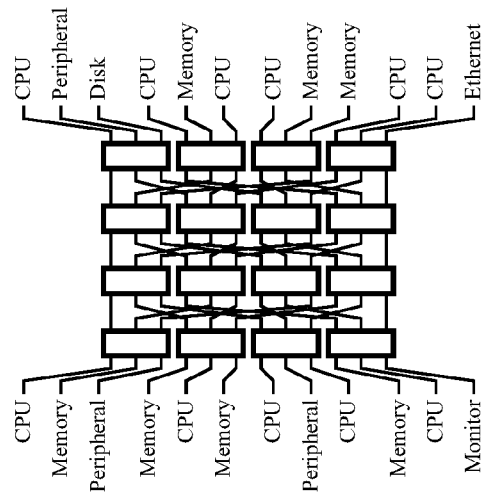
FIG. 44B shows an architecture were the peripheral bus and the system bus are replaced by a scalable switching network.

FIG. 44A shows a natural progression towards even smaller applications where the system bus of a computer is replaced by a scalable switching network. FIG. 44B shows both the system bus and peripheral buses replaced by a single scalable switching network. Depicted in both examples is a simple balanced RBCCG network.

In a standard bus, only one device can assert a signal onto it, though many devices can read it. With a scalable switching network, as many devices as needed can communicate to any desired device. This eliminates many bottlenecks. In the case of the replacement of the system bus, this architecture can alleviate the VonNeumann bottleneck, which occurs between a processor and memory. Furthermore, this naturally enables communications between many processors and between as many devices as desired, such as memory or I/O.

The incorporation of scalable switching networks takes interconnection networks full circle. Originally, multistage interconnection networks were investigated as a means of linking parallel processors. Now, processors, peripherals, memory, storage, and communications devices can employ the descendants of the multistage interconnection networks.

As discussed previously, scalable switching networks such as RBCCG networks can be used by communication providers as shown in FIG. 39B; by access providers as shown in FIG. 39B; by the content providers as shown in FIG. 40, FIG. 41A, FIG. 41B, and FIG. 41C; by a server complex as shown in FIG. 42; by computer peripherals as shown in FIG. 43B; or by a computers systems bus as shown in FIG. 44B. It is also possible to use the same RBCCG network for any combination of these applications if the communications protocols are compatible. Some of the communications access points in FIG. 42 could be for a communications provider; some of the computers could be part of a server complex; some of the disk units could be part of a storage array; and some of the monitors and disk units could be peripherals to a computer, or the computers and disks could part of a multiple central processing units (CPU) and distributed memory computer. The advantage of using the same RBCCG network for these applications is that the larger an RBCCG network is, the more efficient it is in terms of cost, routing, and fault tolerance relative to other networks.

To further the architectures of FIG. 43B and FIG. 44B architecture, additional nodes along this distributed computer could also comprise network appliances such as firewalls at the communications access point to the Internet, a mail server, a web server, mail and web security appliances, a name server, a Dynamic Host Configuration Protocol (DHCP) servers, Network Address Translation server (NAT) and countless other network functions known to one of ordinary skill in the art. By expanding and distributing the nature of a computer with network services, a user's or group's computer services becomes a networked system of computation, storage, and network service devices yielding a monolithic multi-user all purpose computing network.

While certain embodiments of the inventions have been described above, it will be understood that the embodiments described are by way of example only. Accordingly, the inventions should not be limited based on the described embodiments. Thus, the scope of the inventions described herein should only be limited in light of the claims that follow when taken in conjunction with the above description and accompanying drawings.

What is claimed is:

1. A method of upgrading a scalable switching network, comprising:

adding a second extra stage of switching elements hardware to the scalable switching network comprising a plurality of internal ports as defined by a post-reconfiguration architecture, said scalable switching network comprising a non-redundant multistage interconnection network having a plurality of stages of switching elements with a first stage and a last stage, a first extra stage of switching elements, a first cyclic group interstage interconnection (CGISIC) network connecting the extra stage of switching elements with either the first stage or the last stage, a plurality of stages of switching elements, a plurality of internal ports, a plurality for external ports, and a plurality of internal connections, wherein the internal ports and external ports are coupled to one of the switching elements and the internal connections are coupled to two of the internal ports;

assigning to each internal port a corresponding port defined by the post-reconfiguration architecture;

rewiring any internal port on the basis of the post-reconfiguration architecture; and the rewiring comprises:
- selecting a selected port of the plurality of internal ports that is not coupled to the corresponding port assigned to said selected port;
- breaking a first connection coupled to the selected port, if the selected port is coupled to the first connection;
- breaking a second connection coupled to the corresponding port assigned to the selected port, if the corresponding port assigned to the selected port is coupled to said second connection; and
- connecting the selected port to the corresponding port assigned to the selected port by coupling a third connection to the selected port and to the corresponding port assigned to the selected port, and the post-reconfiguration architecture comprises:
- the non-redundant multistage interconnection network,
- the first extra stage of switching elements;
- the second extra stage of switching elements;
- a second CGISIC network connecting either the first stage or the last stage of the non-redundant switching network to the second extra stage of switching elements; a third CGISIC network connecting the second extra stage of switching elements to the first extra stage of switching elements.

2. In the method of claim 1, the non-redundant multistate interconnection network comprises:
- a modified Banyan network having a last column of switching elements having a connection topology;
- an extra column of switching elements having a connection topology,
- wherein the connection topology of the extra column and the connection topology of the last column is the same, and wherein the modified Banyan network is a Banyan network with connections removed to accommodate the connection topology of the extra column.

3. In the method of claim 1, the non-redundant multistage interconnection network is a Banyan network.

4. In the method of claim 1, the non-redundant multistage interconnection network is an n-ary Banyan network where n>2.

5. In the method of claim 1, the non-redundant multistage interconnection network is a crossover network.

6. In the method of claim 1, the non-redundant multistage interconnection network is a delta network.

7. In the method of claim 1, the non-redundant multistage interconnection network is a bit order preserving network.

8. In the method of claim 1, the switching network further comprising:
- a third extra stage of switching elements; and
- the second CGISIC network connecting the second extra stage of switching elements to the first extra stage of switching elements.

9. The method of claim 1, further comprising:
- relabeling any internal ports on the basis of the post-configuration architecture.

* * * * *